(12) United States Patent
Okabe et al.

(10) Patent No.: US 10,673,533 B2
(45) Date of Patent: Jun. 2, 2020

(54) OPTICAL TRANSMISSION APPARATUS AND METHOD

(71) Applicant: Fujitsu Optical Components Limited, Kawasaki-shi, Kanagawa (JP)

(72) Inventors: Ryou Okabe, Shinagawa (JP); Toru Matsuyama, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/029,775

(22) Filed: Jul. 9, 2018

(65) Prior Publication Data

US 2019/0058527 A1 Feb. 21, 2019

(30) Foreign Application Priority Data

Aug. 17, 2017 (JP) .................. 2017-157560

(51) Int. Cl.
| | |
|---|---|
| *H04B 10/50* | (2013.01) |
| *H04B 10/516* | (2013.01) |
| *H04B 10/58* | (2013.01) |
| *H04B 10/54* | (2013.01) |
| *H04B 10/2513* | (2013.01) |
| *H04J 14/02* | (2006.01) |

(52) U.S. Cl.
CPC ....... *H04B 10/516* (2013.01); *H04B 10/2513* (2013.01); *H04B 10/504* (2013.01); *H04B 10/541* (2013.01); *H04B 10/58* (2013.01); *H04J 14/02* (2013.01)

(58) Field of Classification Search
CPC ........ H04B 10/07951; H04B 10/07955; H04B 10/50; H04B 10/516
See application file for complete search history.

(56) References Cited

U.S. PATENT DOCUMENTS

| | | | |
|---|---|---|---|
| 2006/0153570 A1* | 7/2006 | Nelson | H04B 10/504 398/135 |
| 2015/0071651 A1 | 3/2015 | Asmanis et al. | |
| 2017/0324474 A1* | 11/2017 | Bravi | H04B 10/5053 |
| 2017/0324476 A1* | 11/2017 | Bravi | H04B 10/073 |
| 2018/0019814 A1* | 1/2018 | Fludger | H04B 10/07951 |
| 2018/0074348 A1* | 3/2018 | Fujita | H04B 10/516 |

FOREIGN PATENT DOCUMENTS

JP 2016-139976 8/2016

* cited by examiner

*Primary Examiner* — Dzung D Tran
(74) *Attorney, Agent, or Firm* — Staas & Halsey LLP

(57) ABSTRACT

An optical transmission apparatus and an optical transmission method are provided. In particular, an optical transmission apparatus is disclosed as being configured to add strength to a signal. The signal corresponds to a value that an input signal has, and the strength added to the signal is strength according to the value. The optical transmission apparatus is further configured to give delays to a plurality of signals that includes the signal and to convert the sum of the plurality of signals into an optical signal.

8 Claims, 36 Drawing Sheets

FIG.3

| NRZ-1 | NRZ-2 | $b_{00}$ | $b_{01}$ | $b_{10}$ | $b_{11}$ | SUM |
|---|---|---|---|---|---|---|
| 0b | 0b | 0 | 0 | 0 | 0 | 0 |
| 0b | 1b | 0 | $V_H$ | 0 | 0 | $V_H$ |
| 1b | 0b | 0 | 0 | $2V_H$ | 0 | $2V_H$ |
| 1b | 1b | 0 | 0 | 0 | $3V_H$ | $3V_H$ |

FIG.9

| $C_{00}$ | $C_{01}$ | $C_{10}$ | $C_{11}$ |
|---|---|---|---|
| 0 | 1 | 2 | 3 |

OPTICAL TRANSMISSION APPARATUS AND METHOD

CROSS-REFERENCE TO RELATED APPLICATION

This application is based upon and claims the benefit of priority of the prior Japanese Patent Application No. 2017-157560, filed on Aug. 17, 2017, the entire contents of which are incorporated herein by reference.

FIELD

The embodiments discussed herein are related to an optical transmission apparatus and an optical transmission method.

BACKGROUND

Multi-value amplitude modulation in optical communication is a modulation method for modulating intensity of light by three or more levels in order to transmit information of a plurality of bits with one symbol. According to multi-value amplitude modulation, optical transmission can be sped up (for example, refer to U.S. Patent Publication No. 2015/0071651 and Japanese Laid-open Patent Publication No. 2016-139976). Multi-value amplitude modulation in optical communication is carried out by any of direct modulation of a semiconductor laser, external modulation by an electro-absorption (hereafter, referred to as EA) modulator, and external modulation by a Mach-Zehnder (hereafter, referred to as MZ) modulator (for example, refer to Japanese Laid-open Patent Publication No. 2016-139976).

A technique for applying pre-equalization to multi-value amplitude modulation by an MZ modulator has been reported (for example, refer to Japanese Laid-open Patent Publication No. 2016-139976). The report describes that pre-equalization is not applied to external modulation by an EA modulator and direct modulation of a semiconductor laser. In this case, pre-equalization refers to a technique for adjusting an electrical signal that is applied to a MZ optical modulator and suppressing waveform deformation of an optical signal thereby, where the waveform deformation is due to a group delay time difference.

SUMMARY

According to an aspect of the embodiments, an optical transmission apparatus is configured to transmit an optical signal with intensity according to an input signal. The optical transmission apparatus includes a modulation mapping unit that adds strength according to a value that the input signal has, a plurality of skew units that give delays to a plurality of signals outputted in parallel from the modulation mapping unit, an addition unit that adds up the plurality of signals given the delays to generate a sum signal, an electric-optic conversion unit that converts the sum signal into the optical signal and transmits the optical signal wherein a light intensity of the optical signal is modulated in accordance with strength of the sum signal and a wavelength of the optical signal varies in accordance with the light intensity, and a skew control unit that gives delay amounts to the plurality of skew units, the delay amounts being amounts of the delays.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a table indicating respective examples of the digital signal 14, the plurality of signals 16, and the sum signal 20.

FIG. 9 is a diagram illustrating examples of the weighting coefficient given to each multiplier circuit.

DESCRIPTION OF EMBODIMENTS

Embodiments will be described hereinafter according to the drawings. However, it is noted that the technical scope is not limited to the embodiments described below but covers the matters described in the claims and the equivalents thereof. Identical symbols are given to corresponding parts even in different drawings, and the description thereof will be omitted.

As described previously, multi-value amplitude modulation in optical communication is carried out by any of direct modulation of a semiconductor laser, external modulation by an EA modulator, and external modulation by a MZ modulator.

Power consumed by direct modulation of a semiconductor laser is smaller than power consumed by external modulation using an EA modulator. In addition, power of an optical signal obtained by direct modulation of a semiconductor laser is greater than power of an optical signal obtained by external modulation using an EA modulator. Direct modulation of a semiconductor laser is superior to external modulation using an EA modulator in these respects. A similar description applies to external modulation using an MZ modulator.

On the other hand, a wavelength of an optical signal obtained by direct modulation of a semiconductor laser varies depending on light intensity (in other words, optical power) of the optical signal. The wavelength variation has an adverse effect on transmission of a multi-value signal of light (hereinafter, referred to as an optical multi-value signal).

When an optical signal is transmitted through an optical transmission line (for example, an optical fiber) that is a dispersing medium, a time interval (hereinafter, referred to as an arrival time) between incidence of the optical signal to the optical transmission line and exit of the optical signal therefrom varies depending on a wavelength of the optical signal.

When a value of an optical multi-value signal obtained by direct modulation varies, its wavelength also varies in accordance with the variation of the value (in other words, light intensity) of the optical multi-value signal. Therefore, the arrival time of an optical multi-value signal obtained by direct modulation varies depending on the value of the optical multi-value signal. As a result, time intervals between symbols of the optical multi-value signal vary and an error occurs in demodulation of the optical multi-value signal.

Thus, an optical multi-value signal obtained by direct modulation has a problem that its reception quality degrades due to a difference between arrival times in an optical transmission line (in other words, a group delay time difference).

According to the embodiments, the degradation of reception quality due to a group delay time difference that occurs in an optical multi-value signal of which wavelength varies in accordance with light intensity thereof can be suppressed.

First Embodiment

(1) Configuration and Operation

Figure 1:
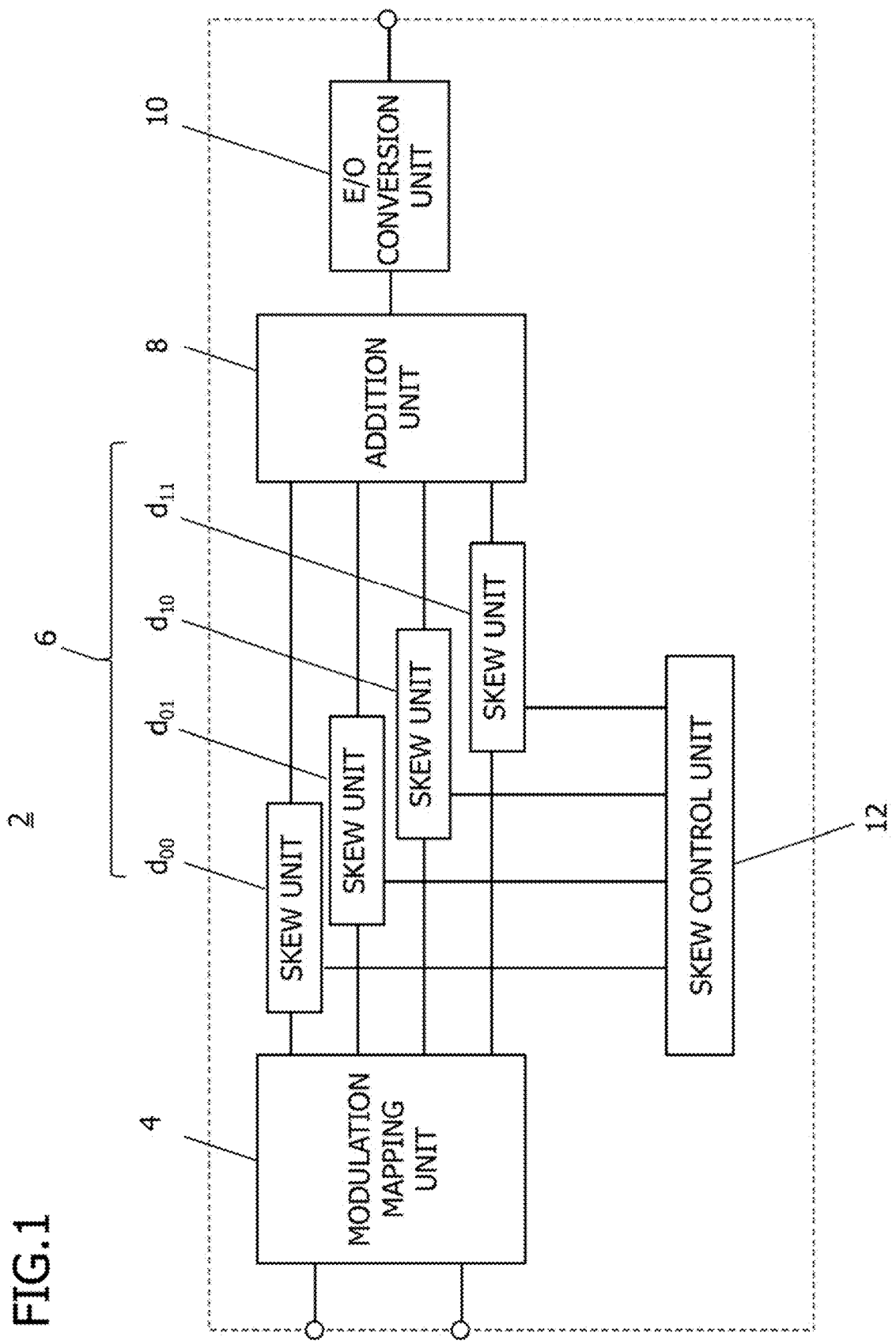
FIG. 1 is a diagram illustrating a configuration of an optical transmission apparatus 2 according to the first embodiment.
Figure 2:
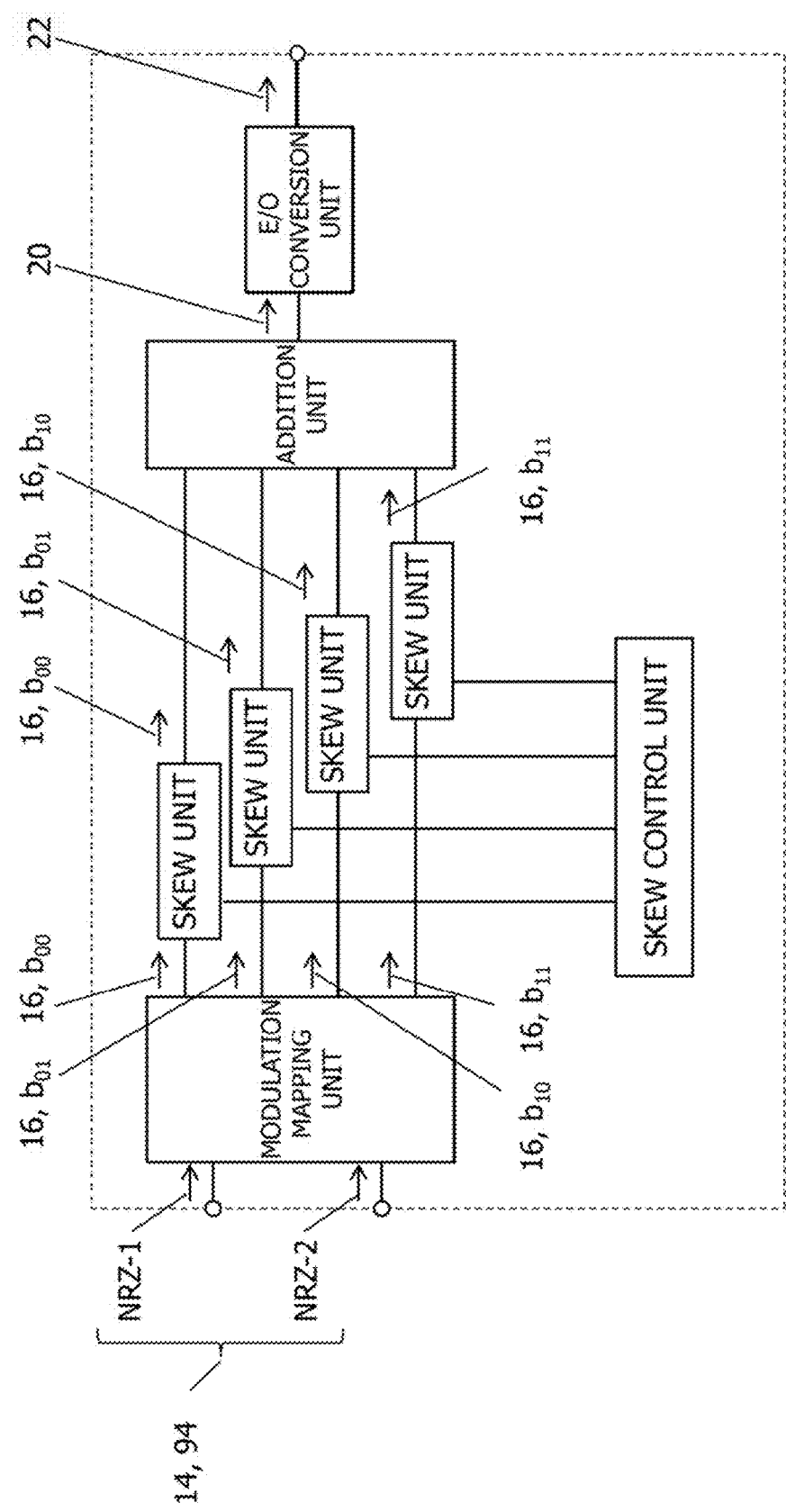
FIG. 2 is a diagram illustrating a flow of signals in the optical transmission apparatus 2.

FIG. 1 is a diagram illustrating a configuration of an optical transmission apparatus 2 according to the first embodiment. FIG. 2 is a diagram illustrating a flow of signals in the optical transmission apparatus 2.

The optical transmission apparatus 2 is an apparatus configured to transmit a multi-value signal that is an n-value signal (where n is an Integer equal to or greater than 3). The multi-value signal transmitted by the optical transmission apparatus 2 is an optical signal with intensity according to a digital signal 14. The digital signal 14 is, for example, a signal (hereinafter, referred to as an input signal 94) inputted into the optical transmission apparatus 2 from an external communication apparatus (not illustrated).

As illustrated in FIG. 1, the optical transmission apparatus 2 includes a modulation mapping unit 4, a plurality of skew units 6, an addition unit 8, an electric-optic conversion unit 10, and a skew control unit 12.

The modulation mapping unit 4 adds strength (in other words, an amplitude) to a signal (for example, $b_{11}$) that is one of the plurality of signals 16 (refer to FIG. 2) and that corresponds to the value (for example, 3) which the digital signal 14 has. The added strength is strength according to (in other words, based on) the value that the digital signal 14 has.

For example, the modulation mapping unit 4 is a pulse amplitude modulation mapper (a PAM mapper) that gives strength greater than zero only to one signal among the plurality of signals 16. For example, the plurality of signals 16 correspond one-to-one with a plurality of integers (for example, 0 to 3) that are equal to or greater than 0 and equal to or less than n−1. For example, the digital signal 14 (in other words, input signal) includes a plurality of binary signals. For example, the digital signal 14 is an electrical signal transmitted on a plurality of lanes by a communication apparatus.

The digital signal 14 is, for example, an electrical signal in compliance with a standard of an industry association or an academic society such as The Optical Internet Forum (OIF) and Institute of Electrical and Electronics Engineers (IEEE). The digital signal 14 may be an electrical signal in compliance with a standard of the Optical Transport Network (OTN). Here, the above standard of the OTN is defined in International Telecommunication Union Telecommunication Standardization Sector (ITU-T) G.709. Although these electrical signals are binary signals as of now, the future application of 4-value signals is scheduled in OIF CEI-56G-VSR and the like.

The plurality of skew units 6 give a delay to each of the plurality of signals 16 outputted in parallel from the modulation mapping unit 4. The plurality of signals 16 include the signal to which strength according to the value of the digital signal 14 is added.

The addition unit 8 adds up (in other words, integrates) the plurality of signals 16, each of which is given the delay, to generate a sum signal 20.

The electric-optic conversion unit 10 converts the sum signal 20 into an optical signal 22 of which light intensity is modulated in accordance with strength of the sum signal 20, and transmits the optical signal 22. A wavelength of the optical signal 22 varies in accordance with the light intensity. The optical signal 22 is a multi-value signal of light (hereinafter, referred to as an optical multi-value signal).

The skew control unit 12 gives a delay amount, which is an amount of the delay described above, to each of the plurality of skew units 6.

FIG. 3 is a table indicating respective examples of the digital signal 14, the plurality of signals 16, and the sum signal 20. The digital signal 14 illustrated in FIG. 3 is two non-return-to-zero (hereafter, referred to as NRZ) signals.

A first column in FIG. 3 represents values of a signal NRZ-1 that is one of the two NRZ signals. A second column represents values of a signal NRZ-2 that is the other of the two NRZ signals. "b" suffixed to numerals (for example, 0b) in the first and second columns indicates that the numerals are in binary.

Signal NRZ-1 represents a most significant bit (hereafter, referred to as MSB) of the digital signal 14. Signal NRZ-2 represents a least significant bit (hereafter, referred to as LSB) of the digital signal 14.

Third to sixth columns represent strength of the plurality of signals 16 outputted in parallel by the modulation mapping unit 4. A seventh column represents the strength of the sum signal 20 generated by the addition unit 8. $V_H$ denotes a constant voltage (for example, 0.5 V). Values in third to seventh rows in FIG. 3 represent voltage.

For example, the plurality of signals 16 correspond one-to-one with a plurality of integers (for example, 00b to 11b) indicated by binaries of a plurality of bits (for example, 2 bits). In the example illustrated in FIGS. 2 and 3, a first signal $b_{00}$ among the plurality of signals 16 corresponds to 00b. In a similar manner, a second signal $b_{01}$ among the plurality of signals 16 corresponds to 01b. A third signal $b_{10}$ among the plurality of signals 16 corresponds to 10b. A fourth signal $b_{11}$ among the plurality of signals 16 corresponds to 11b.

Specifically, the optical transmission apparatus 2 illustrated in FIGS. 1 and 2 is configured to transmit a 4-value signal. The plurality of signals 16 correspond one-to-one with integers that is equal to or greater than 0 and equal to or less than 3 (=4-1).

The modulation mapping unit 4 outputs the plurality of signals 16 in parallel. The modulation mapping unit 4 further adds strength (for example, 3 $V_H$) according to a value (for example, 11b) of a digital signal 14 to a signal (for example, $b_{11}$) among the plurality of signals 16. The signal (for example, $b_{11}$) to which the strength is added is a signal corresponding the value (for example, 11b) indicated by the digital signal 14. The modulation mapping unit 4 does not give an amplitude to the other signals (for example, $b_{00}$ to $b_{10}$).

A first skew unit $d_{00}$ among the plurality of skew units 6 gives a delay to the first signal $b_{00}$. In a similar manner, a second skew unit $d_{01}$ among the plurality of skew units 6 gives a delay to the second signal $b_{01}$. A third skew unit $d_{10}$ among the plurality of skew units 6 gives a delay to the third signal $b_{10}$. A fourth skew unit $d_{11}$ among the plurality of skew units 6 gives a delay to the fourth signal $b_{11}$.

The addition unit 8 integrates (in other word words, adds up) the plurality of signals 16, each of which is given the delay, and generate the sum signal 20 as a result of the integrating. For example, when the value indicated by the digital signal 14 is 11b, the strength (in other words, the amplitude) of the sum signal 20 generated by the addition unit 8 is 3 $V_H$ (=0+0+0+3 $V_H$) (refer to fifth row in FIG. 3). The sum signal 20 is a signal obtained by the integrating of the plurality of signals 16 given the delays.

The electric-optic conversion unit 10 converts the sum signal 20 into the optical signal 22 of which light intensity is modulate in accordance with the strength (for example, 3 $V_H$) of the sum signal 20, and transmits the optical signal 22. The wavelength of the optical signal 22 varies in accordance with the light intensity of the optical signal 22. For example, the optical signal 22 is 4-level Pulse Amplitude Modulation (hereafter, referred to as PAM4) signal in which 2-bit information is represented by one symbol.

The skew control unit 12 gives amounts of the delays described above (first delay amount $\tau_{00}$ to fourth delay amount $\tau_{11}$) to each of the plurality of skew units 6. Each of the delays described above (first delay amount $\tau_{00}$ to fourth delay amount $\tau_{11}$) is given to one of the plurality of signals 16.

For example, the skew control unit 12 gives the first delay amount $\tau_{00}$ to the first skew unit $d_{00}$. In addition, the skew control unit 12 gives the second delay amount $\tau_{01}$ to the second skew unit $d_{01}$. Furthermore, the skew control unit 12 gives the third delay amount $\tau_{10}$ to the third skew unit $d_{10}$. In addition, the skew control unit 12 gives the fourth delay amount $\tau_{11}$ to the fourth skew unit $d_{11}$. The first delay amount $\tau_{00}$ to the fourth delay amount $\tau_{11}$ are delay amounts that differ from each another.

A control line for feedback control may be connected to the skew control unit 12.

Using the configuration described above, the optical transmission apparatus 2 transmits the optical signal 22 that is a multi-value signal.

In the example illustrated in FIG. 3, strength (in other words, 0 to 3 $V_H$) given to the plurality of signals 16 by the modulation mapping unit 4 are proportional to the value of the digital signal 14. However, the strength given to the plurality of signals 16 by the modulation mapping unit 4 may be un-proportional to the value of the digital signal 14. For example, the strength given to the plurality of signals 16 by the modulation mapping unit 4 may be strength in accordance with a gray code.

—Suppression of Reception Quality Deterioration—

Figure 4:
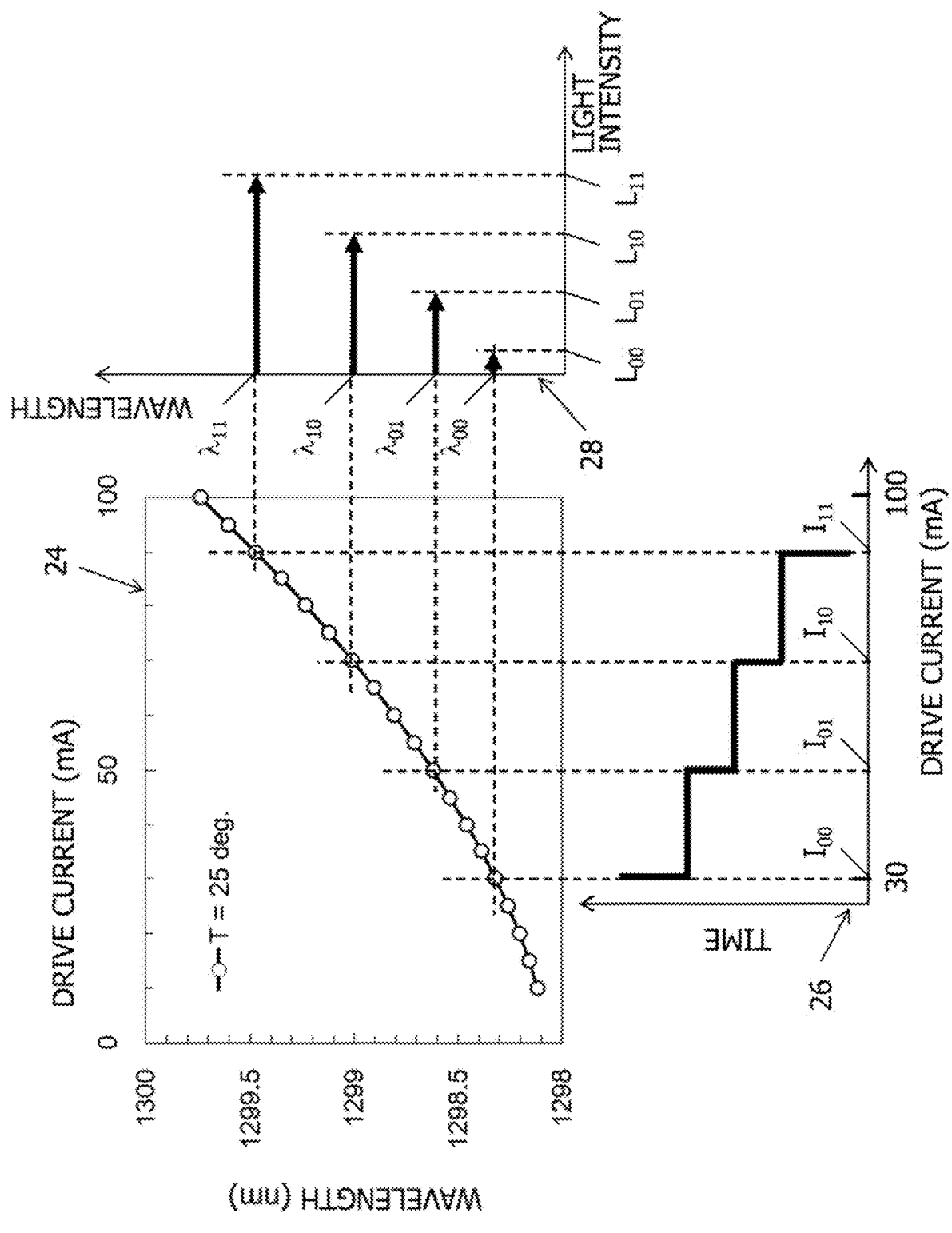
FIG. 4 is a diagram illustrating an example of a wavelength variation of the optical signal 22.

FIG. 4 is a diagram illustrating an example of a wavelength variation of the optical signal 22. A light source of the electric-optic conversion unit 10 is, for example, a distributed-feedback semiconductor laser or a surface-emitting laser. A graph 24 in FIG. 4 is a diagram representing an example of a relationship between a drive current of a distributed-feedback semiconductor laser (hereinafter, referred to as a semiconductor laser) that is a light source of the electric-optic conversion unit 10 and a wavelength of laser light (in other words, the optical signal 22). An abscissa of the graph 24 represents a drive current. An ordinate of the graph 24 represents wavelength. "T" in the graph 24 denotes a temperature of the semiconductor laser.

A graph 26 in FIG. 4 is a diagram representing an example of a time variation of the drive current of the semiconductor laser. An abscissa of the graph 26 represents the drive current. An ordinate of the graph 26 represents time.

A graph 28 in FIG. 4 is a diagram representing an example of a relationship between the wavelength and the light intensity of the optical signal 22. An abscissa of the graph 28 represents light intensity. An ordinate of the graph 28 represents wavelength.

A drive current $I_{11}$ in graph 26 is a drive current generated by the electric-optic conversion unit 10 in response to the sum signal 20 corresponding to the digital signal 14 of which a value is 11b in a binary number. A similar description applies to drive currents $I_{00}$ to $I_{10}$.

A light intensity $L_{11}$ of the graph 28 is a light intensity of the optical signal 22 outputted by the semiconductor laser in response to the drive current $I_{11}$. A similar description applies to light intensities $L_{00}$ to $L_{10}$. A wavelength $\lambda_{11}$ of the graph 28 is the wavelength of the optical signal 22 outputted by the semiconductor laser in response to the drive current $I_{11}$. A similar description applies to wavelengths $\lambda_{00}$ to $\lambda_{10}$.

When the value indicated by the digital signal 14 increases, the strength of the sum signal 20 increases as illustrated in FIG. 3. As a result, the drive current increases, and the light intensity and the wavelength of the optical signal 22 increase.

For example, when the value of the digital signal 14 increases from 01b to 10b, the strength of the sum signal 20 increases from $V_H$ to $2V_H$. As a result, the strength of the drive current increases from $I_{01}$ to $I_{10}$, and the light intensity of the optical signal 22 increases from $L_{01}$ to $L_{10}$. In accordance with the increase of light intensity, the wavelength of the optical signal 22 increases from $\lambda_{01}$ to $\lambda_{10}$. In other words, the optical signal 22 outputted by the electric-optic conversion unit 10 is light that is modulated according to the sum signal 20 and has a wavelength that varies according to light intensity thereof.

Figure 5:
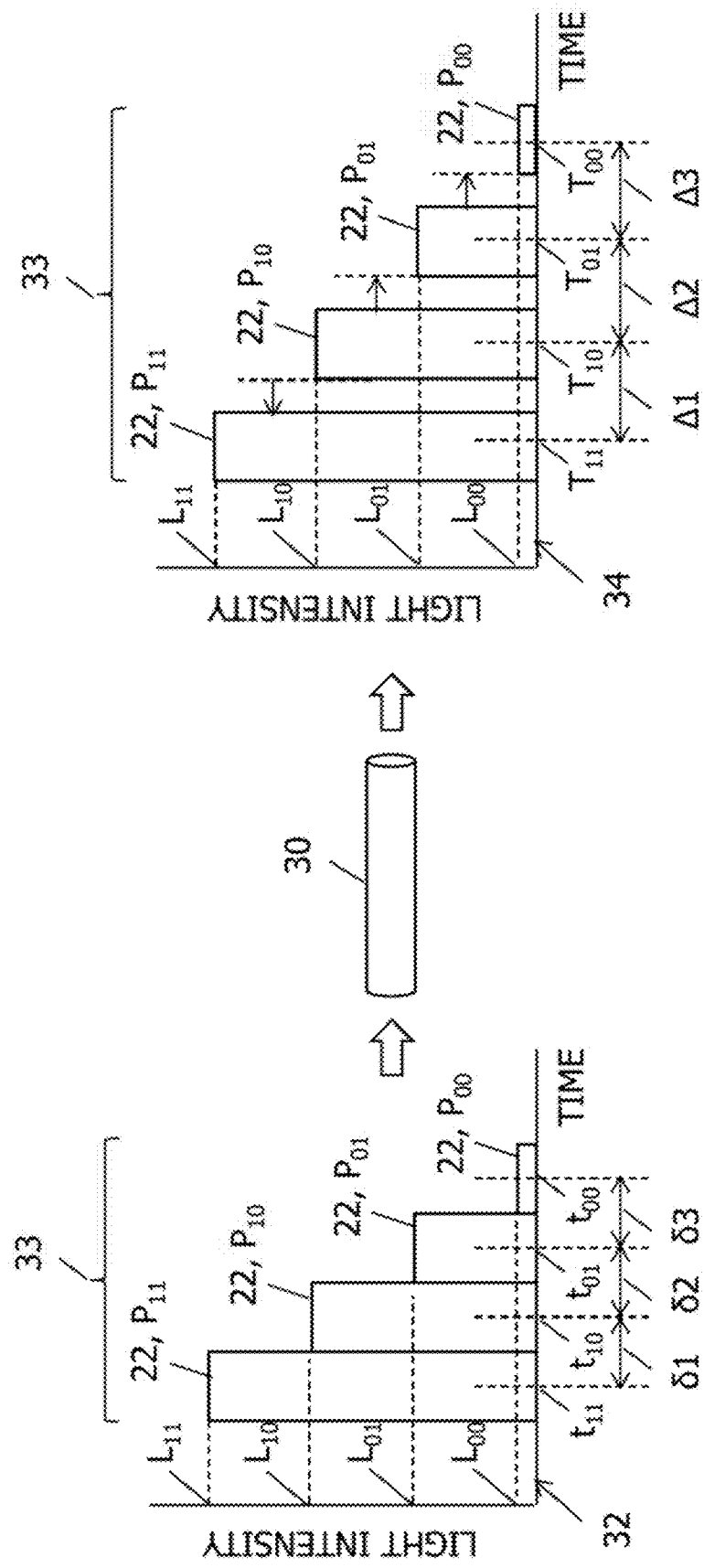
FIG. 5 is a diagram illustrating an effect of an optical transmission line 30 on an optical pulse sequence 33 of the optical signal 22.

FIG. 5 is a diagram illustrating an effect of an optical transmission line 30 on an optical pulse sequence 33 of the optical signal 22. A graph 32 on a left side of FIG. 5 represents an example of the optical pulse sequence 33 before being incident to the optical transmission line 30. A graph 34 on a right side of FIG. 5 represents an example of the optical pulse sequence 33 after exiting the optical transmission line 30. A waveform of each optical pulse in the optical pulse sequence 33 that exits the optical transmission line 30 is deformed by wavelength dispersion of the optical transmission line 30. However, a pulse sequence with an undeformed waveform is illustrated in the graph 34 for the sake of simplicity (a similar description also applies to FIG. 6 to be described later).

Abscissas of the graphs 32 and 34 represent time. Ordinates of the graphs 32 and 34 represent light intensity of the optical signal 22. First, a case where the plurality of skew units 6 do not give delays to the plurality of signals 16 will be considered.

An optical pulse $P_{11}$ illustrated in graphs 32 and 34 is the optical signal 22 outputted by the optical transmission apparatus 2 in response to the digital signal 14 of which value is 11b in binary. A similar description applies to optical pulses $P_{00}$ to $P_{10}$. Each of the optical pulses $P_{00}$ to $P_{11}$ is an optical signal 22 that has one symbol.

An example illustrated in FIG. 5 represents an effect of the optical transmission line 30 on the optical pulse sequence 33 when the wavelength of the optical signal 22 is within a normal dispersion region (in other words, a negative dispersion region) of the optical transmission line 30.

For example, the optical transmission line 30 illustrated in FIG. 5 is a single-mode optical fiber. $\delta1$ denotes a difference ($=t_{10}-t_{11}$, hereinafter referred to as an incident time difference) between a time point $t_{10}$ when the optical pulse $P_{10}$ is incident to the optical transmission line 30 and a time point $t_{11}$ when the optical pulse $P_{11}$ is incident to the optical transmission line 30. $\delta2$ denotes an incident time difference ($=t_{01}-t_{10}$) between the optical pulse $P_{01}$ and the optical pulse $P_{10}$. $\delta3$ denotes an incident time difference ($=t_{00}-t_{01}$) between the optical pulse $P_{00}$ and the optical pulse $P_{01}$. $t_{01}$ denotes a time point when the optical pulse $P_{01}$ is incident to the optical transmission line 30. $t_{00}$ denotes a time point when the optical pulse $P_{00}$ is incident to the optical transmission line 30.

$\Delta1$ denotes a difference ($=T_{10}-T_{11}$, hereinafter referred to as an exit time difference) between a time point $T_{10}$ when the optical pulse $P_{10}$ exits the optical transmission line 30 and a time point $T_{11}$ when the optical pulse $P_{11}$ exits the optical transmission line 30. $\Delta2$ denotes an exit time difference ($=T_{01}-T_{10}$) between the optical pulse $P_{01}$ and the optical pulse $P_{10}$. $\Delta3$ denotes an exit time difference ($=T_{00}-T_{01}$) between the optical pulse $P_{00}$ and the optical pulse $P_{01}$. $T_{01}$ denotes a time point when the optical pulse $P_{01}$ exits the optical transmission line 30. $T_{00}$ denotes a time point when the optical pulse $P_{00}$ exits the optical transmission line 30.

As illustrated in the graph 28 in FIG. 4, the wavelength $\lambda_{11}$ of the optical pulse $P_{11}$ with a light intensity of $L_{11}$ is longer than the wavelength $\lambda_{10}$ of the optical pulse $P_{10}$ with a light intensity of $L_{10}$. Therefore, due to a negative wavelength dispersion of the optical transmission line 30, a time interval (in other words, an arrival time) $AT_{11}$ between the incidence of the optical pulse $P_{11}$ to the optical transmission line 30 and the exit of the optical pulse $P_{11}$ therefrom is shorter than the arrival time $AT_{10}$ of the optical pulse $P_{10}$ (in other words, $AT_{11}<AT_{10}$).

Therefore, as is apparent from expressions (1) and (2) below, the exit time difference $\Delta1$ is longer than the incident time difference $\delta1$ (refer to FIG. 5). A similar description applies to the exit time differences $\Delta2$ and $\Delta3$.

$$\Delta1 = T_{10} - T_{11} \qquad (1)$$
$$= (t_{10} + AT_{10}) - (t_{11} + AT_{11})$$
$$= (t_{10} - t_{11}) + (AT_{10} - AT_{11})$$
$$= \delta1 + D1$$

$$D1 = AT_{10} - AT_{11} > 0 \qquad (2)$$

D1 denotes a difference between arrival times (in other words, a group delay time difference) between the optical pulse $P_{10}$ and the optical pulse $P_{11}$. Hereinafter, a "difference between arrival times" will be referred to as an arrival time difference.

Figure 6:
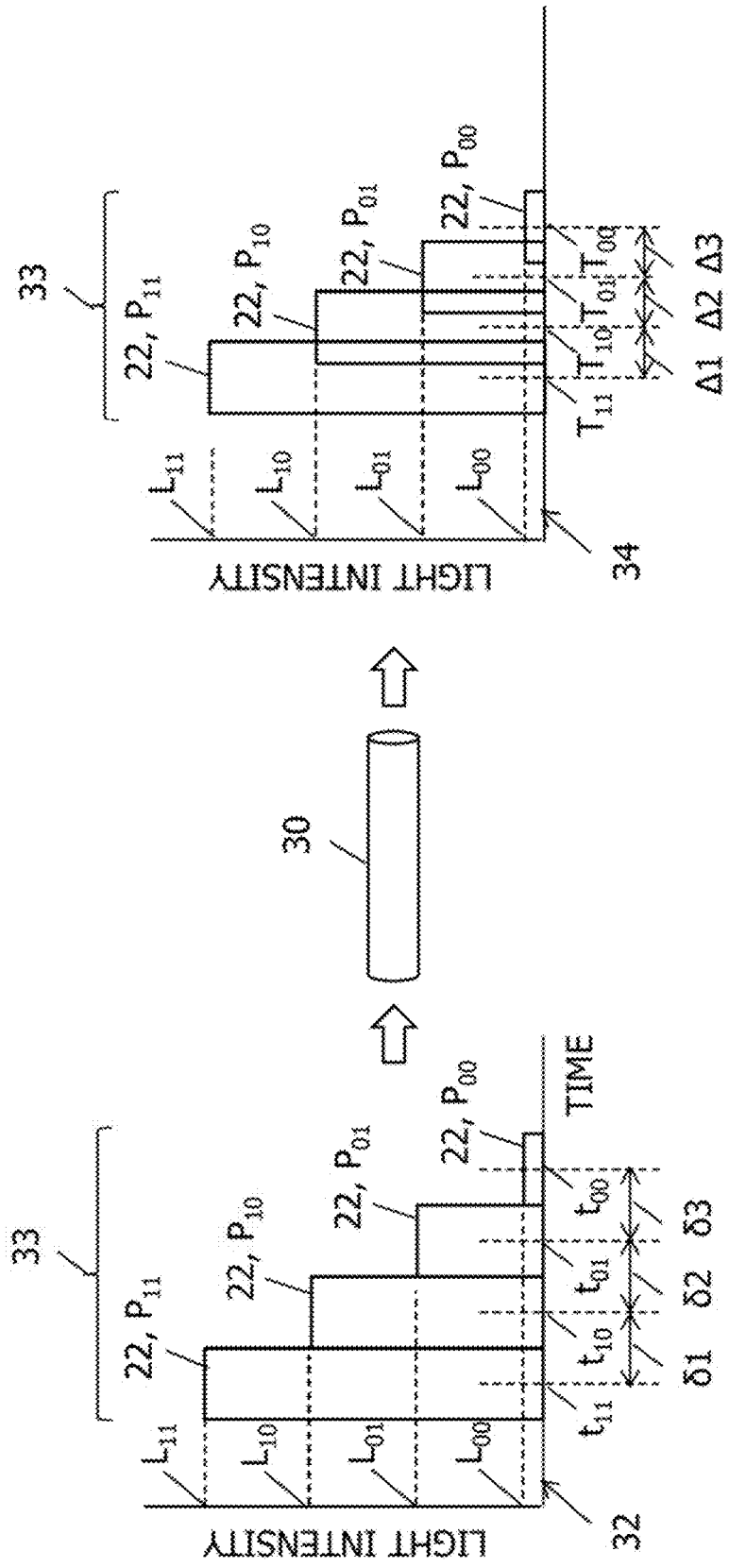
FIG. 6 is a diagram illustrating an example of an effect of the optical transmission line 30 on the optical pulse sequence 33 when the wavelength of the optical signal 22 is within an anomalous dispersion region (in other words, a positive dispersion region) of the optical transmission line 30.

FIG. 6 is a diagram illustrating an example of an effect of the optical transmission line 30 on the optical pulse sequence 33 when the wavelength of the optical signal 22 is within an anomalous dispersion region (in other words, a positive dispersion region) of the optical transmission line 30. In the example illustrated in FIG. 6, the arrival time of the optical pulse $P_{11}$ is longer than the arrival time of the optical pulse $P_{10}$ due to a positive wavelength dispersion of the optical transmission line 30. Therefore, the exit time difference Δ1 is shorter than the incident time difference δ1 (refer to FIG. 6). A similar description applies to the exit time differences Δ2 and Δ3.

As described above, when optical signals 22, wavelengths of which differs from each other, pass through the optical transmission line 30, a wavelength dispersion of the optical transmission line 30 causes the exit time difference Δ to deviate from the incident time difference δ.

Let us now consider a case where the plurality of skew units 6 does not give delays to the plurality of signals 16 outputted by the modulation mapping unit 4 (in other words, a case illustrated in FIGS. 5 and 6). The incident time differences δ1 to δ3 in this case are a cycle (hereinafter, referred to as a modulation cycle MP) at which the modulation mapping unit 4 outputs the plurality of signals 16. The optical pulse sequence 33 is disturbed when the exit time differences Δ1 to Δ3 deviate from the modulation cycle MP.

A disturbance of the optical pulse sequence 33 can be suppressed by changing the incident time difference δ in a direction for canceling a difference in arrival times (in other words, a group delay time difference) D between optical pulses whose wavelengths differs from each other.

For example, when the arrival time difference D1 (=$AT_{10}$-$AT_{11}$) is greater than zero, the incident time difference δ1 (=$t_{10}$-$t_{11}$) is made smaller than the modulation cycle MP. Accordingly, an increase in the exit time difference Δ1 due to the arrival time difference D1 is suppressed (or offset). As a result, the disturbance of the optical pulse sequence 33 is suppressed. In a similar manner, the disturbance of the optical pulse sequence 33 can be further suppressed by reducing the incident time differences δ2 and δ3.

A reduction of the incident time difference δ1 (=$t_{10}$-$t_{11}$) can be realized by making the third delay amount $\tau_{10}$ given to the third skew unit $d_{10}$ smaller than the fourth delay amount $\tau_{11}$ given to the fourth skew unit $d_{11}$. A similar description applies to reductions of the incident time differences δ2 and δ3.

Therefore, according to the first embodiment, the degradation of reception quality due to a group delay time difference that occurs between optical pulses of which levels differ from each other can be suppressed. In other words, according to the first embodiment, the degradation of reception quality due to a group delay time difference of an optical multi-value signal obtained by direct modulation can be suppressed.

Figure 12A:
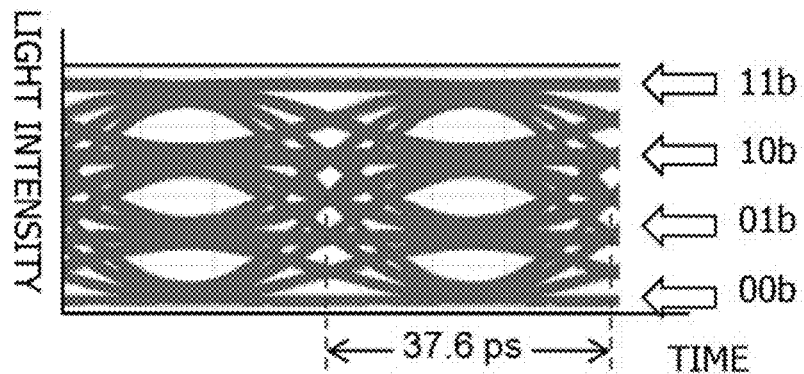
FIGS. 12A and 12B illustrate eye patterns of optical multi-value signals.

By the way, when mutually different delays are given to the plurality of signals 16 to change the incident time difference δ of the optical signal 22, edges of the optical signal 22 may overlap with each other on a transmitting side (in other words, a side of the optical transmission apparatus 2) and a whisker-like waveform may occur. However, the delays given to the plurality of signals 16 are delays that align centers of the optical signals 22 at a receiving side so that an eye pattern opens as indicated in FIG. 12A (in other words, delays that cause a receiving-side eye pattern of the optical signal 22 to open). Therefore, the overlapping at the edges of the optical signal 22 on the transmitting side does not affect the reception quality of the optical signal 22.

(2) Hardware

Figure 7:
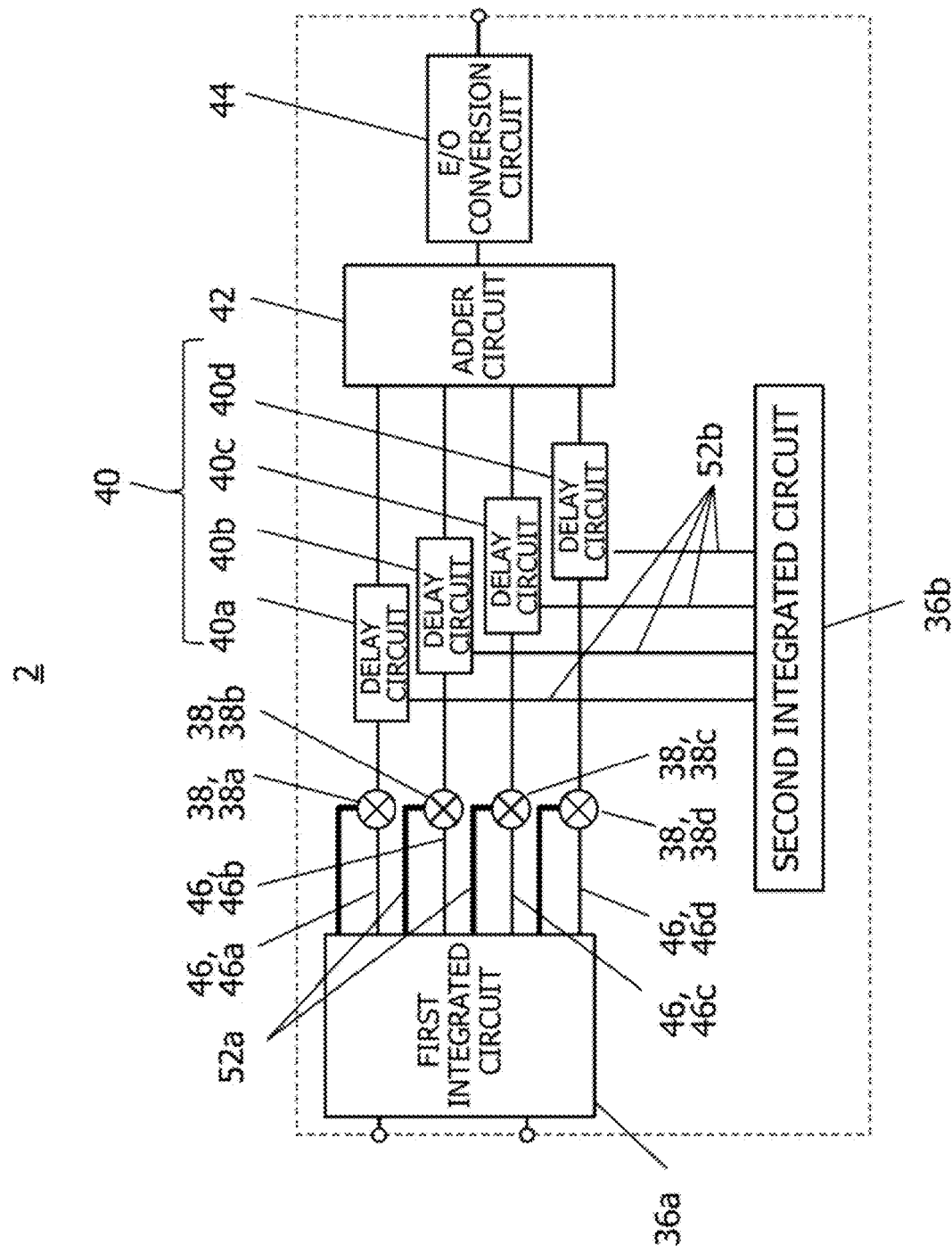
FIG. 7 is a diagram illustrating an example of a hardware configuration of the optical transmission apparatus 2 according to the first embodiment.
Figure 8:
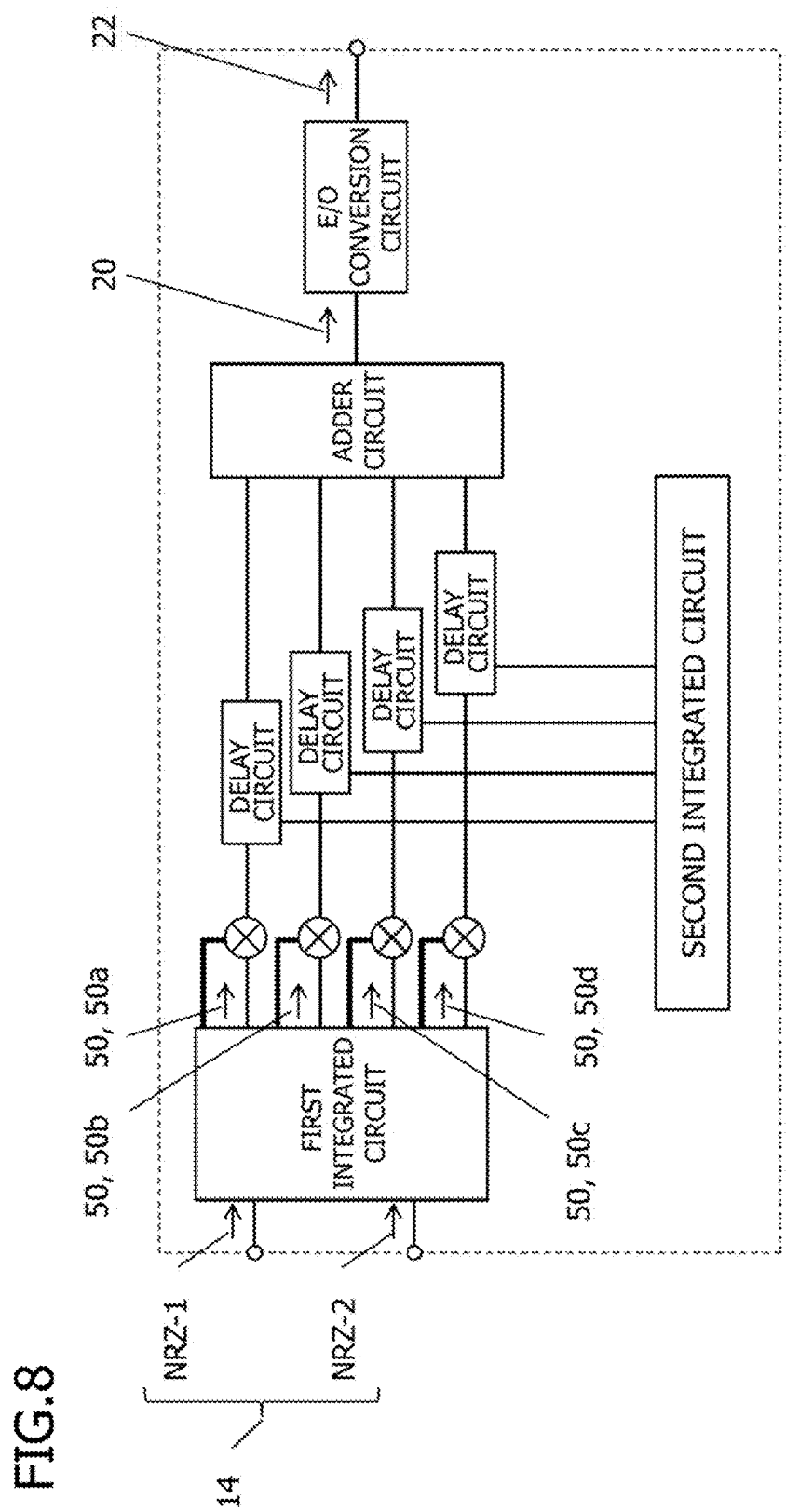
FIG. 8 is a diagram illustrating an example of a flow of signals in FIG. 7.

FIG. 7 is a diagram illustrating an example of a hardware configuration of the optical transmission apparatus 2 according to the first embodiment. FIG. 8 is a diagram illustrating an example of a flow of signals in FIG. 7.

For example, the optical transmission apparatus 2 includes a first integrated circuit 36a, a plurality of multiplier circuits 38, a plurality of delay circuits 40, an adder circuit 42, an electric-optic conversion circuit 44, and a second integrated circuit 36b.

The first integrated circuit 36a is connected to the plurality of multiplier circuits 38 through a plurality of signal lines 46. One end of each of the signal lines 46a to 46d is connected to the first integrated circuit 36a, and the other end of each of the signal lines 46a to 46d is connected to one of the plurality of multiplier circuits 38.

—First Integrated Circuit 36a—

The first integrated circuit 36a is, for example, an application specific integrated circuit (hereafter, referred to as ASIC). The first integrated circuit 36a may be a field-programmable gate array (hereafter, referred to as FPGA).

In response to the digital signal 14 (refer to FIG. 8), the first integrated circuit 36a outputs a plurality of electrical signals 50 to the plurality of signal lines 46 (refer to FIG. 7) in parallel. The digital signal 14 is a signal indicating one of a plurality of integers (for example, 00b to 11b) indicated by a information of N-bit (where N is an integer equal to or greater than 2). The plurality of electrical signals 50 correspond one-to-one with a plurality of integers (for example, 00b to 11b) indicated by an N-bit binary. In a similar manner, the plurality of signal lines 46 (refer to FIG. 7) correspond one-to-one with a plurality of integers (for example, 00b to 11b) represented by an N-bit binary.

The first integrated circuit 36a further gives constant strength (in other words, an amplitude) only to a signal corresponding to a value (for example, 11b) indicated by the digital signal 14 among the plurality of electrical signals 50, and outputs the signal. For example, the strength to be given is $V_H$ (V) (refer to FIG. 3). For example, $V_H$ is a voltage other than 0 V. The electrical signal 50 to which the strength has been given is, for example, a rectangular pulse. A voltage of the electrical signal 50 during a pulse-on period is $V_H$ (V). The voltage of the electrical signal 50 during a pulse-off period is, for example, 0 (V). Signals not given strength among the plurality of electrical signals 50 have, for example, a constant voltage of 0 V.

Specifically, for example, a first electrical signal 50a (one of the plurality of electrical signals 50, a similar description will apply hereinafter) illustrated in FIG. 8 is a signal corresponding to 00b. A second electrical signal 50b is a signal corresponding to 01b. A third electrical signal 50c is a signal corresponding to 10b. A fourth electrical signal 50d is a signal corresponding to 11b.

In a similar manner, for example, a first signal line 46a (one of the plurality of signal lines 46, a similar description will apply hereinafter) is a signal line corresponding to 00b. A second signal line 46b is a signal line corresponding to 01b. A third signal line 46c is a signal line corresponding to 10b. A fourth signal line 46d is a signal line corresponding to 11b.

The first electrical signal 50a is outputted to the first signal line 46a. The second electrical signal 50b is outputted to the second signal line 46b. The third electrical signal 50c is outputted to the third signal line 46c. The fourth electrical signal 50d is outputted to the fourth signal line 46d. In addition, the first integrated circuit 36a gives constant strength (for example, $V_H$) only to a signal (for example, the fourth electrical signal 50d) corresponding to a value (for example, 11b) indicated by the digital signal 14 among the plurality of electrical signals 50, and outputs the signal.

—Multiplier Circuit 38—

The plurality of multiplier circuits 38 are, for example, analog multiplier circuits that utilize characteristics of a bipolar transistor. The plurality of multiplier circuits 38 may be, for example, multiplier circuits utilizing an operational amplifier.

Each of the plurality of multiplier circuits 38 multiplies an electrical signal inputted through one of the plurality of signal lines 46 by a weighting coefficient, and outputs the multiplied electrical signal. For example, a first multiplier circuit 38a (refer to FIG. 7) multiplies the first electrical signal 50a (refer to FIG. 8) by a weighting coefficient, and outputs the first electrical signal 50a multiplied. The weighting coefficient of each multiplier circuit is given to each multiplier circuit by the first integrated circuit 36a through a first control line 52a (refer to FIG. 7). The first control line 52a is a signal line (in other words, wiring that transmits an electrical signal).

The weighting coefficient of each multiplier circuit is a coefficient in accordance with a value to which the signal line connected with each multiplier circuit corresponds. For example, the weighting coefficient of the first multiplier circuit 38a is a value (for example, 0) in accordance with 00b that is a value to which the first signal line 46a connected to the first multiplier circuit 38a corresponds.

Figure 9:
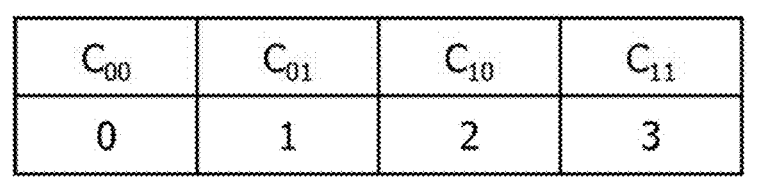

FIG. 9 is a diagram illustrating examples of the weighting coefficient given to each multiplier circuit.

$C_{00}$ represents the weighting coefficient of the first multiplier circuit 38a connected to the first signal line 46a corresponding to 00b. $C_{01}$ represents the weighting coefficient of a second multiplier circuit 38b connected to the second signal line 46b corresponding to 01b. $C_{10}$ represents the weighting coefficient of a third multiplier circuit 38c connected to the third signal line 46c corresponding to 10b. $C_{11}$ represents the weighting coefficient of a fourth multiplier circuit 38d connected to the fourth signal line 46d corresponding to 11b.

The plurality of signals 16 described with reference to FIG. 2 are realized by the plurality of electrical signals 50 multiplied by the weighting coefficients.

—Delay Circuit 40—

The plurality of delay circuits 40 are, for example, circuits including a variable coaxial line and a drive circuit of the variable coaxial line.

Each of the plurality of the delay circuits 40 may be a passive circuit including a resistive element, an inductor, and a capacitor. At least one of the resistive element, the inductor, and the capacitor is a variable element. The plurality of delay circuits 40 further include a drive circuit of the variable element.

Each of the plurality of the delay circuits 40 may be a circuit including an analog to digital converter (hereafter, referred to as ADC), a digital signal processor (hereafter, referred to as DSP) connected to the ADC, and a digital to analog converter (hereafter, referred to asDAC) connected to the DSP.

The plurality of delay circuits 40 give delays to electrical signals (in other words, the electrical signals 50 multiplied by the weighting coefficients) outputted from the plurality of multiplier circuits 38.

Specifically, a first delay circuit 40a (refer to FIG. 7) gives a delay to the first electrical signal 50a (that corresponds to the first signal $b_{00}$) multiplied by the weighting coefficient $C_{00}$. A second delay circuit 40b gives a delay to the second electrical signal 50b (that corresponds to the second signal $b_{01}$) multiplied by the weighting coefficient $C_{01}$. A third delay circuit 40c gives a delay to the third electrical signal 50c (that corresponds to the third signal $b_{10}$) multiplied by the weighting coefficient $C_{10}$. A fourth delay circuit 40d gives a delay to the fourth electrical signal 50d (that corresponds to the fourth signal $b_{11}$) multiplied by the weighting coefficient $C_{11}$.

The plurality of delay circuits 40 are given the respective delay amounts through a second control line 52b.

—Adder Circuit 42—

The adder circuit 42 is, for example, an analog adder circuit including an operational amplifier and a plurality of resistive elements.

The adder circuit 42 integrates the plurality of electrical signals 50 outputted from the plurality of delay circuits 40, and generates the sum signal 20 as a result of the integrating. The sum signal 20 generated by the adder circuit 42 is an electrical signal.

—Electric-Optic Conversion Circuit 44—

Figure 10:
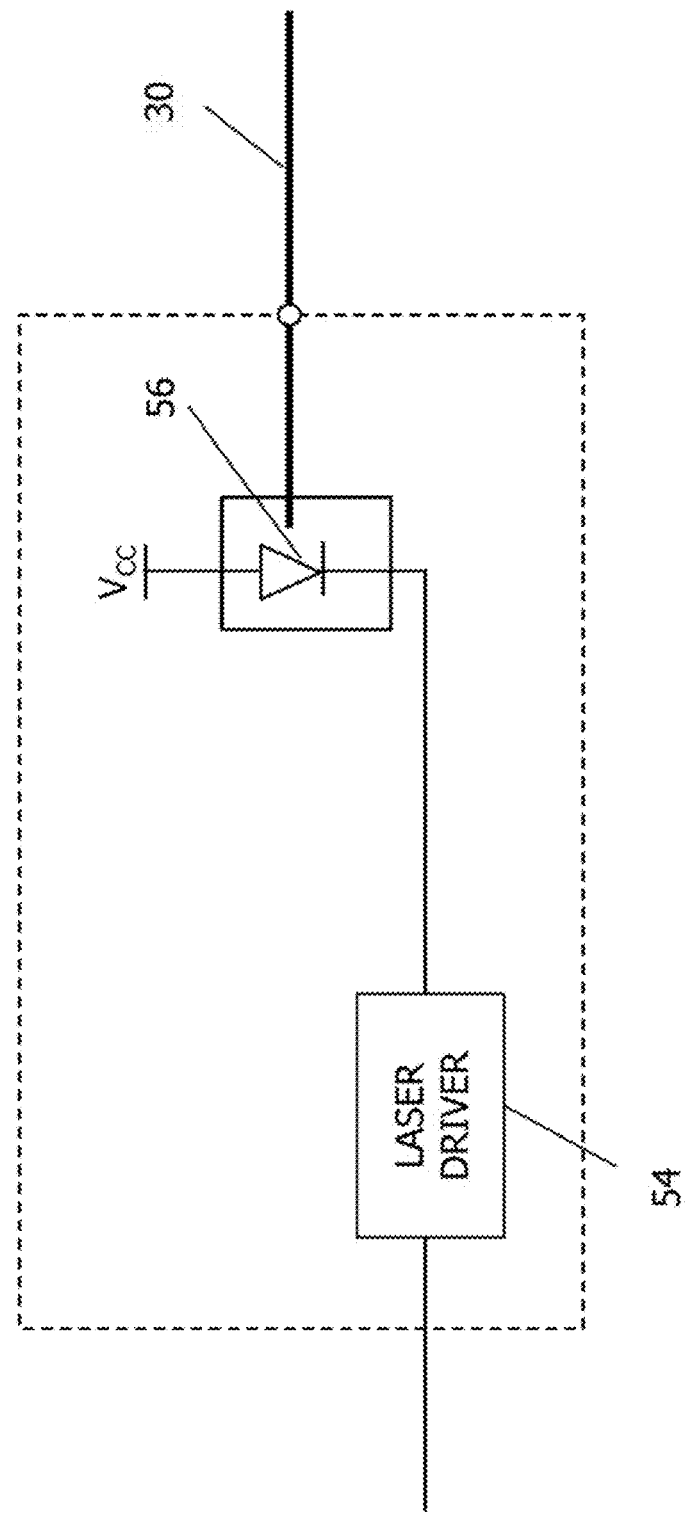
FIG. 10 is a diagram illustrating an example of a hardware configuration of the electric-optic conversion circuit 44.

FIG. 10 is a diagram illustrating an example of a hardware configuration of the electric-optic conversion circuit 44. For example, the electric-optic conversion circuit 44 includes a laser driver 54 and a semiconductor laser (for example, a distributed-feedback semiconductor laser) 56.

The electric-optic conversion circuit 44 converts the sum signal 20 (refer to FIG. 8) into the optical signal 22 of which light intensity is modulated in accordance with the strength of the sum signal 20, and the wavelength of the optical signal 22 varies in accordance with the light intensity thereof. The optical signal 22 is transmitted into the optical transmission line 30. Specifically, the laser driver 54 converts the sum signal 20 into a drive current and supplies the drive current to the semiconductor laser 56. For example, the drive current is obtained by superimposing a current approximately proportional to the strength of the sum signal 20 on a bias current slightly greater than a threshold of the semiconductor laser 56.

—Second Integrated Circuit 36b—

The second integrated circuit 36b is, for example, an ASIC. The second integrated circuit 36b may be an FPGA.

The second integrated circuit 36b gives respective delay amounts to the plurality of delay circuits 40. A control line (not illustrated) for feedback control may be connected to the second integrated circuit 36b.

Specifically, the second integrated circuit 36b gives the first delay amount $\tau_{00}$ of the first electrical signal 50a to the first delay circuit 40a. The second integrated circuit 36b further gives the second delay amount $\tau_{01}$ of the second electrical signal 50b to the second delay circuit 40b. The second integrated circuit 36b further gives the third delay amount $\tau_{10}$ of the third electrical signal 50c to the third delay circuit 40c. The second integrated circuit 36b further gives the fourth delay amount $\tau_{11}$ of the fourth electrical signal 50d to the fourth delay circuit 40d.

For example, the modulation mapping unit 4 (refer to FIG. 1) is realized by the first integrated circuit 36a and the plurality of multiplier circuits 38. For example, the plurality of skew units 6 are realized by the plurality of delay circuits 40. For example, the addition unit 8 is realized by the adder circuit 42. For example, the electric-optic conversion unit 10 is realized by the electric-optic conversion circuit 44. For example, the skew control unit 12 is realized by the second integrated circuit 36b.

(3) Usage Example

For example, the optical transmission apparatus 2 according to the first embodiment is mounted to an optical transmitter-receiver together with an optical receiver (not illustrated). For example, the optical transmission apparatus (in other words, an optical transmitter) 2 is connected to one of an optical fiber pair. The optical receiver is connected to the other of the optical fiber pair.

For example, the optical transmission apparatus 2 according to the first embodiment is an apparatus adaptable to a standard of four-level pulse amplitude modulation (in other words, PAM4) currently being discussed by the IEEE 802.3bs working group. The PAM4 standard being discussed by IEEE 802.3bs defines eight lanes.

Figure 11:
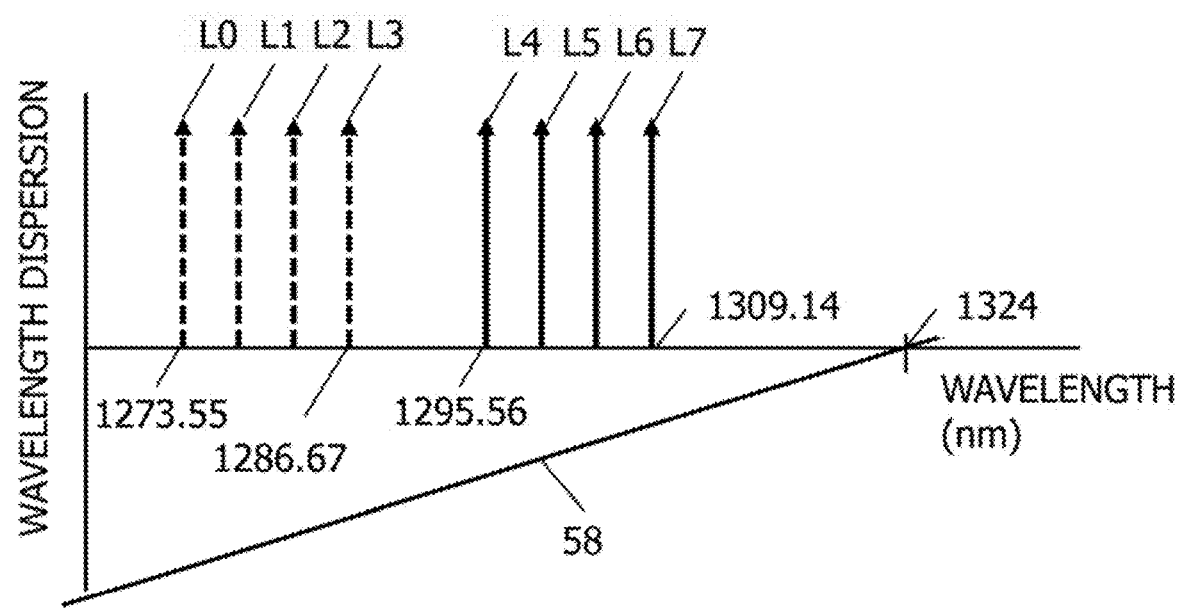
FIG. 11 is a diagram illustrating respective central wavelengths of the eight lanes L0 to L7 defined in the PAM4 standard being discussed by IEEE 802.3bs.

FIG. 11 is a diagram illustrating respective central wavelengths of the eight lanes L0 to L7 defined in the standard being discussed by IEEE 802.3bs. A wavelength width of each lane is approximately 2 nm. FIG. 11 also illustrates an example of a wavelength dispersion 58 of an optical fiber that is defined in the PAM4 standard being discussed by IEEE 802.3bs. A wavelength dispersion refers to a group delay time difference that occurs when two beams of light with wavelengths that differ from each other by a unit wavelength (for example, 1 nm) are propagated by a unit length (for example, 1 km). An abscissa represents wavelength. An ordinate represents wavelength dispersion.

A zero-dispersion wavelength of the wavelength dispersion 58 illustrated in FIG. 11 is 1324 nm. A transmission distance of PAM4 that is being discussed by IEEE 802.3bs is 2 to 10 km. 1324 nm is a longest zero-dispersion wavelength that is defined in the PAM4 standard being discussed by IEEE 802.3bs.

An effect of the wavelength dispersion 58 illustrated in FIG. 11 on optical multi-value signals will be evaluated. An optical fiber length is assumed to be 10 km. The optical multi-value signals to be evaluated are 4-value signals. A transmission rate of 53.125 Gb/s (26.5626 GB/s) is assumed. Therefore, a time difference between symbols is 37.6 ps. Wavelengths of the optical multi-value signals to be evaluated are the wavelengths $\lambda_{00}$ to $\lambda_{11}$ illustrated in FIG. 4. The wavelengths $\lambda_{00}$ to $\lambda_{11}$ illustrated in FIG. 4 are wavelengths within a wavelength range of the lane L0 that is furthest from the zero-dispersion wavelength.

A difference between the wavelength $\lambda_{00}$ of the optical multi-value signal corresponding to 00b and the wavelength $\lambda_{01}$ of the optical multi-value signal corresponding to 01b is 0.4 nm. In a similar manner, a difference between the wavelength $\lambda_{01}$ of the optical multi-value signal corresponding to 01b and the wavelength $\lambda_{10}$ of the optical multi-value signal corresponding to 10b is 0.4 nm. A difference between the wavelength $\lambda_{10}$ of the optical multi-value signal corresponding to 10b and the wavelength $\lambda_{11}$ of the optical multi-value signal corresponding to 11b is also 0.4 nm.

Figure 12B:
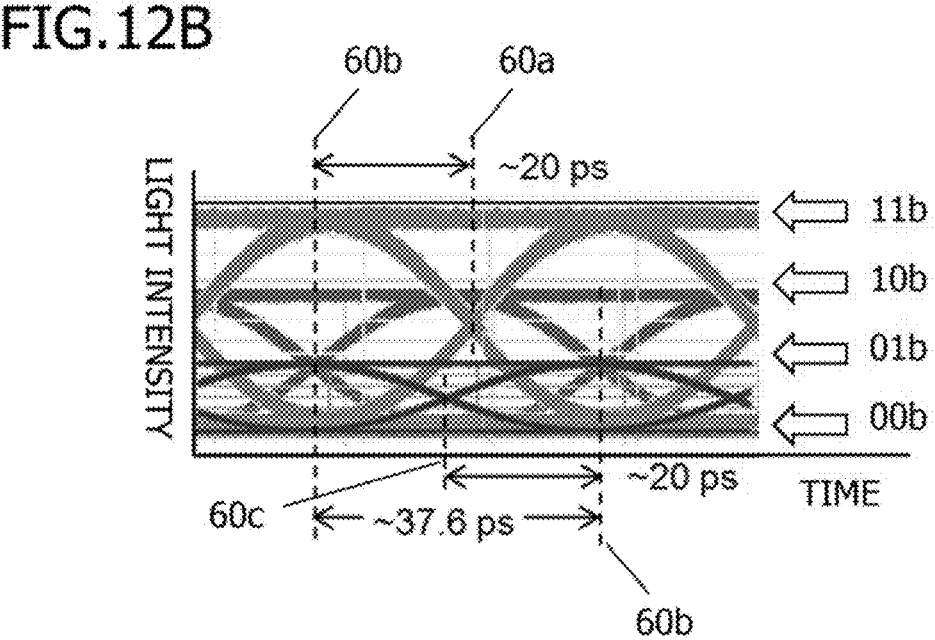

FIGS. 12A and 12B illustrate an eye pattern of optical multi-value signals evaluated under the conditions described above. FIG. 12A illustrates an eye pattern of the optical multi-value signals prior to incidence to the optical fiber. FIG. 12B illustrates an eye pattern of the optical multi-value signals having exited the optical fiber. Abscissas of FIGS. 12A and 12B represent time. Ordinates represent light intensity. Outlined arrows represent light intensities of optical multi-value signal. For example, the arrow on the left side of 11b indicates a position of the light intensity $L_{11}$ of a symbol corresponding to 11b.

As illustrated in FIG. 12A, the eye pattern prior to incidence to the optical fiber is fully opened. In other words, phases of the respective symbols are aligned. An interval of the symbols (in other words, a cycle of the optical multi-value signals) is 37.6 ps.

A first dashed line 60a in FIG. 12B depicts a rising position (or a falling position) of a symbol corresponding to 11b. A second dashed line 60b depicts a rising position (or a falling position) of a symbol corresponding to 10b. A third dashed line 60c depicts a rising position (or a falling position) of a symbol corresponding to 01b.

The symbol corresponding to 11b is advanced by approximately 20 ps relative to the symbol corresponding to 10b. On the other hand, the symbol corresponding to 01b is delayed by approximately 20 ps relative to the symbol corresponding to 10b. In other words, the symbol corresponding to 11b is advanced by approximately one cycle relative to the symbol corresponding to 01b. As a result, inter-code interference occurs and a code error takes place.

According to the first embodiment, by giving delays that differ from each another to the plurality of signals 16 outputted by the modulation mapping unit 4, a group delay time difference that occurs between symbols (for example, the optical pulses $P_{00}$ to $P_{11}$) with different levels can be compensated (refer to "(1) Configuration and operation"). Therefore, according to the optical transmission apparatus 2, a code error due to the group delay time difference that occurs between symbols with different levels can be suppressed.

(4) Suppression of Code Error by Dispersion Compensator

Figure 13:
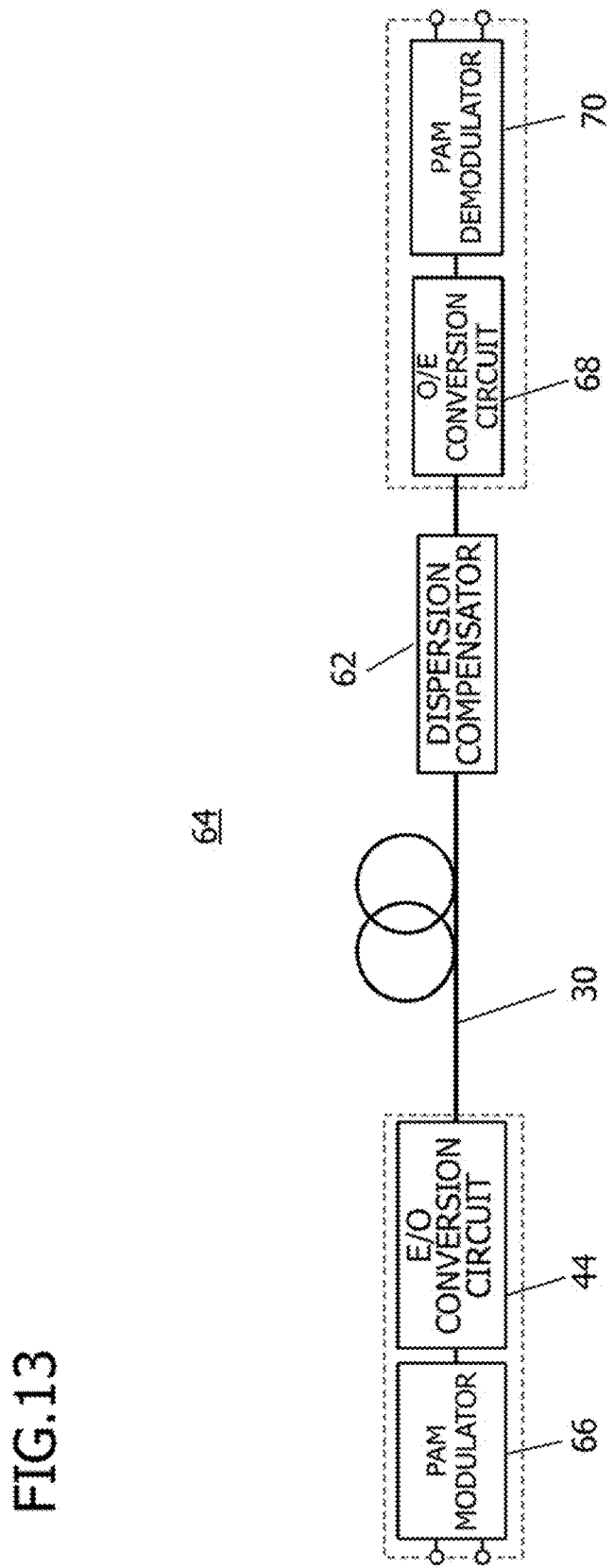
FIG. 13 illustrates an example of a system that suppresses the group delay time differences (in other words, the arrival time differences) with a dispersion compensator 62.

A group delay time difference can also be suppressed using a dispersion compensator. FIG. 13 illustrates an example of a system that suppresses the group delay time difference (in other words, the arrival time difference) with a dispersion compensator 62.

For example, the dispersion compensator 62 can be realized by a dispersion-compensating fiber or a chirped fiber Bragg grating. The dispersion compensator 62 may be a variable dispersion compensator in which a compensation amount is variable (for example, virtually imaged phase array: VIPA).

A system 64 illustrated in FIG. 13 includes a PAM modulator 66, the electric-optic conversion circuit 44, the optical transmission line 30, the dispersion compensator 62, an opto-electric conversion circuit 68, and a PAM demodulator 70.

The PAM modulator 66 converts a digital signal (for example, two NRZ signals) into an electric multi-value signal. The electric-optic conversion circuit 44 converts the electric multi-value signal outputted by the PAM modulator 66 into an optical multi-value signal by direct modulation of a semiconductor laser. The dispersion compensator 62 gives a time difference that is the inverse of the group delay time difference to the optical multi-value signals having passed through the optical transmission line 30. Due to the inverse time difference, the group delay time difference occurs between symbols with different levels is compensated.

The optical multi-value signal in which the group delay time difference has been compensated is converted into an electric multi-value signal by the opto-electric conversion circuit 68. The converted electric multi-value signal is subsequently converted into an electric binary signal (for example, two NRZ signals) by the PAM demodulator 70.

According to the system 64 illustrated in FIG. 13, the group delay time difference that occurs between symbols with different levels is compensated by the dispersion compensator 62. Therefore, an occurrence of a code error in the PAM demodulator 70 can be suppressed.

However, an insertion loss of the dispersion compensator 62 is approximately the same as a loss by the optical transmission line 30. For example, a loss of the dispersion compensator 62 (for example, a dispersion-compensating fiber) to compensate for the group delay time difference of a 10-km single-mode optical fiber is 6.3 dB. Such a great loss causes a signal-to-noise ratio (SNR) of an optical multi-value signal to deteriorate and increases a code error rate.

With a system using the optical transmission apparatus 2 according to the first embodiment, the optical transmission line 30 is directly connected to the opto-electric conversion circuit 68. Therefore, a code error rate of a system using the optical transmission apparatus 2 according to the first embodiment is lower than a code error rate of the system 64 using the dispersion compensator 62.

(5) Modified Examples

(5-1) First Modified Example

The optical transmission apparatus 2 illustrated in FIG. 7 realizes the plurality of skew units 6 (refer to FIG. 1) by the delay circuits 40. However, the plurality of skew units 6 may be realized by a digital signal processor (DSP).

Figure 14:
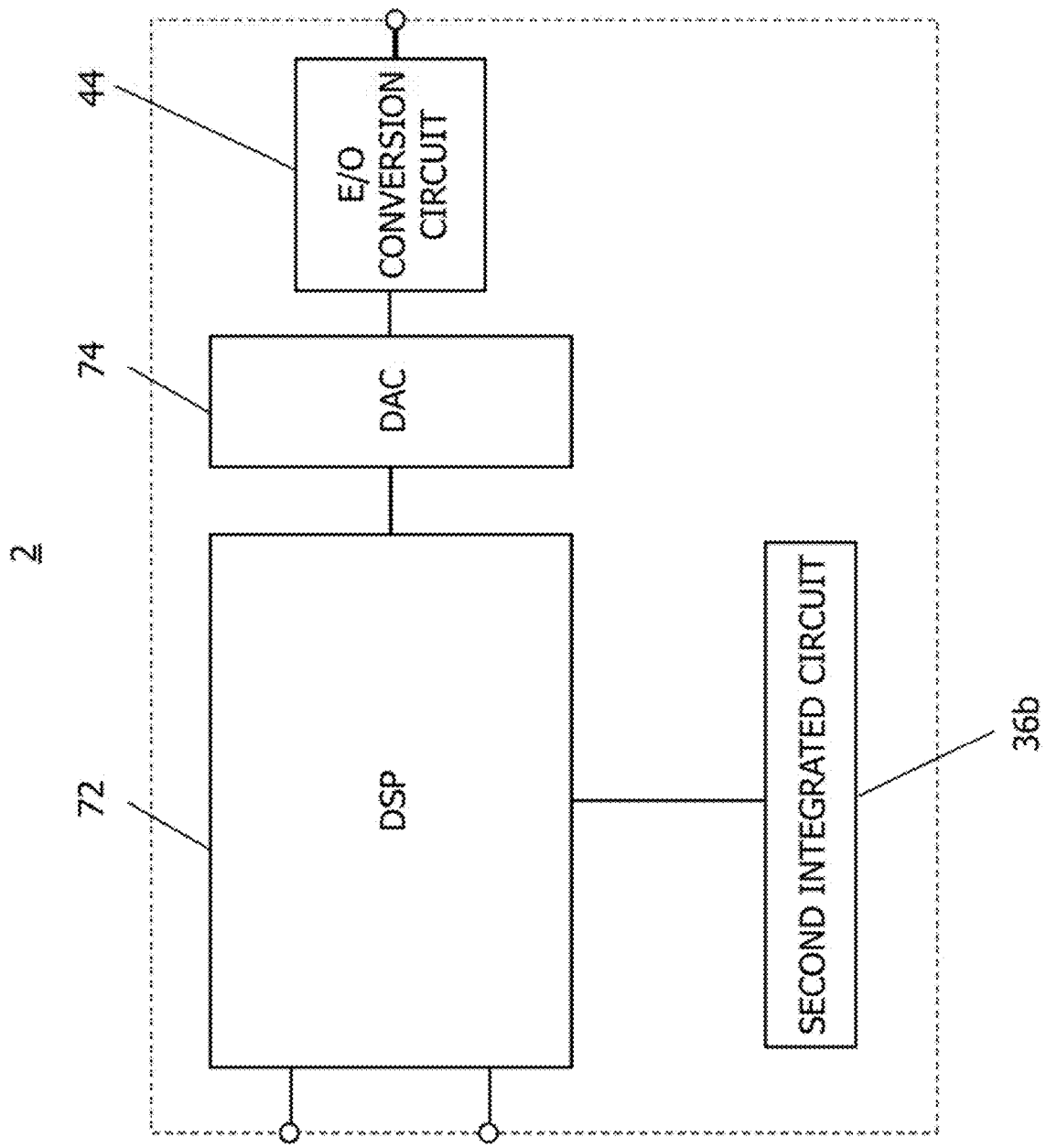
FIG. 14 is a diagram illustrating an example of the hardware configuration of the optical transmission apparatus 2 including a DSP 72.

FIG. 14 is a diagram illustrating an example of the hardware configuration of the optical transmission apparatus 2 including a DSP 72. The optical transmission apparatus 2 illustrated in FIG. 14 includes the DSP 72, a digital to analog converter (DAC) 74, the electric-optic conversion circuit 44, and the second integrated circuit 36b. The electric-optic conversion circuit 44 and the second integrated circuit 36b are the circuits respectively described earlier with reference to FIGS. 7 and 8.

The modulation mapping unit 4 (refer to FIG. 1), the plurality of skew units 6, and the addition unit 8 are realized by the DSP 72. The electric-optic conversion unit 10 is realized by the digital to analog converter (DAC) 74 and the electric-optic conversion circuit 44. The skew control unit 12 is realized by the second integrated circuit 36b.

The DSP 72 outputs the sum signal 20 in response to the digital signal 14 (refer to FIG. 2). The plurality of signals 16 (refer to FIG. 2) in the optical transmission apparatus 2 illustrated in FIG. 14 are a plurality of digitized signals (in other words, data). In a similar manner, the sum signal 20 in the optical transmission apparatus 2 illustrated in FIG. 14 is also a digitized signal.

The DAC 74 converts the digitized sum signal 20 into an electrical signal. The electric-optic conversion circuit 44 converts the electrical signal into the optical signal 22 and transmits the optical signal 22.

According to the optical transmission apparatus 2 illustrated in FIG. 14, a control method (refer to second to fourth embodiments) of a delay amount of the skew unit 6 can be changed by simply changing a program of the DSP 72. In addition, according to the optical transmission apparatus 2 illustrated in FIG. 14, the optical transmission apparatus 2 can be readily downsized.

(5-2) Second Modified Example

In the examples described above, the plurality of skew units 6 give delays to all of the plurality of signals 16 outputted from the modulation mapping unit 4. However, the plurality of skew units 6 may give delays only to a part of the plurality of signals 16 outputted from the modulation mapping unit 4.

In the example illustrated in FIG. 3, the strength given to the first signal $b_{00}$ is 0 with respect to all values (00b to 11b) indicated by the digital signal 14. Therefore, there is no difference between the sum signal 20 when delays is not given to the first signal $b_{00}$ and the sum signal 20 when a delay is given to the first signal $b_{00}$. Therefore, the plurality of skew units 6 may only give a delay to the second signal $b_{01}$ to the fourth signal $b_{11}$ among the plurality of signals 16.

Specifically, for example, the plurality of skew units 6 may only include the second skew unit $d_{01}$ to the fourth skew unit $d_{11}$ (refer to FIG. 2). According to the second modified example, the number of the plurality of skew units 6 can be reduced.

(5-3) Third Modified Example

In the examples described above, the addition unit 8 integrates all of the plurality of signals 16 outputted from the plurality of skew units 6, and generates the sum signal 20 as a result of the integrating. However, the addition unit 8 may integrate a part of the plurality of signals 16 outputted from the plurality of skew units 6, and generate the sum signal 20 as a result of the integrating.

Specifically, the addition unit 8 may integrate only the second signal $b_{01}$ to the fourth signal $b_{11}$ among the plurality of signals 16 outputted from the plurality of skew units 6. Since the strength of the first signal $b_{00}$ is 0, there is no difference between the sum signal 20 obtained by integrating all of the plurality of signals 16 and the sum signal 20 obtained by only integrating the second signal $b_{01}$ to the fourth signal $b_{11}$. Therefore, the addition unit 8 may integrate only the second signal $b_{01}$ to the fourth signal $b_{11}$ among the plurality of signals 16 that have been given delays.

According to the third modified example, the configuration of the addition unit 8 can be simplified.

(5-4) Fourth Modified Example

In the examples described above, when the optical multi-value signal transmitted by the optical transmission apparatus 2 is an n-value signal (where n is an integer equal to or greater than 3), the plurality of signals 16 outputted by the modulation mapping unit 4 correspond one-to-one with a plurality of integers that are equal to or greater than 0 and equal to or less than n−1. However, the plurality of signals 16 may be signals corresponding one-to-one with only a part of the plurality of integers that are equal to or greater than 0 and equal to or less than n−1.

For example, in the example illustrated in FIGS. 1 to 3, the plurality of signals 16 may be signals corresponding one-to-one with integers that are equal to or greater than 1 and equal to or less than 3 (a part of integers equal to or greater than 0 and equal to or less than 3). In this case, the signals 16 include the second signal $b_{01}$ to the fourth signal $b_{11}$.

Since the strength added to the first signal $b_{00}$ is 0, there is no difference between the sum signal 20 obtained by integrating the first signal $b_{00}$ to the fourth signal $b_{11}$ and the sum signal 20 obtained by integrating the second signal $b_{01}$ to the fourth signal $b_{11}$. Therefore, the plurality of signals 16 may be the second to signal $b_{01}$ to the fourth signal $b_{11}$, which correspond one-to-one with integers that are equal to or greater than 1 and equal to or less than 3.

According to the fourth modified example, the number of the plurality of skew units 6 can be reduced and, at the same time, the configurations of the modulation mapping unit 4 and the addition unit 8 can be simplified.

(6) Optical Transmission Method

As described above, in the first embodiment, strength according to the value that the digital signal 14 (in other words, the input signal 94) has is added (in other words, given) to a signal corresponding to the value. In addition, in the first embodiment, delays are given to the plurality of signals 16 that includes the signal. Furthermore, in the first embodiment, the plurality of signals 16, to which the strength is added and the delays are given, are added up to generate the sum signal 20. In addition, in the first embodiment, the sum signal 20 is converted into the optical signal 22 of which light intensity is modulated in accordance with the strength of the sum signal 20, and the optical signal 22 is transmitted thereafter. In the conversion of the optical signal 22 into the optical signal 22, the wavelength of the optical signal 22 varies in accordance with the light intensity of the sum signal 20.

According to the first embodiment, since delays can be given to the plurality of signals 16 outputted by the modulation mapping unit 4, a group delay time difference that occurs between symbols of the optical signal 22 can be compensated. Therefore, according to the first embodiment, the degradation of reception quality due to a group delay time difference of an optical multi-level signal of which wavelength varies in accordance with its light intensity (in other words, an optical multi-level signal due to direct modulation) can be suppressed.

Second Embodiment

An optical transmission apparatus 202 (refer to FIG. 15) according to a second embodiment is an apparatus that performs feedback control of delay amounts to be given to the plurality of signals 16. Otherwise, a configuration and the like of the optical transmission apparatus 202 according to the second embodiment are approximately the same as the configuration and the like of the optical transmission apparatus 2 according to the first embodiment. Therefore, descriptions of the same configuration and the like as those in the first embodiment will be either omitted or simplified.

(1) Configuration and Operation

Figure 15:
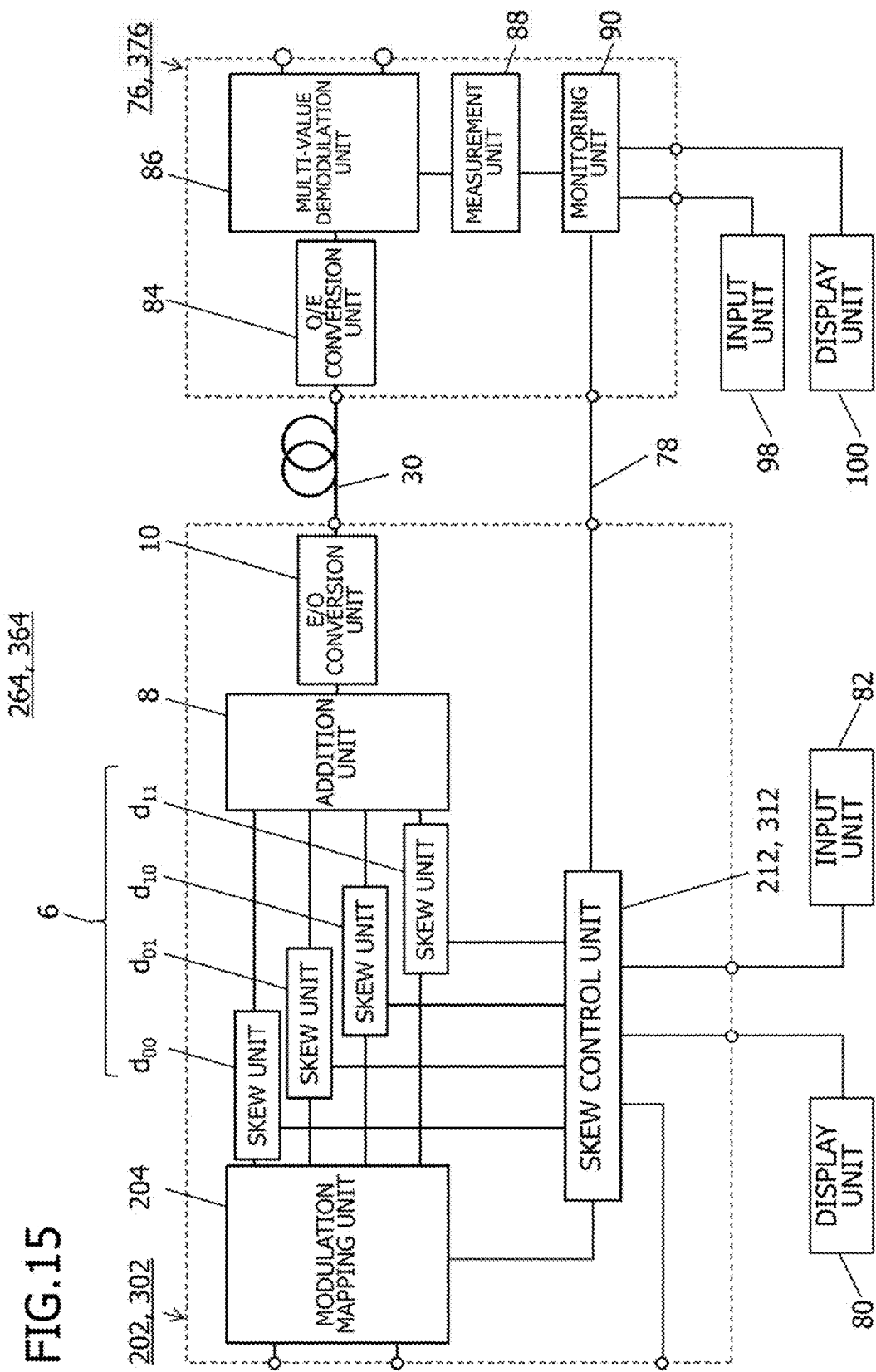
FIG. 15 is a diagram illustrating an example of a system 264 to which the optical transmission apparatus 202 according to the second embodiment has been applied.
Figure 16:
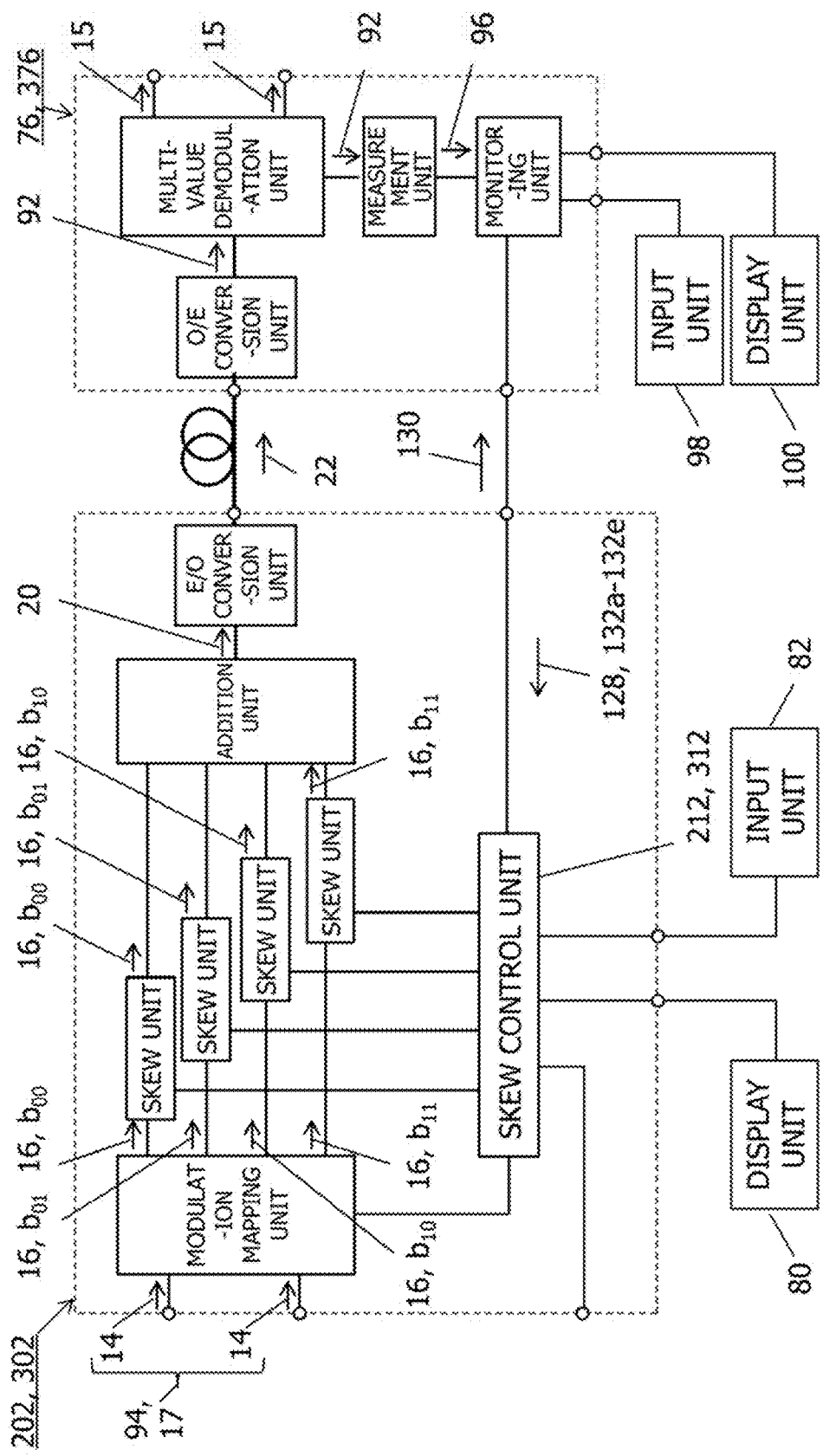
FIG. 16 is a diagram illustrating a flow of signals in FIG. 15.

FIG. 15 is a diagram illustrating an example of a system 264 to which the optical transmission apparatus 202 according to the second embodiment has been applied. FIG. 16 is a diagram illustrating a flow of signals in FIG. 15.

The system 264 includes the optical transmission apparatus 202, the optical transmission line 30, and an optical receiver 76 connected to the optical transmission apparatus 202 through the optical transmission line 30. For example, the optical transmission line 30 is a single-mode optical fiber.

(1-1) Optical Transmission Apparatus

For example, a skew control unit 212 of the optical transmission apparatus 202 is connected to the optical receiver 76 through a control line (for example, a metal cable) 78. Otherwise, the configuration of the optical transmission apparatus 202 is substantially the same as the configuration of the optical transmission apparatus 2 according to the first embodiment.

In the example illustrated in FIG. 15, an input unit 82 and a display unit 80 are connected to the skew control unit 212. For example, the input unit 82 and the display unit 80 can be used to input data for feedforward control to be described in a third embodiment. The input unit 82 and the display unit 80 may be omitted.

(1-2) Optical Receiver

The optical receiver 76 includes an opto-electric conversion unit 84, a multi-value demodulation unit 86, a measurement unit 88, and a monitoring unit 90. The opto-electric conversion unit 84 is connected to the electric-optic conversion unit 10 of the optical transmission apparatus 202 through the optical transmission line 30. The opto-electric conversion unit 84 converts the optical signal 22 (refer to FIG. 16) received through the optical transmission line 30 into a received signal 92 that is an electrical signal.

For example, the multi-value demodulation unit 86 demodulates the received signal 92 and outputs the digital signal 15 resulting from the demodulating.

The measurement unit 88 measures a code error rate (in other words, a bit error rate) of the received signal 92. The monitoring unit 90 monitors a code error rate 96 measured by the measurement unit 88 and sends out a command to the skew control unit 212 based on a change in the code error rate 96. An input unit 98 and a display unit 100 may be connected to the monitoring unit 90.

The digital signal 15 (refer to FIG. 16) outputted by the multi-value demodulation unit 86 (refer to FIG. 15) is a signal reproduced from the received signal 92. The signal reproduced is the input signal 94 of the optical transmission apparatus 202. The input signal 94 is a so-called real signal.

The code error rate measured by the measurement unit 88 is a code error rate of the reproduced digital signal 14, which is reproduced by the multi-value demodulation unit 86. Specifically, the code error rate measured by the measurement unit 88 is, for example, a code error rate of one of two binary signals included in the reproduced digital signal 14.

During adjustment of a delay amount (refer to "—Control—" below), the digital signal 14 is, for example, a test signal 17. After start of operation (refer to "—Start of operation (step S128)—"), the digital signal 14 is, for example, the input signal 94. The input signal 94 is a signal inputted to the optical transmission apparatus 202 from an external communication apparatus.

In the example illustrated in FIG. 16, the test signal 17 is an external signal supplied to the optical transmission apparatus 202 from outside of the optical transmission apparatus 202. However, the test signal 17 may be an internal signal generated inside the optical transmission apparatus 202.

—Control—

The skew control unit 212 adjusts a delay amount given to each of the plurality of skew units 6 based on reception quality (for example, the code error rate of the received signal 92) of the optical signal 22 received by the optical receiver 76. In other words, the skew control unit 212 executes feedback control.

The delay amount given to each skew unit 6 is, for example, 0 ps. The adjustment of the given delay amount (hereinafter, referred to as the adjustment of the delay amount) may be performed based on a signal-noise ratio of the received signal 92.

Specifically, for example, the skew control unit 212 adjusts the delay amounts to be given to the plurality of signals 16 in response to a command from the monitoring unit 90.

As described above, during the adjustment of the delay amount, instead of the input signal 94, the optical transmission apparatus 202 converts the test signal 17 (for example, two pseudorandom signals) into the optical signal 22 and outputs the optical signal 22.

The skew control unit 212 according to the second embodiment adjusts the delay amounts given to the plurality of skew units 6 by feedback control. Therefore, according to the second embodiment, the degradation of reception quality due to a group delay time difference of an optical multi-level signal of which wavelength varies in accordance with light intensity can be suppressed.

In the example presented below, described is the configuration and processes of the optical transmission apparatus 202 in which the test signal is an internal signal.

(2) Hardware

Figure 17:
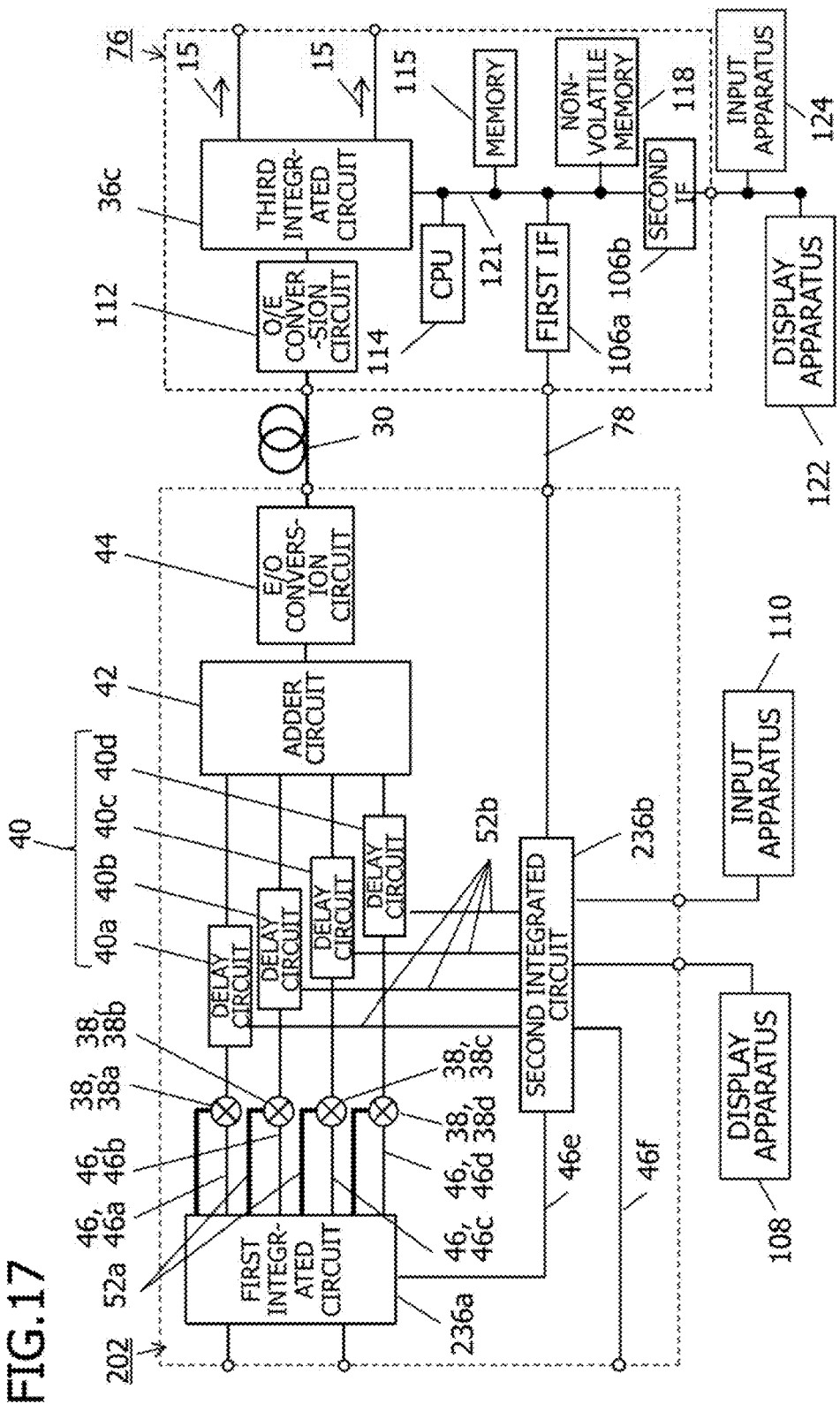
FIG. 17 is a diagram illustrating an example of a hardware configuration of the optical transmission apparatus 202 according to the second embodiment.
Figure 18:
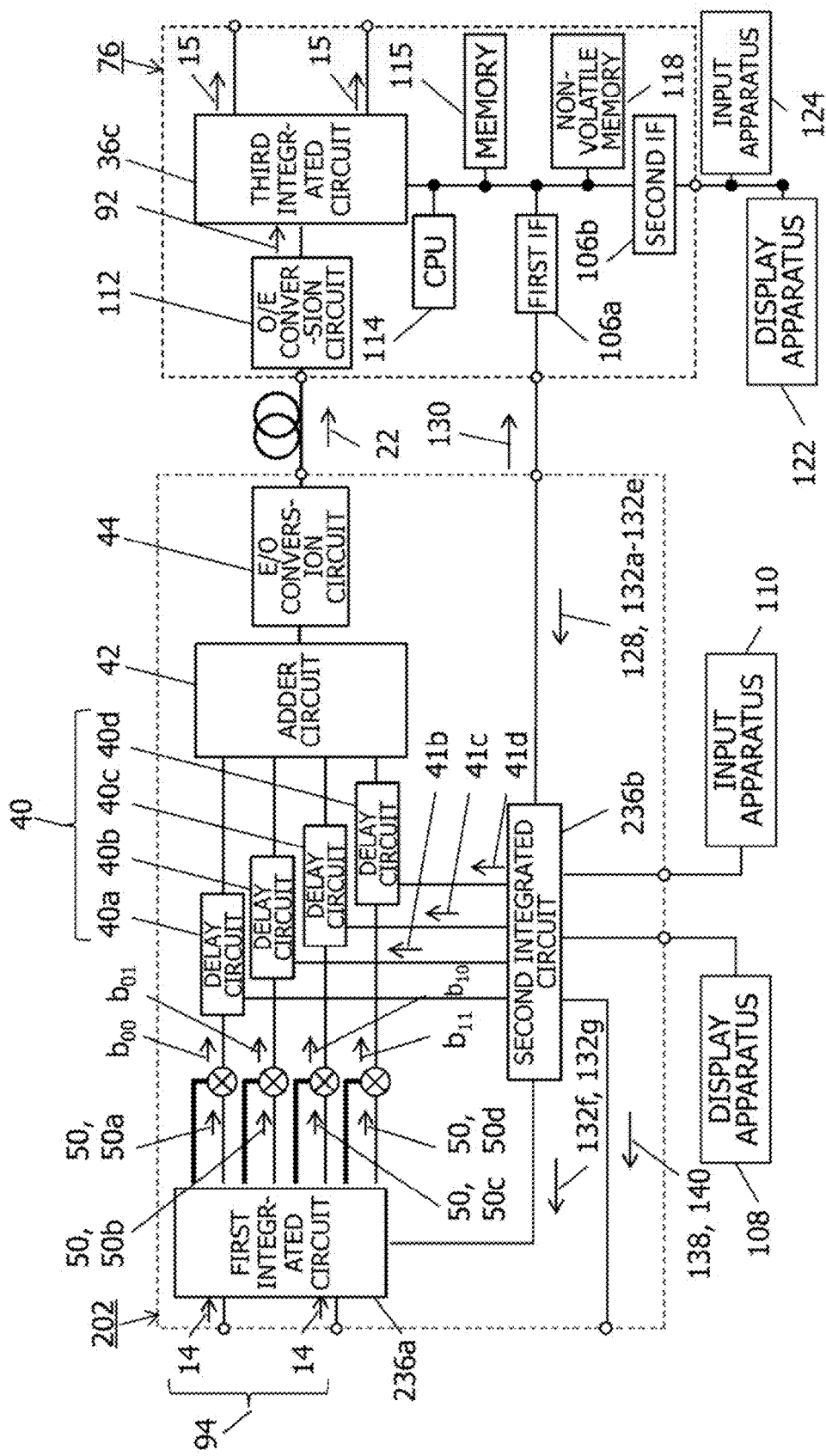
FIG. 18 is a diagram illustrating a flow of signals in FIG. 17.

FIG. 17 is a diagram illustrating an example of a hardware configuration of the optical transmission apparatus 202 according to the second embodiment. FIG. 17 also illustrates a hardware configuration of the optical receiver 76. FIG. 18 is a diagram illustrating a flow of signals in FIG. 17.

(2-1) Optical Transmission Apparatus 202

For example, a second integrated circuit 236b of the optical transmission apparatus 202 is connected to a first interface circuit 106a of the optical receiver 76 through the control line 78. The second integrated circuit 236b is further connected to a first integrated circuit 236a through a fifth signal line 46e. The second integrated circuit 236b is further connected through a sixth signal line 46f to a communication apparatus (not illustrated) that transmits the input signal 94.

The second integrated circuit 236b may be connected to a display apparatus 108 and an input apparatus 110. Otherwise, the hardware configuration of the optical transmission apparatus 202 is substantially the same as the hardware configuration of the optical transmission apparatus 2 according to the first embodiment. The display apparatus 108 and the input apparatus 110 may be omitted.

For example, the input apparatus 110 is an apparatus that includes a keyboard and a pointing device such as a mouse (a similar description applies to an input apparatus 124 to be described later). For example, the display apparatus 108 is a liquid crystal display (a similar description applies to a display apparatus 122 to be described later).

The skew control unit 212 is realized by the second integrated circuit 236b. The display unit 80 (refer to FIG. 15) is realized by the display apparatus 108 (a similar description applies to the display unit 100 to be described later). The input unit 82 is realized by the input apparatus 110 (a similar description applies to the input apparatus 124 to be described later).

In the example illustrated in FIG. 17, the optical transmission apparatus 202 is realized by the first integrated circuit 236a and the like. Alternatively, the optical transmission apparatus 202 may be realized by the DSP 72 and the like in a similar manner to the first modified example (refer to FIG. 14) of the first embodiment.

(2-2) Optical Receiver 76

For example, the optical receiver 76 includes an opto-electric conversion circuit 112, a third integrated circuit 36c, a central processing unit (hereafter, referred to as CPU) 114, a memory 115, and a non-volatile memory 118. The optical receiver 76 further includes the first interface circuit 106a, a second interface circuit 106b, and a bus 121. The CPU 114 (processor) is a piece of hardware.

The opto-electric conversion circuit 112 is, for example, a circuit including a photodiode and a trans-impedance amplifier (hereafter, referred to as TIA). The third integrated circuit 36c, the CPU 114, the memory 115, the non-volatile memory 118, the first interface circuit 106a, and the second interface circuit 106b are connected to each other through the bus 121. The optical receiver 76 may be connected to the input apparatus 124 and the display apparatus 122 through the second interface circuit 106b.

The third integrated circuit 36c is, for example, an ASIC or an FPGA. For example, the memory 115 is a random access memory (hereafter, referred to as RAM). For example, the non-volatile memory 118 is a flash memory. A monitoring program to be described later is recorded in the non-volatile memory 118.

For example, the opto-electric conversion unit 84 (refer to FIG. 15) is realized by the opto-electric conversion circuit 112. For example, the multi-value demodulation unit 86 is realized by the third integrated circuit 36c. For example, the monitoring unit 90 and the measurement unit 88 are realized by the CPU 114 and the memory 115.

(3) Processes (3-1) Process of Optical Receiver

Figure 19:
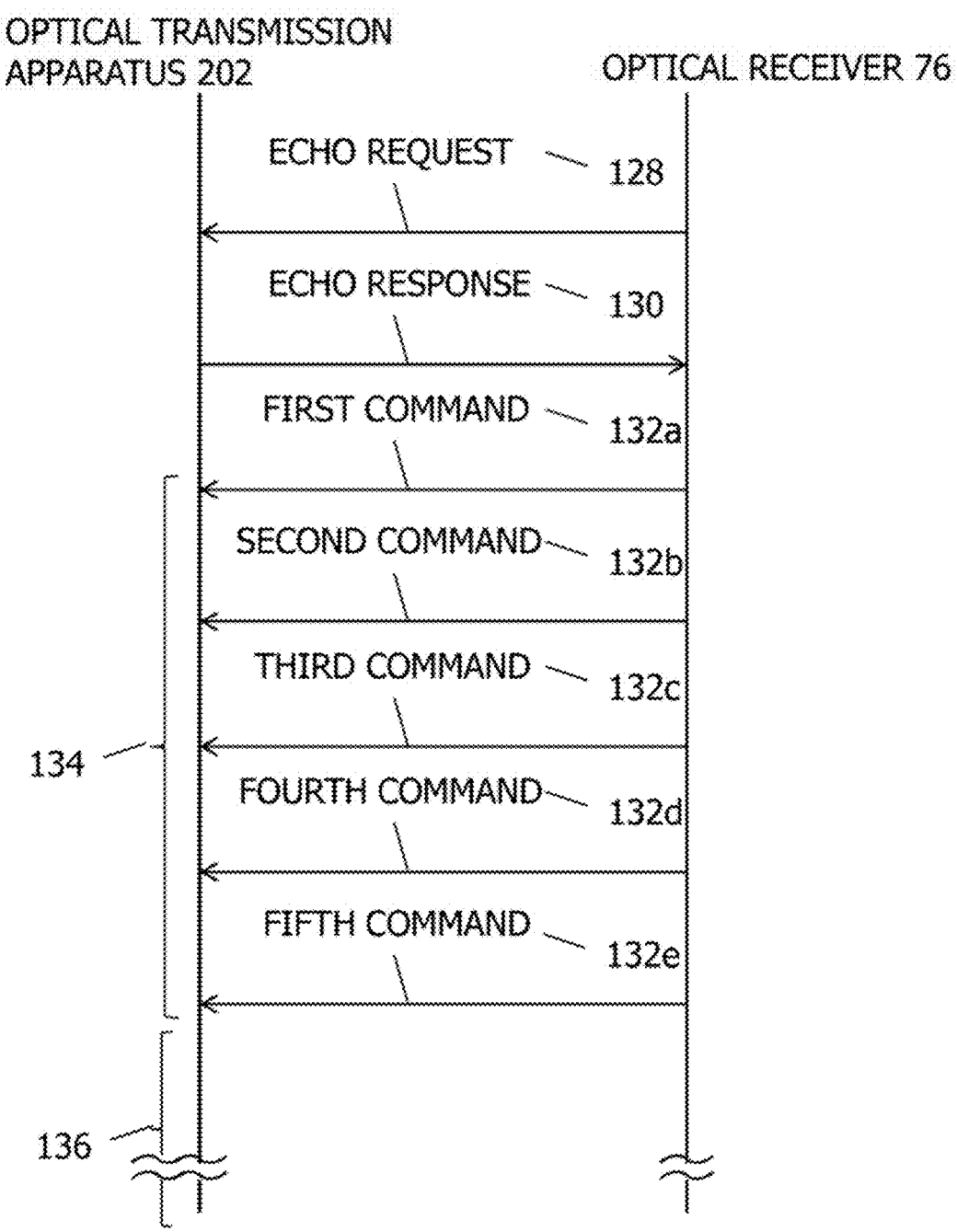
FIG. 19 is a sequence diagram illustrating a flow of a process executed by the optical transmission apparatus 202 in cooperation with the optical receiver 76.

FIG. 19 is a sequence diagram illustrating a flow of a process executed by the optical transmission apparatus 202 in cooperation with the optical receiver 76. FIG. 19 illustrates a flow of commands and the like transmitted and received through the control line 78. An echo request 128, an echo response 130, and a first command 132a to a fifth command 132e are transmitted and received through the control line 78.

Figure 20:
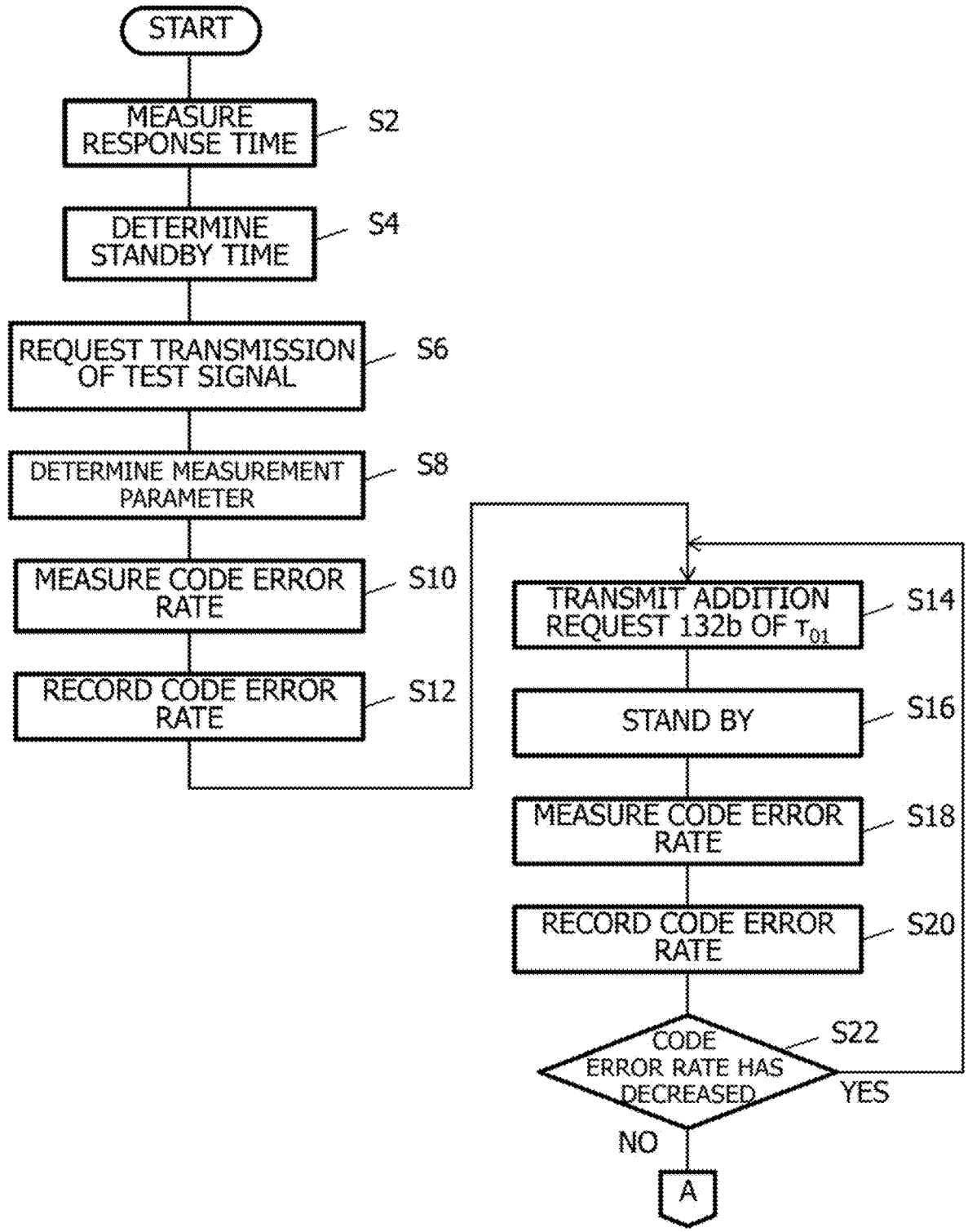
FIG. 20 is a flow chart of the monitoring program executed by the monitoring unit 90 and the measurement unit 88.
Figure 21:
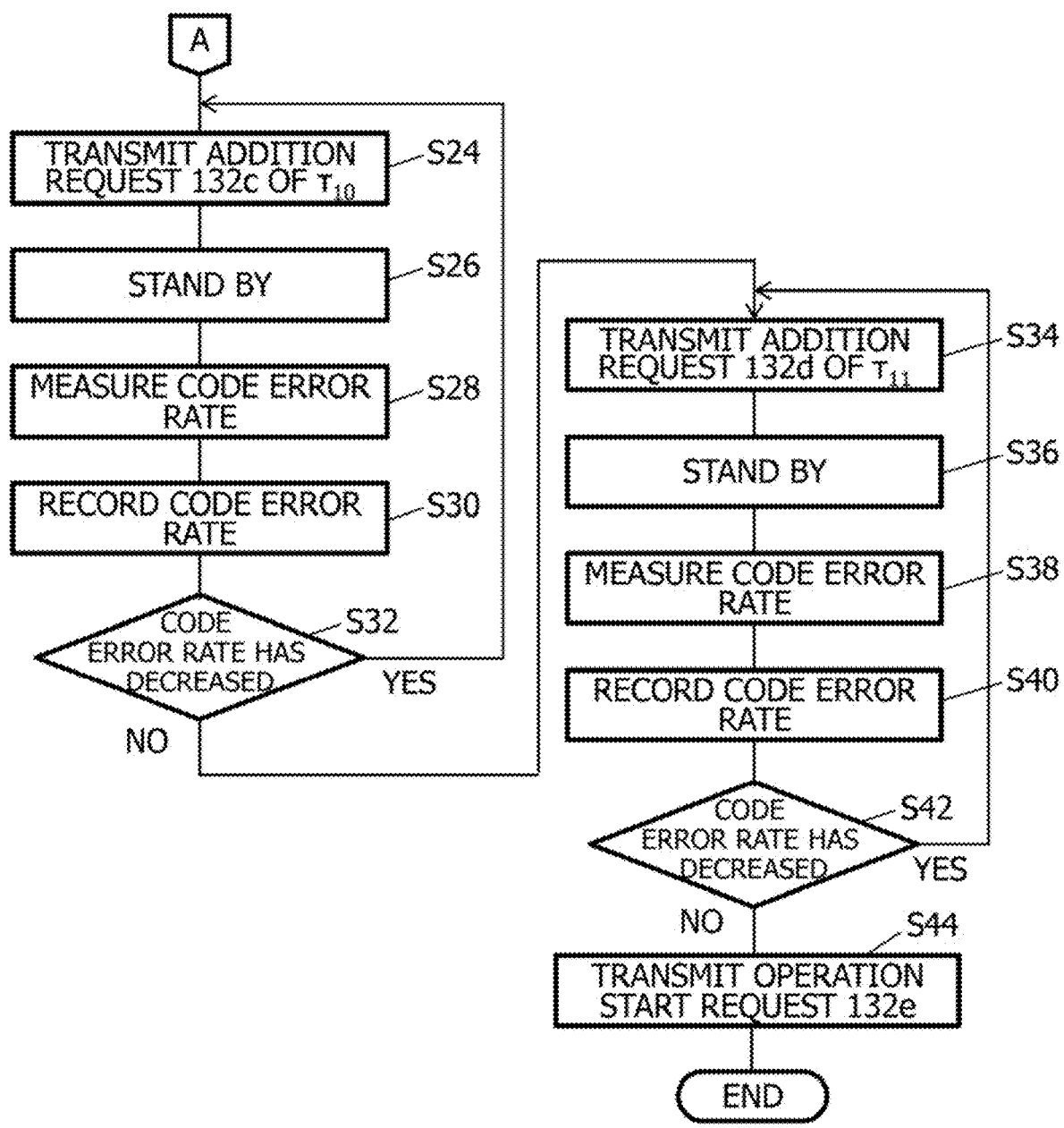
FIG. 21 is a flow chart of the monitoring program executed by the monitoring unit 90 and the measurement unit 88.

FIGS. 20 and 21 are flow charts of the monitoring program executed by the monitoring unit 90 and the measurement unit 88. For example, the monitoring program is recorded in the non-volatile memory 118.

—Start of Monitoring Program—
The CPU 114 reads the monitoring program from the non-volatile memory 118 and deploys the monitoring program on the memory 115 in response to a start instruction operation. Subsequently, the CPU 114 sequentially executes processes included in the monitoring program. The start instruction operation is, for example, an operation with respect to the input apparatus 124.

—Measurement of Response Time (Step S2)—
The CPU 114 measures a response time of the optical transmission apparatus 202 (refer to FIG. 20).

Specifically, for example, the echo request 128 (refer to FIG. 19) is transmitted using a ping tool, and a time interval between the transmission of the echo request 128 and reception of the echo response 130 is measured. The echo response 130 is sent back through the control line 78.

Step S2 is executed by the monitoring unit 90.

—Determination of Standby Time (Step S4)—
After step S2, the CPU 114 determines a standby time used in step S16 and the like based on the response time measured in step S2.

The standby time is, for example, a time that is longer than a period between transmission of a command by the optical receiver 76 and reception of a test signal converted into the optical signal 22. Here, the command transmitted by the optical receiver 76 is each of the second command 132b to the fourth command 132d.

Step S4 is executed by the monitoring unit 90.

—Request for Transmission of Test Signal (Step S6)—
After step S4, the CPU 114 transmits the first command 132a to the optical transmission apparatus 202 through the control line 78. The first command 132a is a command for requesting the optical transmission apparatus 202 to transmit a test signal.

The test signal is a signal for measuring a code error rate. In response to the first command 132a, the optical transmission apparatus 202 converts the test signal into the optical signal 22 and transmits the optical signal 22 to the optical receiver 76. The optical transmission apparatus 202 continues transmission of the test signal until the fifth command 132e (refer to FIG. 19) is received.

Step S6 is executed by the monitoring unit 90.

—Determination of Measurement Parameter (Step S8)—

After step S6, the CPU 114 determines parameters for measuring a code error rate.

Specifically, the CPU 114 first acquires the test signal transmitted by the optical transmission apparatus 202 through the opto-electric conversion circuit 112 and the third integrated circuit 36c. In other words, the CPU 114 acquires a test signal as the received signal 92, which is obtained by conversion of a signal (e.g. the test signal) into the optical signal 22 and opto-electric conversion thereof by the opto-electric conversion circuit 112. The received signal 92 is digitized by the third integrated circuit 36c and send to the CPU 114 through the bus 121.

The CPU 114 further determines parameters for measuring a code error rate based on the acquired test signal. For example, the CPU 114 determines determination-values of amplitudes for determining code levels of a multi-value signal (in other words, values of the multi-value signal). The CPU 114 further determines a determination-value of a phase.

Step S8 is executed by the measurement unit 88.

—Measurement of Code Error Rate (Step S10)—

After step S8, based on the determination-values determined in step S8, the CPU 114 measures a code error rate of the received signal 92 (a similar description applies to steps S18, S28, and S38). Step S10 is executed by the measurement unit 88.

—Recording of Code Error Rate (Step S12)—

After step S10, the CPU 114 records the measured code error rate in the memory 115. Step S12 is executed by the monitoring unit 90.

—Transmission of Addition Request (Second Command 132b) (Step S14)—

The CPU 114 transmits the second command 132b to the second integrated circuit 236b through the control line 78. The second command 132b is a command for requesting the optical transmission apparatus 202 to increase the second delay amount $\tau_{01}$. Step S14 is executed by the monitoring unit 90.

—Measurement and Recording of Code Error Rate (Steps S16 to S20)—

After step S14, the CPU 114 temporarily stands by (step S16). The time for which the CPU 114 stands by is the standby time determined in step S4 (a similar description applies to steps S26 and S36). Step S16 is executed by the monitoring unit 90.

After step S16, the CPU 114 measures a code error rate of the received signal 92 (step S18). Step S18 is executed by the measurement unit 88.

After step S18, the CPU 114 records the code error rate measured in step S18 in the memory 115 (step S20). Step S20 is executed by the monitoring unit 90.

—Determination (step S22)—

After step S20, the CPU 114 reads a code error rate $E_f$ recorded last and a code error rate $E_{f-1}$ recorded immediately before the code error rate $E_f$ from the memory 115. The CPU 114 further determines whether or not the code error rate $E_f$ is smaller than the code error rate $E_{f-1}$.

When the code error rate $E_f$ is smaller than the code error rate $E_{f-1}$, the CPU 114 returns to step S14. When the code error rate $E_f$ is equal to or greater than the code error rate $E_{f-1}$, the CPU 114 advances to step S24. Step S22 is executed by the monitoring unit 90.

—Transmission of Addition Request (Third Command 132c) (Step S24)—

The CPU 114 transmits the third command 132c to the second integrated circuit 236b through the control line 78. The third command 132c is a command for requesting the optical transmission apparatus 202 to increase the third delay amount $\tau_{10}$. Step S24 is executed by the monitoring unit 90.

—Standby (step S26)—

After step S24, the CPU 114 temporarily stands by. Step S26 is executed by the monitoring unit 90.

—Measurement of Code Error Rate (Step S28)—

After step S26, the CPU 114 measures a code error rate of the received signal 92. Step S28 is executed by the measurement unit 88.

—Recording of Code Error Rate (Step S30)—

After step S28, the CPU 114 records the code error rate measured in step S28 in the memory 115. Step S30 is executed by the monitoring unit 90.

—Determination (Step S32)—

After step S30, the CPU 114 reads a code error rate $E_f$ recorded last and a code error rate $E_{f-1}$ recorded immediately before the code error rate $E_f$ from the memory 115. The CPU 114 further determines whether or not the code error rate $E_f$ is smaller than the code error rate $E_{f-1}$.

When the code error rate $E_f$ is smaller than the code error rate $E_{f-1}$, the CPU 114 returns to step S24. When the code error rate $E_f$ is equal to or greater than the code error rate $E_{f-1}$, the CPU 114 advances to step S34. Step S32 is executed by the monitoring unit 90.

—Transmission of Addition Request (Fourth Command 132d) (Step S34)—

The CPU 114 transmits the fourth command 132d to the second integrated circuit 236b through the control line 78. The fourth command 132d is a command for requesting the optical transmission apparatus 202 to increase the fourth delay amount $\tau_{11}$. Step S34 is executed by the monitoring unit 90.

—Standby (step S36)—

After step S34, the CPU 114 temporarily stands by. Step S36 is executed by the monitoring unit 90.

—Measurement of Code Error Rate (Step S38)—

After step S36, the CPU 114 measures a code error rate of the received signal 92. Step S38 is executed by the measurement unit 88.

—Recording of Code Error Rate (Step S40)—

After step S38, the CPU 114 records the code error rate measured in step S38 in the memory 115. Step S40 is executed by the monitoring unit 90.

—Determination (Step S42)—

The CPU 114 reads a code error rate $E_f$ recorded last and a code error rate $E_{f-1}$ recorded immediately before the code error rate $E_f$ from the memory 115. The CPU 114 determines whether or not the code error rate $E_f$ is smaller than the code error rate $E_{f-1}$. When the code error rate $E_f$ is smaller than the code error rate $E_{f-1}$, the CPU 114 returns to step S34. When the code error rate $E_f$ is equal to or greater than the code error rate $E_{f-1}$, the CPU 114 advances to step S44. Step S42 is executed by the monitoring unit 90.

—Transmission of Operation Start Request (Step S44)—

The CPU 114 transmits the fifth command 132e to the second integrated circuit 236b through the control line 78. The fifth command 132e is a command for requesting the optical transmission apparatus 202 to end transmission of the test signal and to start transmission of the input signal 94.

For example, the input signal 94 is the digital signal 14 that is transmitted by a communication apparatus and received by a modulation mapping unit 204 (refer to FIG. 15). The input signal 94 is a signal that differs from a test signal. Step S44 is executed by the monitoring unit 90.

Then, the monitoring program ends.

Due to the transmission of the fifth command 132e, an operation period 136 (refer to FIG. 19) is started.

The order to execute steps S14 to S22, steps S24 to S32, and steps S34 to S42 can be mutually exchanged.

(3-2) Process of Optical Transmission Apparatus

Figure 22:
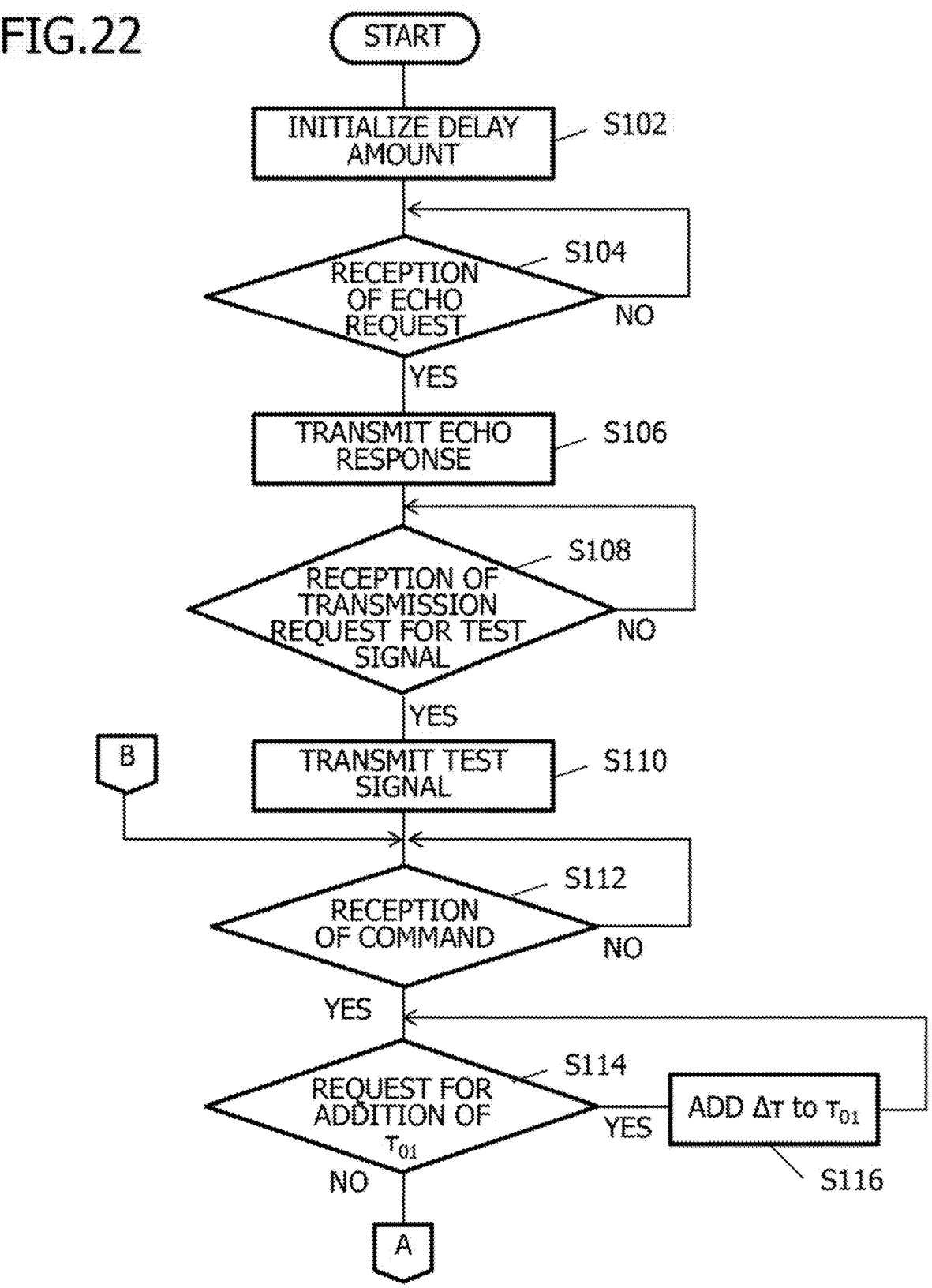
FIG. 22 is a diagram illustrating a flow of a process executed by the optical transmission apparatus 202.
Figure 23:
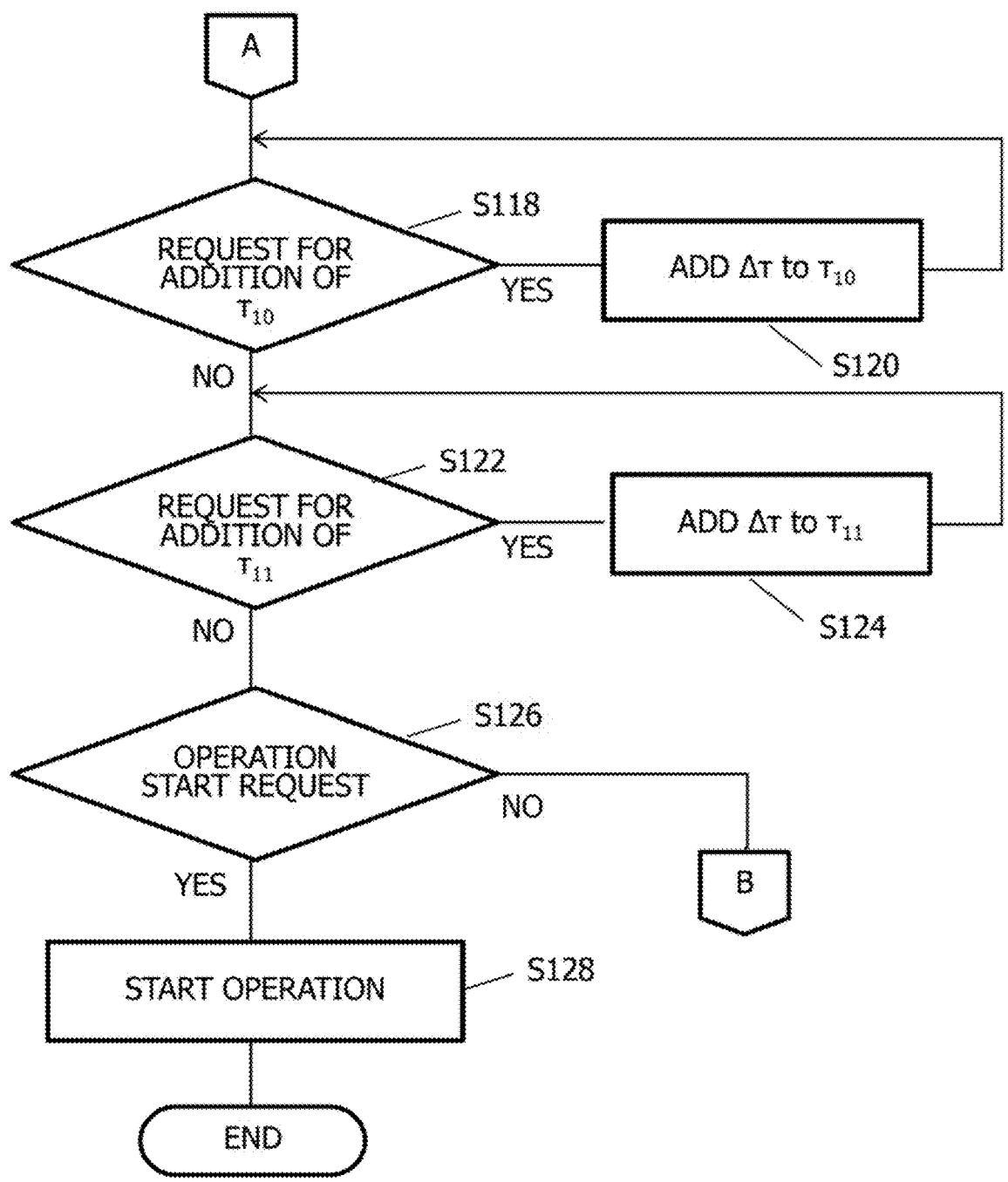
FIG. 23 is a diagram illustrating a flow of a process executed by the optical transmission apparatus 202.

FIGS. 22 and 23 are diagrams illustrating a flow of a process executed by the optical transmission apparatus 202.

—Initialization of Delay Amount (Step S102)—

The second integrated circuit 236b (in other words, the skew control unit 212) gives a certain delay amount to each of the plurality of delay circuits 40. For example, the second integrated circuit 236b gives a delay amount of 0 ps to each of the plurality of delay circuits 40.

Specifically, for example, the second integrated circuit 236b transmits a reset signal to each of the plurality of delay circuits 40 through the second control line 52b (refer to FIG. 17), and sets the delay amount of each of the plurality of delay circuits 40 to 0 ps as a result of the transmitting. The second control line 52b is a signal line.

Step S102 is executed by the skew control unit 212.

—Reception of Echo Request (Step S104)—

After step S102, the second integrated circuit 236b stands by until the echo request 128 is received. Step S102 is executed by the skew control unit 212.

—Transmission of Echo Response (Step S106)—

After step S104, the second integrated circuit 236b transmits the echo response 130 to the monitoring unit 90 through the control line 78. Step S106 is executed by the skew control unit 212.

—Reception of Request for Transmission of Test Signal (Step S108)—

After step S106, the second integrated circuit 236b stands by until the first command 132a is received. The first command 132a is a command for requesting the optical transmission apparatus 202 to transmit a test signal converted into the optical signal 22. Due to the reception of the first command 132a, an adjustment period 134 (refer to FIG. 19) is started.

Step S108 is executed by the skew control unit 212.

—Transmission of Test Signal (Step S110)—

After step S108, in cooperation with the first integrated circuit 236a and the like, the second integrated circuit 236b converts a test signal into the optical signal 22 and transmits the optical signal 22 to the optical receiver 76 through the optical transmission line 30.

Specifically, for example, the second integrated circuit 236b sends out a sixth command 132f (refer to FIG. 18) to the first integrated circuit 236a in response to the first command 132a. The second integrated circuit 236b further transmits a signal 138 (for example, a disable signal) to a communication apparatus connected to the optical transmission apparatus 202, where the signal 138 is a signal that prohibits transmission of the digital signal 14.

In response to the sixth command 132f, the first integrated circuit 236a reads the two pseudorandom signals (in other words, two Pseudo Random Binary Sequences) recorded in an internal memory (a memory inside the first integrated circuit 236a). The first integrated circuit 236a converts the two read pseudorandom signals into a plurality of electrical signals 50, and outputs the electrical signals 50 in parallel. Specifically, a 2-bit signal having one of the two pseudorandom signals as an MSB and the other as an LSB is converted into the electrical signals 50. The 2-bit signal is an example of a test signal.

The plurality of multiplier circuits 38, the plurality of delay circuits 40, the adder circuit 42, and the electric-optic conversion circuit 44 cooperate with one another to convert the plurality of electrical signals 50 into the optical signal 22 and to transmit the optical signal 22.

In the example described above, the test signal is the two pseudorandom signals generated by the first integrated circuit 236a. The test signal 17 (refer to FIG. 16) may be two pseudorandom signals inputted from outside of the optical transmission apparatus 202 to the first integrated circuit 236a.

Step S110 is executed by the skew control unit 212, the modulation mapping unit 204, the plurality of skew units 6, the addition unit 8, and the electric-optic conversion unit 10.

—Determination of Command Reception (Step S112)—

After step S110, the second integrated circuit 236b stands by until a command is received from the monitoring unit 90. The second integrated circuit 236b advances to step S114 when receiving a command.

Step S112 is executed by the skew control unit 212.

—Determination of Command (Step S114)—

After step S112, the second integrated circuit 236b determines whether or not the command received in step S112 is the second command 132b. The second command 132b is a command for requesting an addition to the second delay amount $\tau_{01}$.

When the command received in step S112 is the second command 132b, the second integrated circuit 236b advances to step S116. When the command received in step S112 is not the second command 132b, the second integrated circuit 236b advances to step S118.

Step S114 is executed by the skew control unit 212.

—Addition to Second Delay Amount $\tau_{01}$ (S116)—

The second integrated circuit 236b cooperates with the second delay circuit 40b to add $\Delta\tau$ to the second delay amount $\tau_{01}$ to be given to the second electrical signal 50b (it corresponds to the second signal $b_{01}$), where the second electrical signal 50b is one of the plurality of the electrical signals 50 outputted from the plurality of multiplier circuits 38. The second delay amount $\tau_{01}$ after the addition is $\tau_{01}+\Delta\tau$. After step S116, the second integrated circuit 236b returns to step S114. The increment $\Delta\tau$ of the delay amount is, for example, 0.01 to 0.1 ps.

Specifically, for example, the second integrated circuit 236b sends out a second control signal 41b to the second delay circuit 40b. The second delay circuit 40b adds $\Delta\tau$ to the second delay amount $\tau_{01}$ in response to the second control signal 41b.

Step S116 is executed by the skew control unit 212 (FIG. 15) and the second skew unit $d_{01}$.

—Determination of Command (S118)—

The second integrated circuit 236b determines whether or not the command received in step S112 is the third command 132c. The third command 132c is a command for requesting an addition to the third delay amount $\tau_{10}$.

When the command received in step S112 is the third command 132c, the second integrated circuit 236b advances to step S120. When the command received in step S112 is not the third command 132c, the second integrated circuit 236b advances to step S122.

Step S118 is executed by the skew control unit 212.

—Addition to Third Delay Amount $\tau_{10}$ (S120)—

The second integrated circuit 236b cooperates with the third delay circuit 40c to add $\Delta\tau$ to the third delay amount $\tau_{10}$ to be given to the third electrical signal 50c (it corresponds to the third signal $b_{10}$), where the third electrical signal 50c is one of the plurality of the electrical signals 50 outputted from the plurality of multiplier circuits 38. The third delay amount $\tau_{10}$ after the addition is $\tau_{10}+\Delta\tau$.

After step S120, the second integrated circuit 236b returns to step S118. The increment $\Delta\tau$ of the delay amount is, for example, 0.01 to 0.1 ps.

Specifically, for example, the second integrated circuit 236b sends out a third control signal 41c to the third delay circuit 40c. The third delay circuit 40c adds $\Delta\tau$ to the third delay amount $\tau_{10}$ in response to the third control signal 41c.

Step S120 is executed by the skew control unit 212 and the third skew unit $d_{10}$.

—Determination of Command (S122)—

The second integrated circuit 236b determines whether or not the command received in step S112 is the fourth command 132d. The fourth command 132d is a command for requesting an addition to the fourth delay amount $\tau_{11}$.

When the command received in step S112 is the fourth command 132d, the second integrated circuit 236b advances to step S124. When the command received in step S112 is not the fourth command 132d, the second integrated circuit 236b advances to step S126.

Step S122 is executed by the skew control unit 212.

—Addition to Fourth Delay Amount $\tau_{11}$ (S124)—

The second integrated circuit 236b cooperates with the fourth delay circuit 40d to add $\Delta\tau$ to the fourth delay amount $\tau_{11}$ to be given to the fourth electrical signal 50d (it corresponds to the fourth signal $b_{11}$), where the fourth electrical signal 50d is one of the plurality of the electrical signals 50 outputted from the multiplier circuits 38. The fourth delay amount $\tau_{11}$ after the addition is $\tau_{11}+\Delta\tau$.

After step S124, the second integrated circuit 236b returns to step S122. The increment $\Delta\tau$ of the delay amount is, for example, 0.01 to 0.1 ps.

Specifically, for example, the second integrated circuit 236b sends out a fourth control signal 41d to the fourth delay circuit 40d. The fourth delay circuit 40d adds $\Delta\tau$ to the fourth delay amount $\tau_{11}$ in response to the fourth control signal 41d.

Step S124 is executed by the skew control unit 212 and the fourth skew unit $d_{11}$.

—Determination of Command (Step S126)—

The second integrated circuit 236b determines whether or not the command received in step S112 is the fifth command 132e. The fifth command 132e is a command for requesting the optical transmission apparatus 202 to start operation.

When the command received in step S112 is the fifth command 132e, the second integrated circuit 236b advances to step S128. When the command received in step S112 is not the fifth command 132e, the second integrated circuit 236b returns to step S112.

Step S126 is executed by the skew control unit 212.

—Start of Operation (Step S128)—

The second integrated circuit 236b causes the first integrated circuit 236a to end output of the test signal. The second integrated circuit 236b further permits a apparatus connected to the optical transmission apparatus 202 to transmit the digital signal 14. The first integrated circuit 236a outputs a plurality of electrical signals 50 in response to the digital signal 14.

Specifically, for example, the second integrated circuit 236b sends out a seventh command 132g to the first integrated circuit 236a. The first integrated circuit 236a ends output of the test signal in response to the seventh command 132g.

The second integrated circuit 236b further transmits a signal 140 (for example, an enable signal) to the communication apparatus connected to the optical transmission apparatus 202. Here, the signal 140 is a signal that permits transmission of the digital signal 14. The first integrated circuit 236a outputs a plurality of electrical signals 50 in response to the digital signal 14 from the communication apparatus.

Step S128 is executed by the skew control unit 212.

The order to execute steps S114 to S116, steps S118 to S120, steps S122 to S124, and steps S126 to S128 can be mutually exchanged.

The second integrated circuit 236b continues to increase the second delay amount $\tau_{01}$ in steps S112 to S126 (in particular, in steps S114 to S116) until reduction of the code error rate of the received signal 92 ceases. In other words, the skew control unit 212 adjusts the certain second delay amount $\tau_{01}$ (for example, 0 ps) given to the second skew unit $d_{01}$ based on reception quality of the optical signal 22.

In a similar manner, the skew control unit 212 adjusts the certain third delay amount $\tau_{10}$ (0 ps) given to the third skew unit $d_{10}$ based on reception quality (for example, a code error rate) of the optical signal 22. The skew control unit 212 further adjusts the certain fourth delay amount $\tau_{11}$ (0 ps) given to the fourth skew unit $d_{11}$ based on reception quality (for example, a code error rate) of the optical signal 22.

The adjustment of each delay amount is feedback control based on reception quality of the optical signal 22. Due to the feedback control, group delay time differences between symbols (in other words, smallest units of the optical signal 22) of which light intensities differs from each other are compensated and the deterioration of the reception quality of the optical signal 22 is suppressed.

(4) Modified Examples (4-1) First Modified Example

Figure 24:
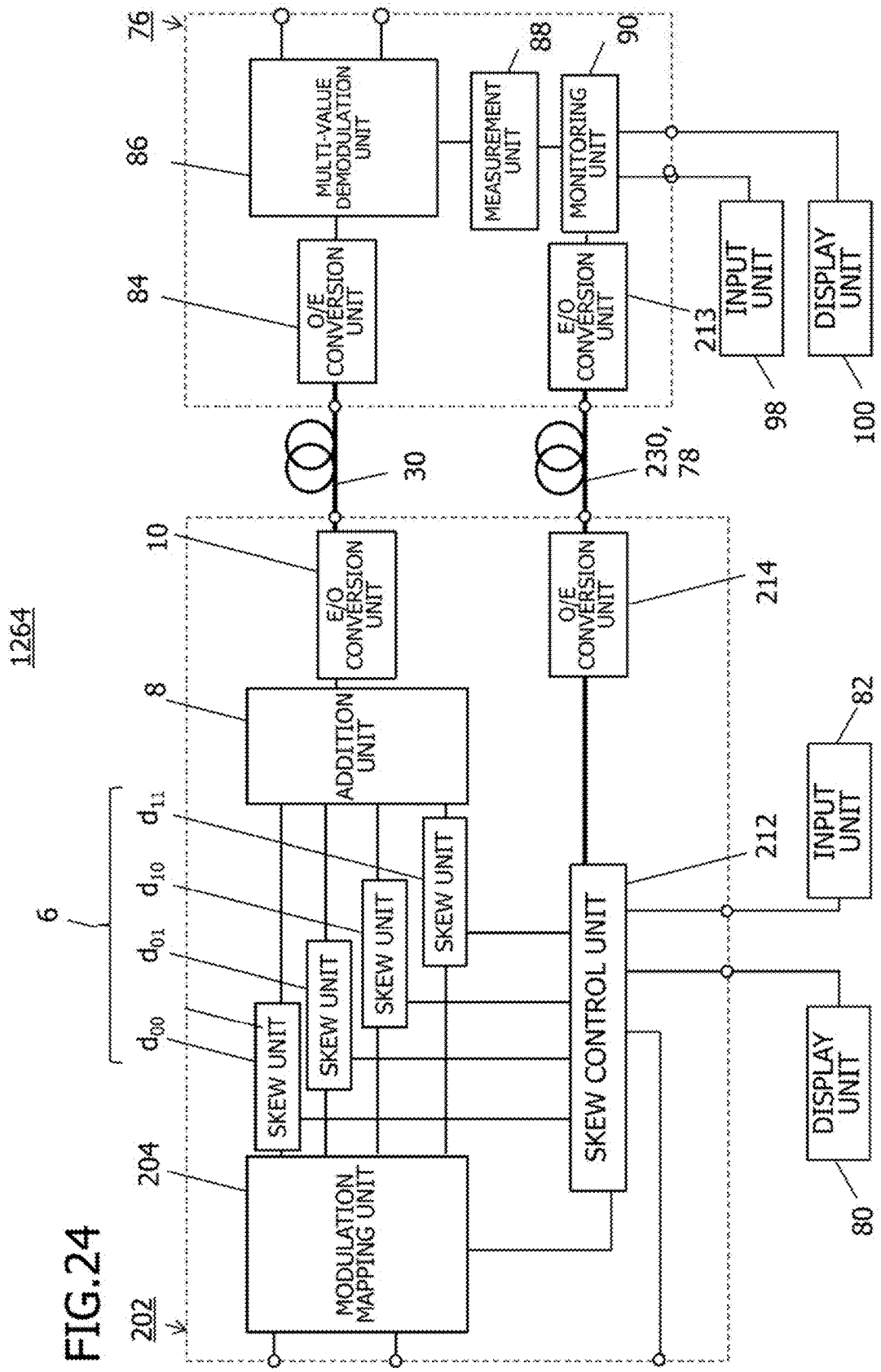
FIG. 24 is a diagram illustrating an example of a system 1264 in which the control line 78 is an optical transmission line 230.
Figure 25:
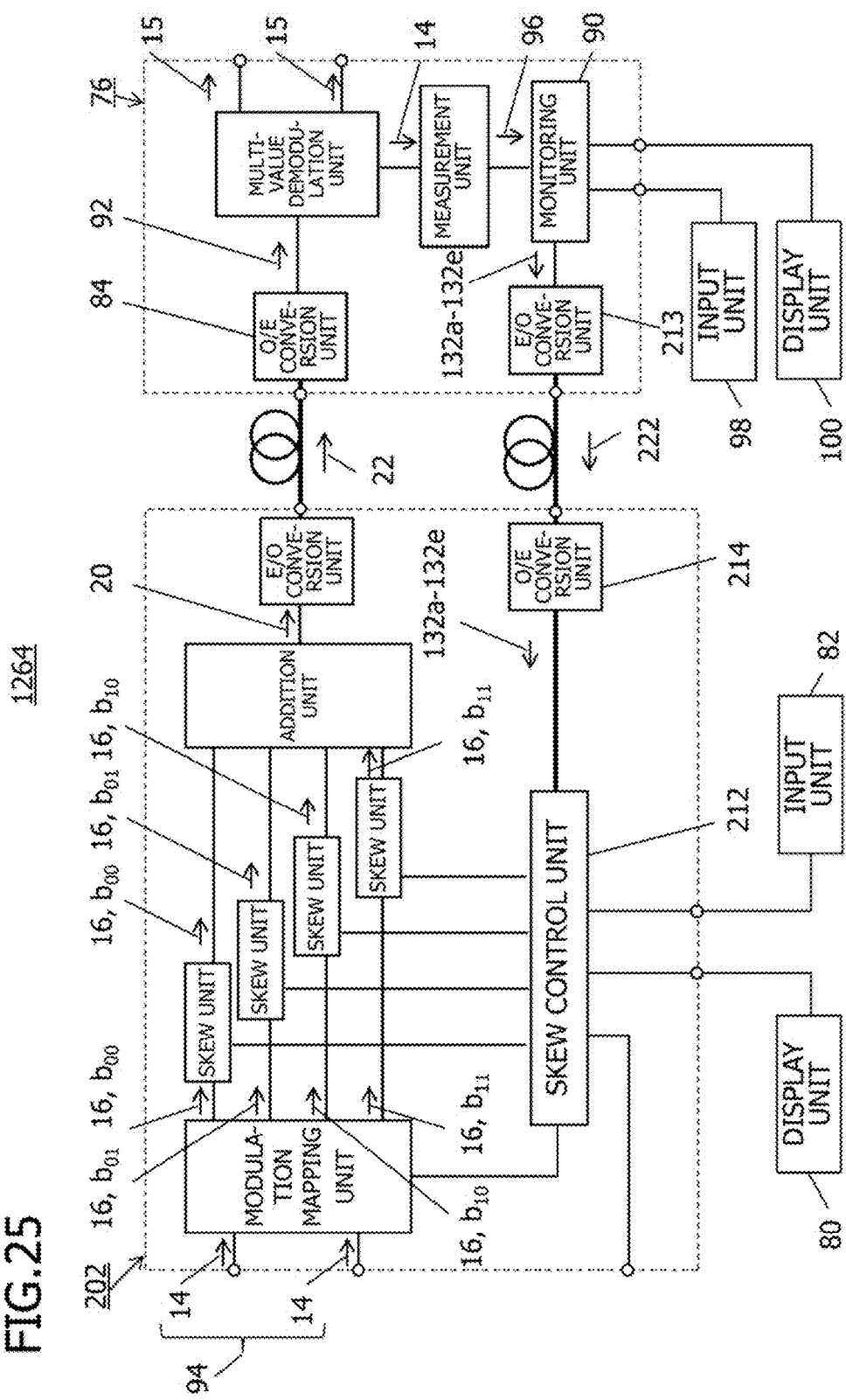
FIG. 25 is a diagram illustrating a flow of signals in FIG. 24.

In the example illustrated in FIG. 15, the control line 78 is a metal cable. However, the control line 78 may be an optical transmission line. FIG. 24 is a diagram illustrating an example of a system 1264 in which the control line 78 is an optical transmission line 230. FIG. 25 is a diagram illustrating a flow of signals in FIG. 24.

The first command 132a and the like (refer to FIG. 25) sent out from the monitoring unit 90 is converted into an optical signal 222 by an electric-optic conversion unit 213. The first command 132a and the like converted into the optical signal 222 are transmitted to an opto-electric conversion unit 214 of the optical transmission apparatus 202 through the optical transmission line 230 (refer to FIG. 24).

In the first modified example, in place of steps S2 to S4 (refer to FIG. 20), the CPU 114 acquires a standby time to be used in step S16 and the like from the input unit 98. Steps S104 to S106 (refer to FIG. 22) are omitted.

The first command 132a and the like are converted into an electrical signal by the opto-electric conversion unit 214 and sent out to the skew control unit 212 after the conversion.

The skew control unit 212 controls the plurality of skew units 6 and the like (refer to FIG. 24) in response to the first command 132a and the like.

For example, the electric-optic conversion unit 213 has substantially the same structure as the electric-optic conversion unit 10 of the optical transmission apparatus 202. For example, the opto-electric conversion unit 214 has substantially the same structure as the opto-electric conversion unit 84 of the optical receiver 76.

According to the system 1264 illustrated in FIG. 24, the adjustment of a delay amount can be completed in a short period of time, even when there is a long distance between the optical transmission apparatus 202 and the optical receiver 76.

(4-2) Second Modified Example

In the example described above, the skew control unit 212 does not adjust the first delay amount $\tau_{00}$. However, the skew control unit 212 may adjust the first delay amount $\tau_{00}$. When strength is given to the first signal $b_{00}$, accuracy of compensation of the group delay time difference is improved by adjusting the first delay amount $\tau_{00}$ together with the second delay amount $\tau_{01}$ to the fourth delay amount $\tau_{11}$.

(4-3) Third Modified Example

In the example described above, the monitoring unit 90 is provided in the optical receiver 76. However, the monitoring unit 90 may be provided in the optical transmission apparatus 202. In this case, a code error rate is transmitted from the measurement unit 88 to the monitoring unit 90 through the control line 78. Providing the monitoring unit 90 in the optical transmission apparatus 202 enables the structure of the optical receiver 76 to be simplified.

(4-4) Fourth Modified Example

In the example described above, a sign of $\Delta\tau$ that is added to the second delay amount $\tau_{01}$ to the fourth delay amount $\tau_{11}$ is positive. However, the sign of $\Delta\tau$ may be negative.

In this case, in step S102 (refer to FIG. 22), the second integrated circuit 236b (in other words, the skew control unit 212) gives a certain delay amount (an initial value of a delay amount) that is sufficiently greater than 0 ps to each of the plurality of delay circuits 40. Specifically, the certain delay amount given in step S102 is a period of time that is longer than a maximum value (for example, 40 ps) of the group delay time difference of the optical signal 22 in the optical transmission line 30.

In this case, for example, the second integrated circuit 236b may acquire a sign of $\Delta\tau$ between step S110 and step S112. In step S116, the second integrated circuit 236b adds $\Delta\tau$ with the acquired sign to the second delay amount $\tau_{01}$. A similar description applies to steps S120 and S124.

According to the fourth modified example, a delay amount can be adjusted, even when the wavelength of the optical signal 22 is any one of a wavelength within a normal dispersion region of the optical transmission line 30 and a wavelength within an anomalous dispersion region thereof.

(4-5) Fifth Modified Example

In the example described above, each of the delay amounts to be given to the plurality of signals 16 is adjusted based on one of the two pseudorandom signals included in a test signal. However, the delay amounts to be given to the plurality of signals 16 may be adjusted based on both of the two pseudorandom signals included in the test signal.

In this case, steps S14 to S42 (refer to FIGS. 20 and 21) are executed first based on one of the two pseudorandom signals included in the test signal. Subsequently, steps S14 to S42 are executed once again based on the other of the two pseudorandom signals included in the test signal.

Alternatively, steps S14 to S22 (refer to FIG. 20) are executed based on one of the two pseudorandom signals included in the test signal. Subsequently, steps S14 to S22 (refer to FIG. 20) are executed once again based on the other of the two pseudorandom signals included in the test signal. In a similar manner, steps S24 to S32 (refer to FIG. 21) are executed based on one of the two pseudorandom signals and further executed once again based on the other of the two pseudorandom signals. Finally, steps S34 to S42 (refer to FIG. 21) are executed based on one of the two pseudorandom signals and further executed once again based on the other of the two pseudorandom signals.

Alternatively, steps S14 to S42 (refer to FIGS. 20 and 21) are executed based on a sum of the two pseudorandom signals included in the test signal.

According to the fifth modified example, since delay amounts are adjusted based on two pseudorandom signals, an accuracy of adjustment of the delay amounts improves.

The skew control unit 212 according to the second embodiment adjusts the delay amounts given to the plurality of skew units 6 by feedback control. Therefore, according to the second embodiment, in addition to the advantages of the first embodiment, the degradation of reception quality due to a group delay time difference of the optical multi-value signal of which wavelength varies in accordance with light intensity can be adaptively suppressed.

Third Embodiment

An optical transmission apparatus 302 (refer to FIG. 15) according to a third embodiment is an optical transmission apparatus 202 (in other words, an optical transmission apparatuses 202 according to the second embodiment) in which the certain delay amounts (in other words, initial values of feedback control) given to the plurality of skew units 6 are different from each other. Otherwise, a configuration and the like of the third embodiment are approximately the same as the configuration and the like of the second embodiment. Therefore, descriptions of the same configuration and the like as in the second embodiment will be either omitted or simplified.

1) Configuration and Operation

A skew control unit 312 (refer to FIG. 15) according to the third embodiment is an apparatus that gives the plurality of skew units 6 certain delay amounts that differ each other. Otherwise, a configuration and an operation of the optical transmission apparatus 302 according to the third embodiment are approximately the same as the configuration and the operation of the optical transmission apparatus 202 described with reference to FIGS. 15 to 23.

The certain delay amounts given to the plurality of skew units 6 are, for example, delay amounts determined in advance so that group delay time differences between symbols of which light intensities differs from each other (in other words, symbols of the optical signal 22) are compensated. Therefore, according to the third embodiment, the time for adjustment of the delay amounts (in other words, feedback control) can be reduced.

(2) Hardware

Figure 26:
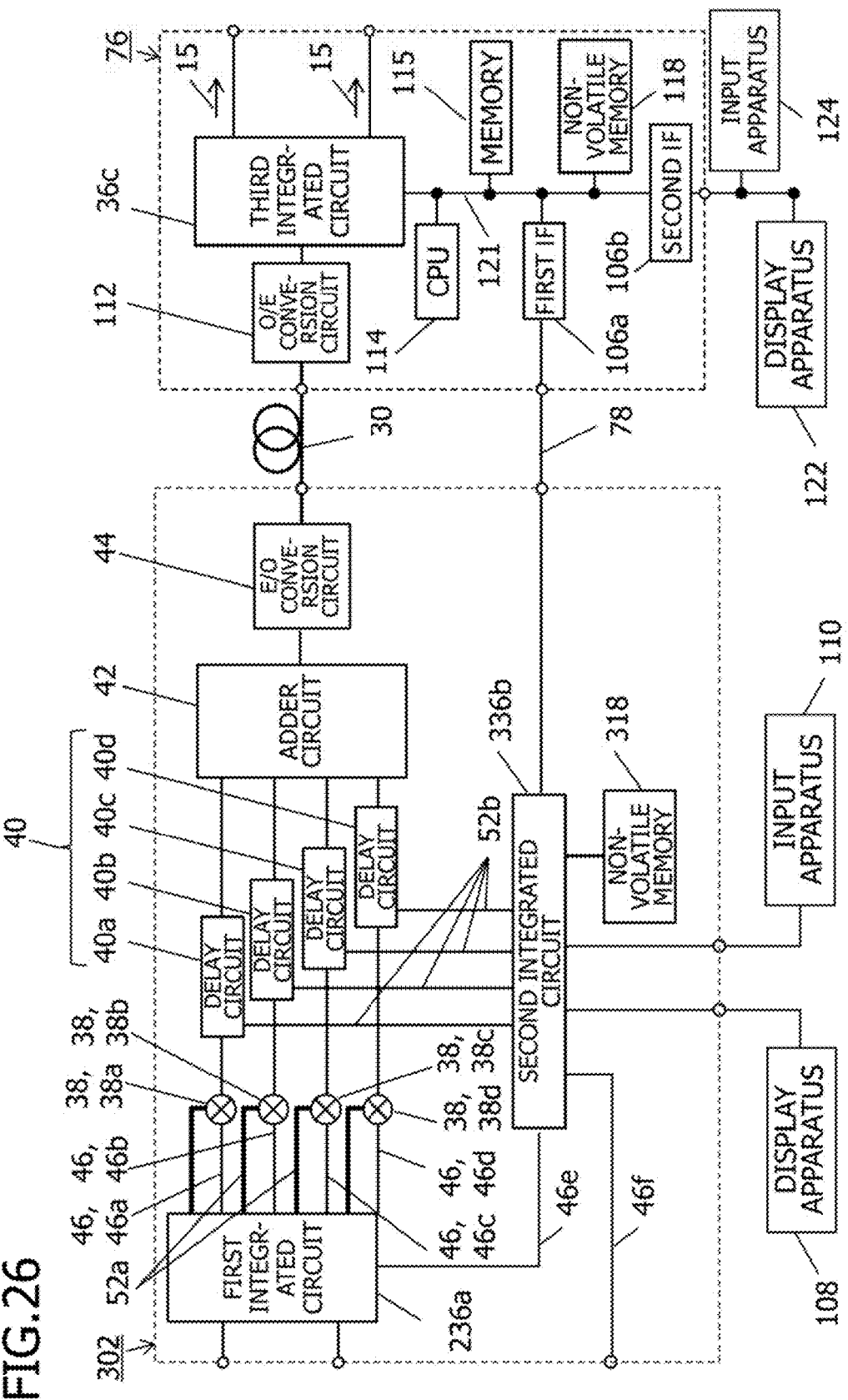
FIG. 26 is a diagram illustrating an example of a hardware configuration of the optical transmission apparatus 302 according to the third embodiment.
Figure 27:
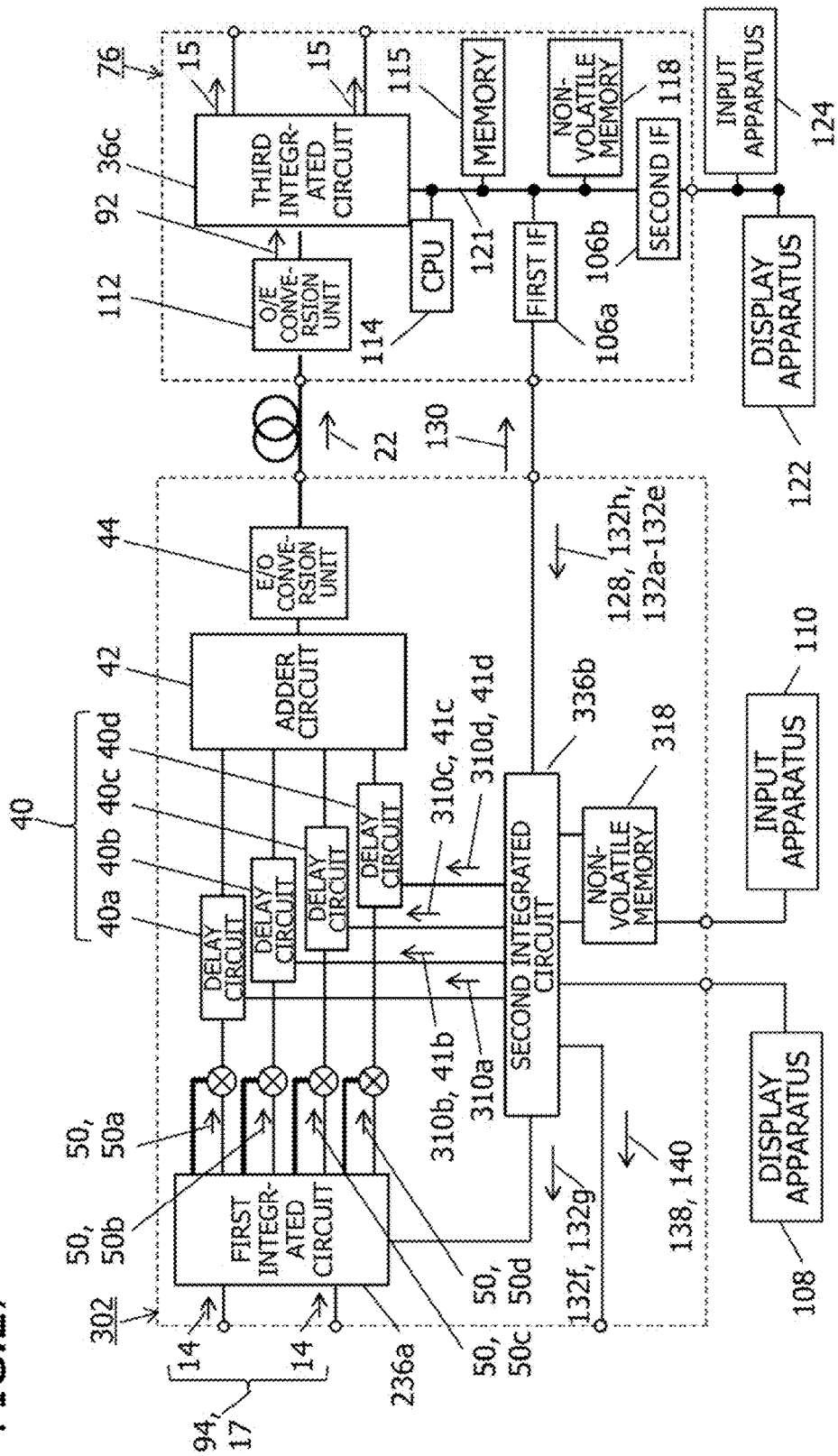
FIG. 27 is a diagram illustrating a flow of signals in FIG. 26.

FIG. 26 is a diagram illustrating an example of a hardware configuration of the optical transmission apparatus 302 according to the third embodiment. FIG. 26 also illustrates a hardware configuration of the optical receiver 76. FIG. 27 is a diagram illustrating a flow of signals in FIG. 26.

For example, the optical transmission apparatus 302 according to the third embodiment includes a non-volatile memory 318 connected to a second integrated circuit 336b. For example, the non-volatile memory 318 is a flash memory or a read only memory (ROM).

The non-volatile memory 318 records candidates of delay amounts (hereinafter, referred to as delay amount candidates) determined in advance based on wavelength dispersion and the like of the optical transmission line 30. The delay amount candidates are delay amounts determined so that group delay time differences between symbols of which light intensities differs from each other in the optical transmission line 30 (in other words, symbols of the optical signal 22) are compensated.

The non-volatile memory 318 further records an identifier of a lane (hereinafter, referred to as a lane identifier) of which wavelength range includes the wavelengths of the optical signal 22 outputted by the electric-optic conversion circuit 44. For example, when the wavelengths of the optical signal 22 outputted by the electric-optic conversion circuit 44 is $\lambda_{00}$ to $\lambda_{11}$ illustrated in FIG. 4, a lane identifier L0 is recorded in the non-volatile memory 318. The wavelength range of a lane corresponding to the lane identifier L0 is a wavelength range with a central wavelength $\lambda c$ of 1273.54 nm and a width of approximately 2 nm.

Specifically, the non-volatile memory 318 records a lookup table that records delay amount candidates. The non-volatile memory 318 further records a file (for example, a single-row, single-column table, hereinafter referred to as a lane file) that records the lane identifier.

For example, the skew control unit 312 (refer to FIG. 15) according to the third embodiment is realized by the second integrated circuit 336b (refer to FIG. 26) and the non-volatile memory 318.

(3) Processes (3-1) Lookup Table

Figure 28:
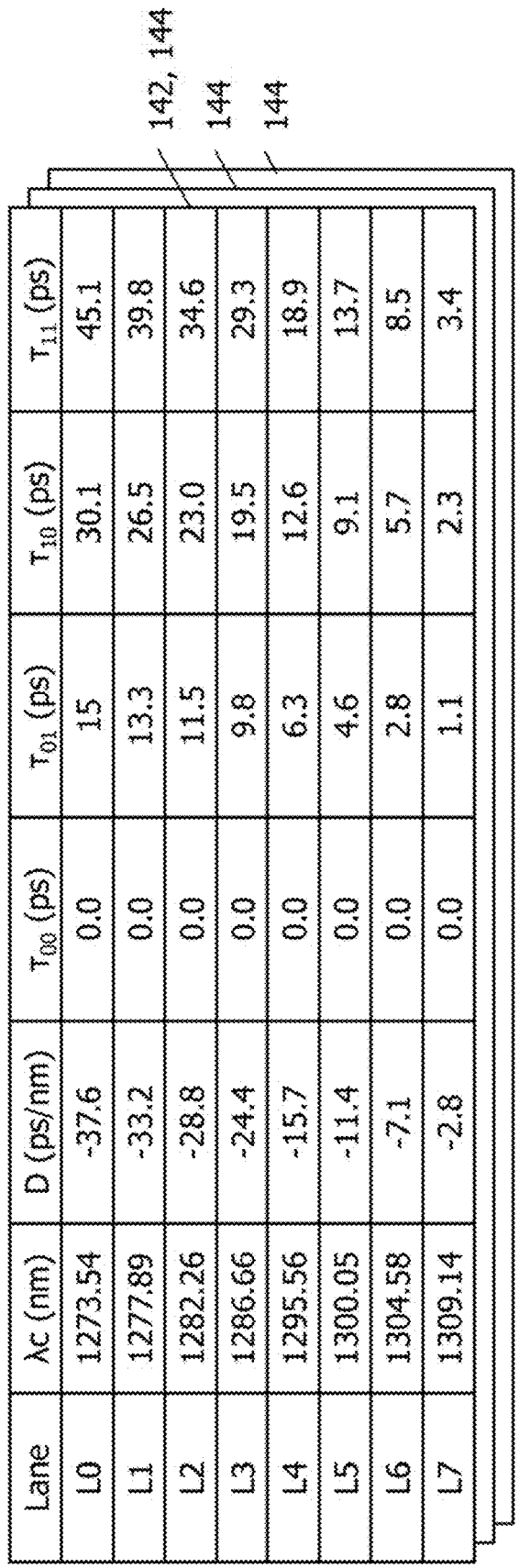
FIG. 28 is a diagram illustrating an example of a lookup table 142 that is recorded in the non-volatile memory 318.

FIG. 28 is a diagram illustrating an example of a lookup table 142 that is recorded in the non-volatile memory 318. Rows (other than a first row) of the lookup table 142 correspond one-to-one with lanes of PAM4 being discussed by IEEE 802.3bs.

A lane identifier (for example, L0) is recorded in a first column of each row. A central wavelength of a lane corresponding to the lane identifier is recorded in a second column. A wavelength dispersion at the central wavelength of each lane is recorded in a third column. Candidates of the delay amounts to be given to the plurality of signals 16 are recorded in fourth to seventh columns. For example, candidates of the first delay amount $\tau_{00}$ are recorded in the fourth column. A similar description applies to the fifth to seventh columns.

The lookup table 142 illustrated in FIG. 28 records candidates of delay amounts (in other words, the first to fourth delay amounts) for the optical signal 22 that propagates through a single-mode optical fiber with a zero-dispersion wavelength of 1324 nm and a fiber length (in other words, a length of an optical transmission line) of 10 km.

For example, the non-volatile memory 318 records a plurality of lookup tables 144. The plurality of lookup tables 144 correspond one-to-one with a plurality of mutually different fiber lengths (for example, 2, 4, 6, 8, and 10 km), respectively.

For example, each lookup table 144 records candidates of the first delay amount $\tau_{00}$ to the fourth delay amount $\tau_{11}$ determined based on the zero-dispersion wavelength of the optical transmission line 30 of a system 364 to which the optical transmission apparatus 302 is applied and a fiber length to which each lookup table corresponds. The candidates of the first delay amount Too to the fourth delay amount t are delay amounts determined so that group delay time differences given to each symbol of the optical signal 22 by the optical transmission line 30 having the same length as a fiber length to which each lookup table 144 corresponds is compensated.

The following description assumes that the zero-dispersion wavelength of the optical transmission line 30 used in the system has been given in advance. When the zero-dispersion wavelength is not given, a plurality of lookup tables that correspond one-to-one with a plurality of combinations of fiber lengths and zero-dispersion wavelengths can be used in place of the lookup tables 144 illustrated in FIG. 28.

(3-2) Process of Optical Receiver

Figure 29:
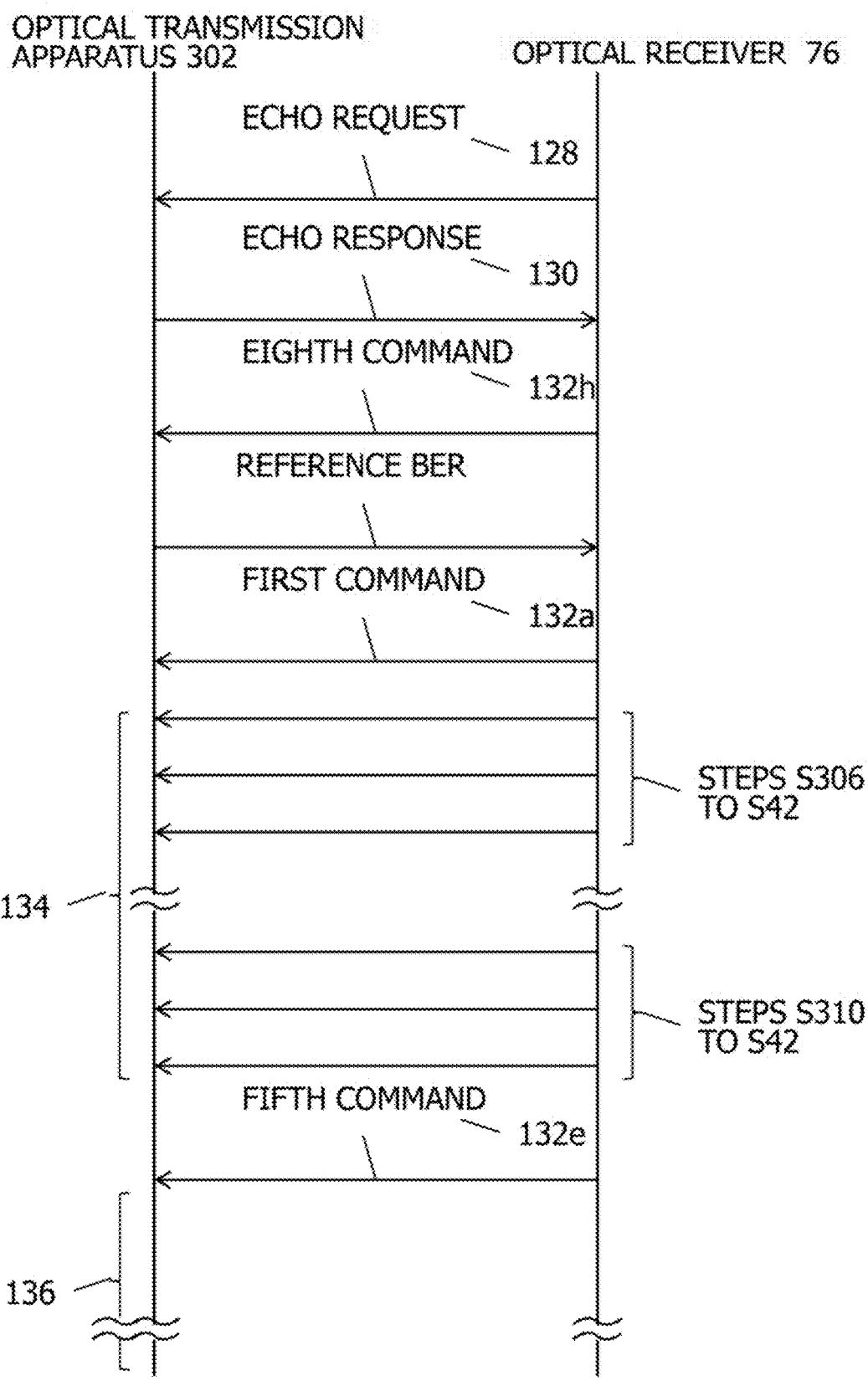
FIG. 29 is a sequence diagram illustrating a flow of a process executed by the optical transmission apparatus 302 in cooperation with the optical receiver 76.
Figure 30:
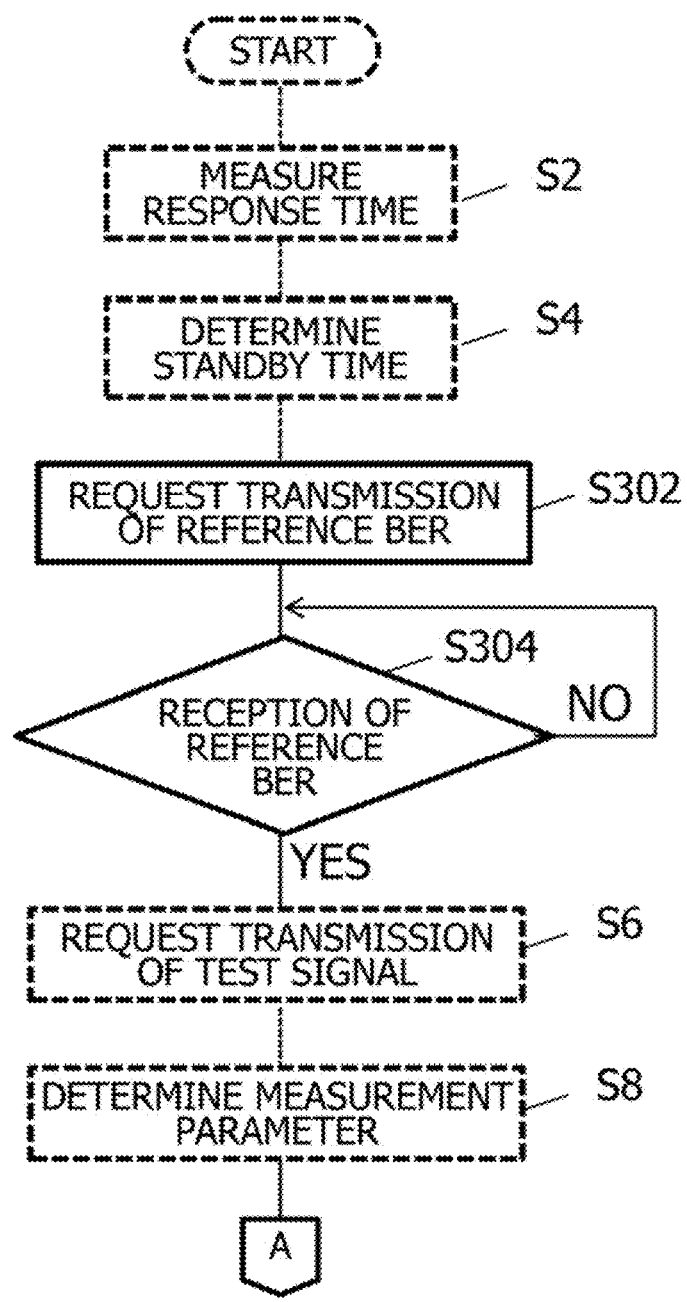
FIG. 30 is a diagram illustrating an example of a flow of a process executed by the optical receiver 76.
Figure 31:
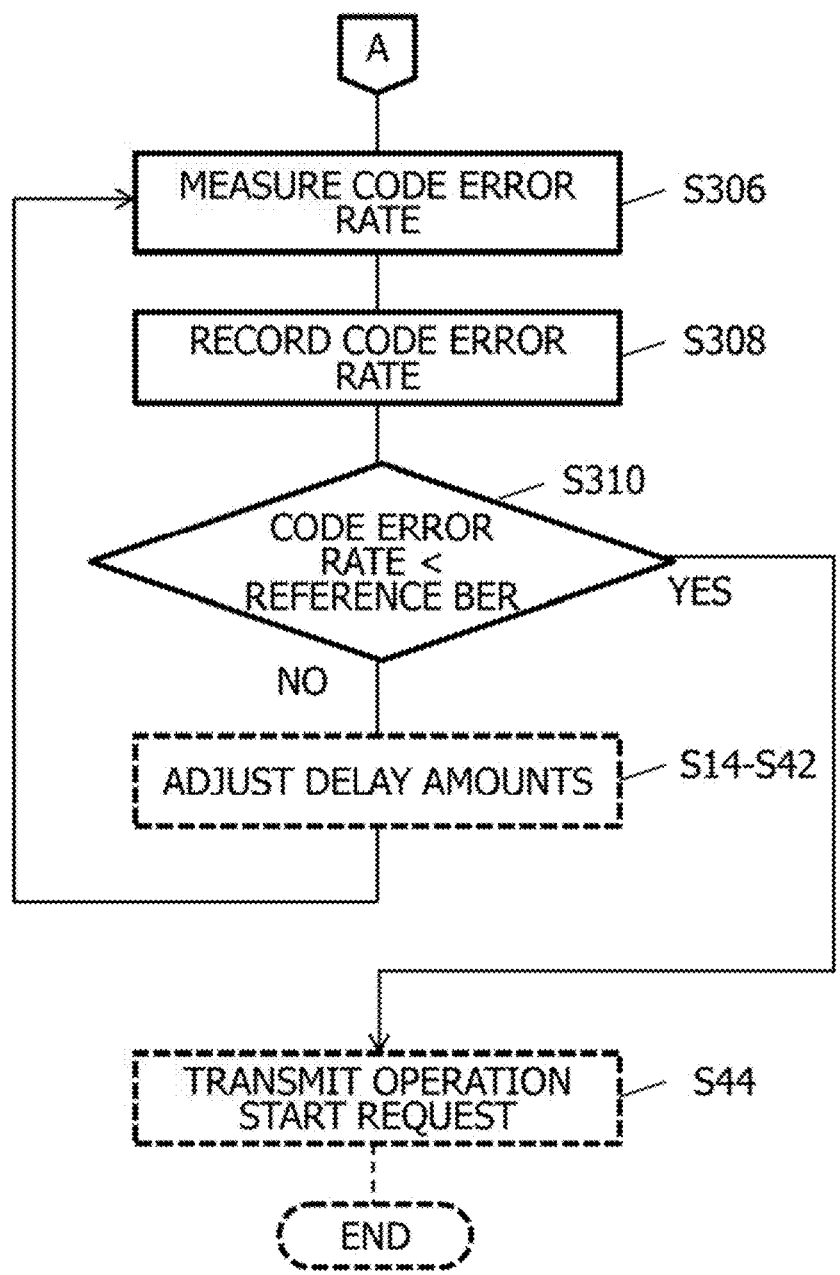
FIG. 31 is a diagram illustrating an example of a flow of a process executed by the optical receiver 76.

FIG. 29 is a sequence diagram illustrating a flow of a process executed by the optical transmission apparatus 302 in cooperation with the optical receiver 76. The sequence diagram illustrated in FIG. 29 is similar to the sequence diagram illustrated in FIG. 19. The sequence diagram illustrated in FIG. 19 is a sequence diagram according to the second embodiment. Therefore, a description of procedures similar to the procedures illustrated in FIG. 19 will be omitted or simplified. FIGS. 30 and 31 are diagrams illustrating an example of a flow of a process executed by the optical receiver 76.

Steps depicted by dashed lines in FIGS. 30 and 31 are steps described with reference to FIGS. 20 and 21. Therefore, a description of the steps depicted by dashed lines in FIGS. 30 and 31 will be omitted or simplified.

—Request for Transmission of Reference Error Rate (Step S302)—

After steps S2 to S4, the CPU 114 transmits an eighth command 132h to the optical transmission apparatus 202 through the control line 78. The eighth command 132h is a command for requesting transmission of a reference error rate to be used in a determination of step S310 (refer to FIG. 31).

Step S302 is executed by the monitoring unit 90 (refer to FIG. 15).

—Reception of Reference Error Rate (Step S304)—

The CPU 114 stands by until the reference error rate (hereinafter, referred to as a reference BER) is received. When the reference BER is received, the CPU 114 advances to step S6. Step S304 is executed by the monitoring unit 90.

—Request for Transmission of Test Signal (Step S6)—

After step S304, the CPU 114 transmits the first command 132a (in other words, a request for transmission of a test signal) to the optical transmission apparatus 302 through the control line 78. Step S6 is a step described with reference to FIG. 20.

—Determination of Measurement Parameter (Step S8)—

After step S6, the CPU 114 determines the measurement parameters of a code error rate. Step S8 is a step described with reference to FIG. 20.

—Measurement of Code Error Rate (Step S306)—

After step S8, the CPU 114 measures a code error rate of the received signal 92 (refer to FIG. 16). Step S306 is executed by the measurement unit 88.

—Recording of Code Error Rate (Step S308)—

After step S306, the CPU 114 records the measured code error rate in the memory 115. Step S308 is executed by the monitoring unit 90.

—Determination (Step S310)—

After step S308, the CPU 114 reads out the code error rate measured in step S306 from the memory 115, and compares the read code error rate with the reference BER received in step S304.

When the code error rate measured in step S306 is smaller than the reference BER, the CPU 114 advances to step S44. When the code error rate measured in step S306 is equal to or greater than the reference BER received in step S304, the CPU 114 advances to steps S14 to S42.

Step S310 is executed by the monitoring unit 90.

—Adjustment of Delay Amounts (Steps S14 to S42)—

The CPU 114 performs feedback control of the first delay amount $\tau_{00}$ to the fourth delay amount $\tau_{11}$ so that the code error rate of the optical signal 22 decreases. Steps S14 to S42 are steps described with reference to FIGS. 20 to 21. After steps S14 to S42, the CPU 114 returns to step S306.

Steps S14 to S42 are executed by the measurement unit 88 and the monitoring unit 90.

(3-3) Process of Optical Transmission Apparatus

Figure 32:
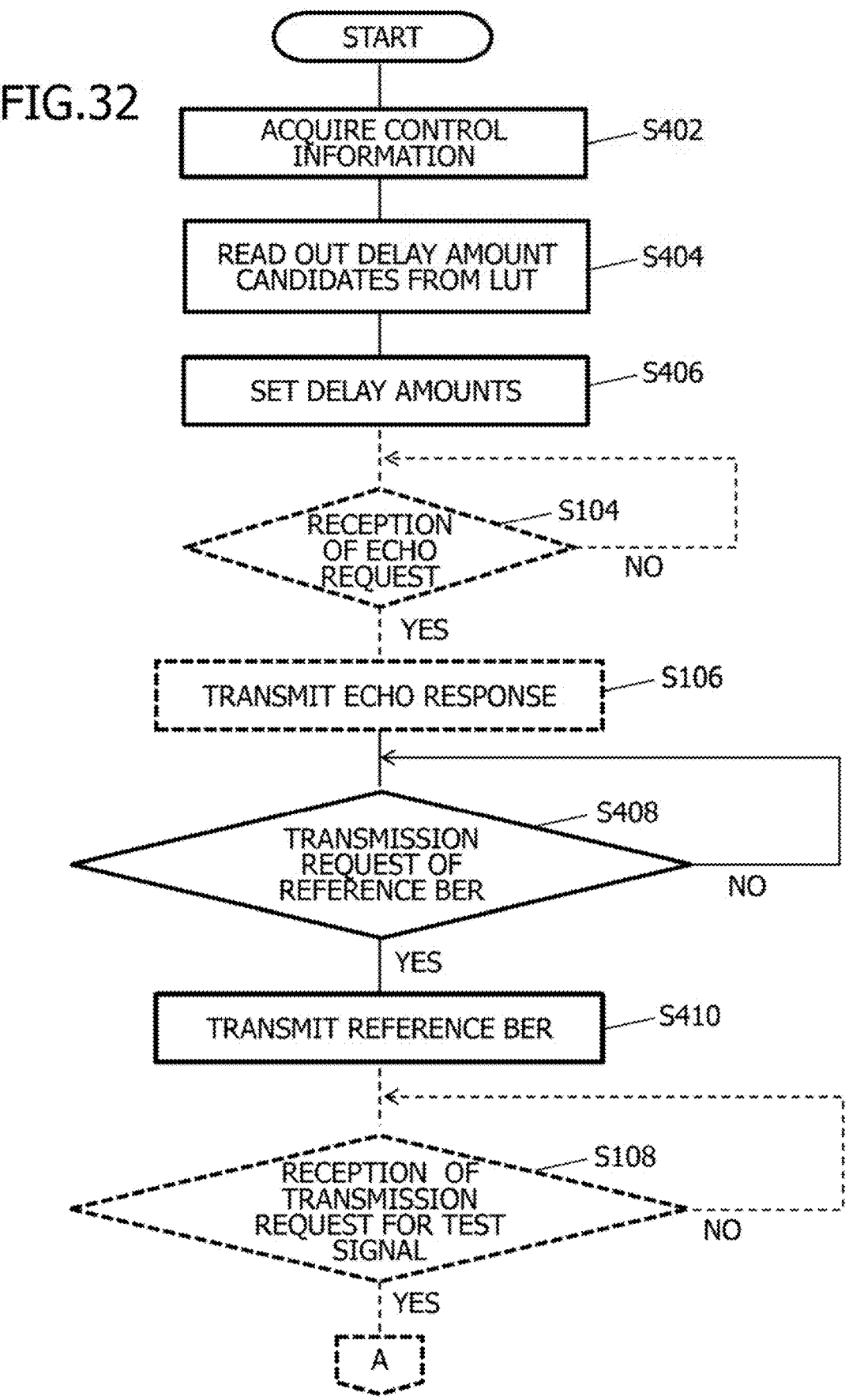
FIG. 32 is a diagram illustrating a flow of a process executed by the optical transmission apparatus 302.
Figure 33:
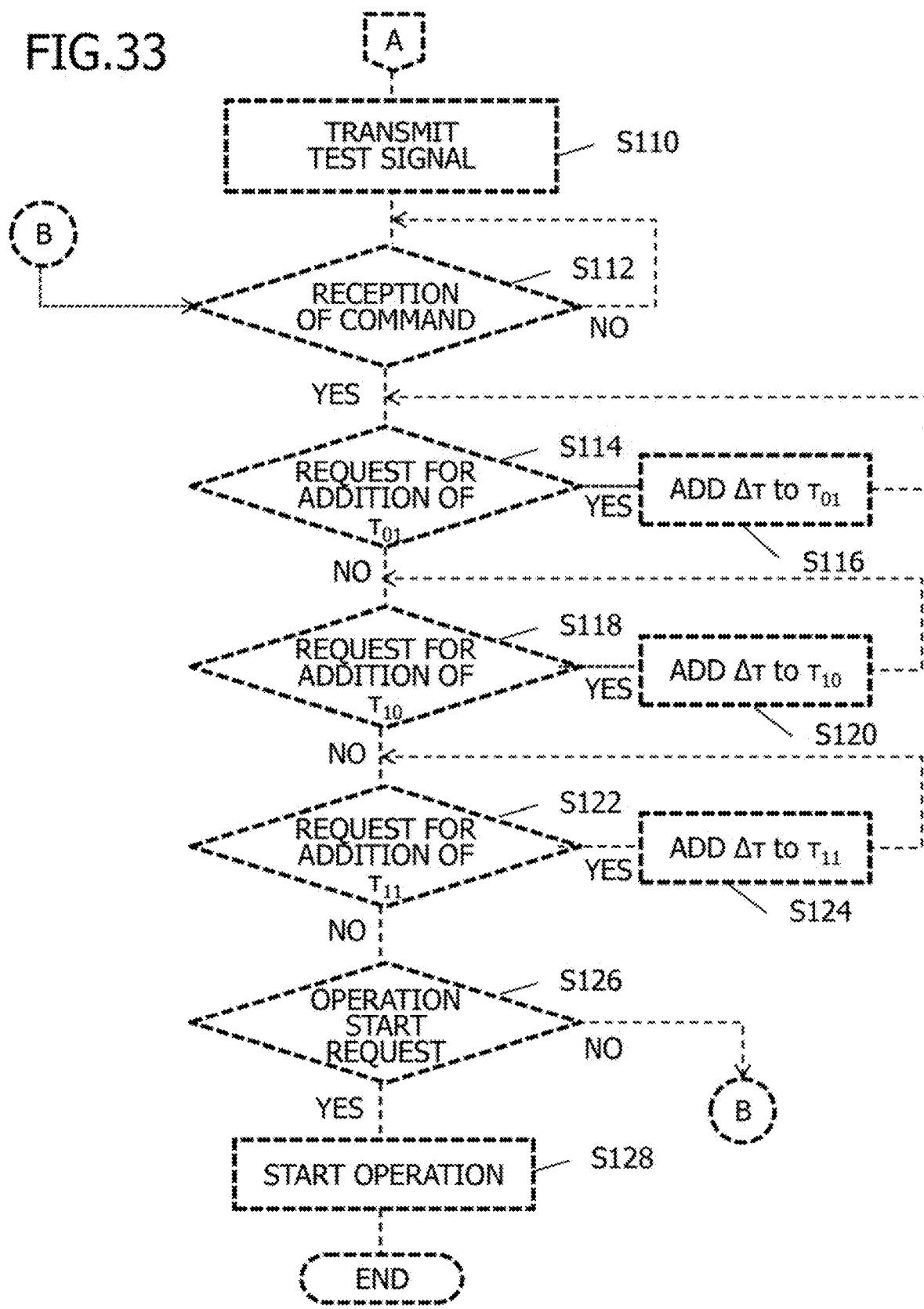
FIG. 33 is a diagram illustrating a flow of a process executed by the optical transmission apparatus 302.

FIGS. 32 and 33 are diagrams illustrating a flow of a process executed by the optical transmission apparatus 302.

Steps depicted by dashed lines in FIGS. 32 and 33 are steps described with reference to FIGS. 22 and 23. Therefore, a description of the steps depicted by dashed lines in FIGS. 32 and 33 will be omitted or simplified.

—Acquisition of Control Information (Step S402)—

The second integrated circuit 336b (refer to FIG. 27) acquires control information. The control information acquired by the second integrated circuit 336b is information for controlling the first delay amount $\tau_{00}$ to the fourth delay amount $\tau_{11}$.

Specifically, for example, the second integrated circuit 336b displays each identifier (hereinafter, referred to as a table identifier) of each of the plurality of lookup tables 144 on the display apparatus 108 in response to a start instruction operation. The start instruction operation is, for example, an operation performed by an operator with respect to the input apparatus 110.

The second integrated circuit 336b further displays, on the display apparatus 108, each fiber length of each lookup table 144 in association with the displayed table identifier. This display is provided in order to prompt the operator to select any of the plurality of lookup tables 144.

In response to the display, the second integrated circuit 336b acquires the table identifier selected by the operator. The selection of a table identifier is, for example, an operation with respect to the input apparatus 110. For example, the operator selects a table identifier of the lookup table 144 based on an actual length of the optical transmission line 30 (hereinafter, referred to as an actual fiber length) of the system 364. Specifically, the operator selects a table identifier of the lookup table 144 corresponding to a fiber length (for example, 8 km) that is closest to the actual fiber length (for example, 8.1 km).

When the second integrated circuit 336b acquires a table identifier, the second integrated circuit 336b displays a comment on the display apparatus 108. The comment is provided in order to prompt the operator to input a reference error rate. In response to the display, the second integrated circuit 336b acquires the reference error rate input by the operator. The input of a reference error rate is, for example, an operation with respect to the input apparatus 110.

The reference error rate is a reference value to be used in the determination of step S310 (refer to FIG. 31). For example, the reference error rate is a permissible value of a code error rate for PAM4 being discussed by IEEE 802.3bs. For example, when the fiber length is 10 km, the reference error rate is $1\times10^{-4}$ or $2\times10^{-4}$.

Step S402 is executed by the skew control unit 312 (refer to FIG. 15).

—Readout of Delay Amount Candidates (Step S404)—

After step S402, the second integrated circuit 336b firstly reads out the lane identifier from the non-volatile memory 318. The second integrated circuit 336b further reads out candidates of delay amounts from the non-volatile memory 318 based on the read lane identifier and the table identifier acquired in step S402.

Specifically, the second integrated circuit 336b firstly selects the lookup table 144 corresponding to the table identifier acquired in step S402 from the plurality of lookup tables 144 (refer to FIG. 28) recorded in the non-volatile memory 318. The second integrated circuit 336b selects a row (for example, a second row) that corresponds to the lane identifier (for example, L0) read out from the non-volatile memory 318 from a plurality of rows of the selected lookup table 144. The second integrated circuit 336b reads out candidates of delay amounts (for example, 0.0 ps, 15 ps, 30.1 ps, and 45.1 ps). The candidates read out are recorded in the selected row.

Step S404 is executed by the skew control unit 312 (refer to FIG. 15).

—Setting of Delay Amounts (Step S406)—

After step S404, the second integrated circuit 336b gives the candidates of the delay amounts to the plurality of delay circuits 40 (refer to FIG. 27). The given candidates are data read out in step S404. In other words, the skew control unit 312 (in other words, the second integrated circuit 336b) gives certain delay amounts (in other words, the candidates of the delay amounts) to the plurality of skew units 6 (in other words, the plurality of delay circuits 40).

For example, the second integrated circuit 336b sends out a first data 310a (refer to FIG. 27) to the first delay circuit 40a. The first data 310a is the candidate (for example, 0 ps) of the first delay amount $\tau_{00}$ read out in step S404.

In response to the first data 310a, the first delay circuit 40a sets the first delay amount $\tau_{00}$ to be given to the first electrical signal 50a to the candidate (for example, 0 ps) of the first delay amount $\tau_{00}$ indicated by the first data 310a.

In a similar manner, in response to second data 310b to fourth data 310d sent out by the second integrated circuit 336b, the second delay circuit 40b to the fourth delay circuit 40d set the second delay amount $\tau_{01}$ to the fourth delay amount $\tau_{11}$ to respective candidates (for example, 15 ps, 30.1 ps, and 45.1 ps).

Step S406 is executed by the skew control unit 312.

—Reception of Echo Request and Transmission of Echo Response (steps S104 and S106)—

After step S406, the second integrated circuit 336*b* executes steps S104 to S106. Steps S104 to S106 are steps described with reference to FIG. 22.

—Reception of Request for Transmission of Reference BER (Step S408)—

After step S106, the second integrated circuit 336*b* stands by until the eighth command 132*h* is received. The eighth command 132*h* is a command for requesting transmission of a reference BER.

Step S408 is executed by the skew control unit 312.

—Transmission of Reference BER (Step S410)—

After step S408, the second integrated circuit 336*b* transmits the reference BER acquired in step S402 to the optical receiver 76 through the control line 78.

Step S410 is executed by the skew control unit 312.

—Reception of Request for Transmission of Test Signal to Starting of operation (steps S108 to S128)—

After step S410, the second integrated circuit 336*b* executes steps S108 to S128. Steps S108 to S128 are steps described with reference to FIGS. 22 and 23.

As described above, the optical transmission apparatus 302 gives the candidates of the delay amounts to the plurality of delay circuits 40. The given candidates are recorded in lookup tables 144. The optical transmission apparatus 302 further adjusts the delay amounts of the plurality of delay circuits 40 in cooperation with the optical receiver 76. The candidates of the delay amounts are initial values for adjusting the delay amounts. Here, the candidates are given to the plurality of delay circuits 40.

In the adjustment of the delay amounts (steps S108 to S126), the delay amounts are adjusted until a code error rate of a received signal falls below a reference value (in other words, a reference BER). Therefore, according to the process illustrated in FIGS. 29 to 33, the code error rate of the optical signal 22 can be kept below a desired value (in other words, the reference BER).

(4) Modified Examples

In the example described above, all candidates of the delay amounts differ from each other. However, only a part of the candidates of the delay amounts may differ from each other. The time for adjustment of delay amounts can be reduced even when a part of the candidates of the delay amounts share a same value.

According to the third embodiment, delay amounts determined in advance so as to compensate for a group delay time difference of the optical signal 22 in the optical transmission line 30 can be given to the plurality of skew units 6 as initial values of the delay amounts. Therefore, according to the third embodiment, the time for adjustment of delay amounts can be reduced in addition to the advantages of the first and second embodiments.

Fourth Embodiment

An optical transmission apparatus according to a fourth embodiment is an apparatus that performs feedforward control of delay amounts to be given to the plurality of signals 16 (refer to FIG. 2) outputted by the modulation mapping unit 4 (refer to FIG. 1). Otherwise, a configuration and the like of the fourth embodiment are approximately the same as the configuration and the like of the first embodiment. Therefore, descriptions of the same configuration and the like as in the first embodiment will be either omitted or simplified.

(1) Configuration and Operation

Figure 34:
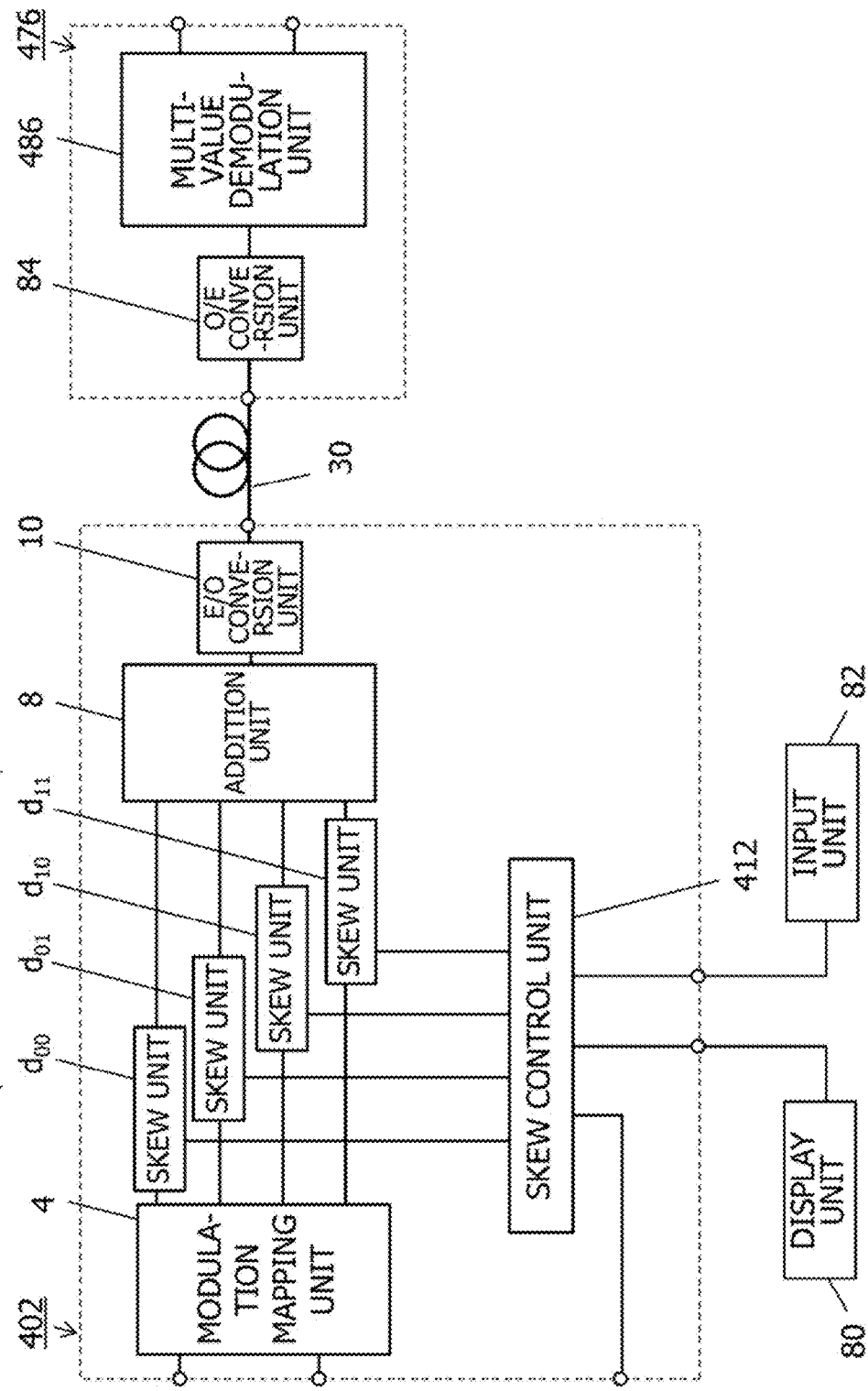
FIG. 34 is a diagram illustrating an example of a system 464 to which an optical transmission apparatus 402 according to the fourth embodiment has been applied.

FIG. 34 is a diagram illustrating an example of a system 464 to which an optical transmission apparatus 402 according to the fourth embodiment has been applied.

—Optical Transmission Apparatus—

A skew control unit 412 (refer to FIG. 34) according to the fourth embodiment is an apparatus that gives the plurality of skew units 6 certain delay amounts that differs from each other. The input unit 82 and the display unit 80 may be connected to the skew control unit 412. The input unit 82 and the display unit 80 can be used to select certain delay amounts to be given to the plurality of skew units 6.

Otherwise, a configuration and an operation of the optical transmission apparatus 402 according to the fourth embodiment are approximately the same as the configuration and the operation of the optical transmission apparatus 2 according to the first embodiment described with reference to FIGS. 1 and 2.

—Optical Receiver—

An optical receiver 476 according to the fourth embodiment includes the opto-electric conversion unit 84 and a multi-value demodulation unit 486. The opto-electric conversion unit 84 has been described in the second embodiment. The multi-value demodulation unit 486 is substantially the same as the multi-value demodulation unit 86 according to the second embodiment, with the exception of not being connected to the measurement unit 88 (refer to FIG. 15).

—Control—

For example, the certain delay amounts given to the plurality of skew units 6 are substantially the same as the certain delay amounts given to the plurality of skew units 6 by the skew control unit 312 (refer to FIG. 15) according to the third embodiment. In other words, for example, the certain delay amounts given to the plurality of skew units 6 are delay amounts determined in advance so that group delay time differences in the optical transmission line 30 between symbols of which light intensities differs from each other (in other words, symbols of the optical signal 22) are compensated.

In other words, the optical transmission apparatus 402 according to the fourth embodiment is an apparatus that performs feedforward control of the delay amounts to be given to the plurality of signals 16. Therefore, according to the fourth embodiment, a configuration (for example, the measurement unit 88, the monitoring unit 90, and the control line 78) for feedback control can be omitted.

(2) Hardware

Figure 35:
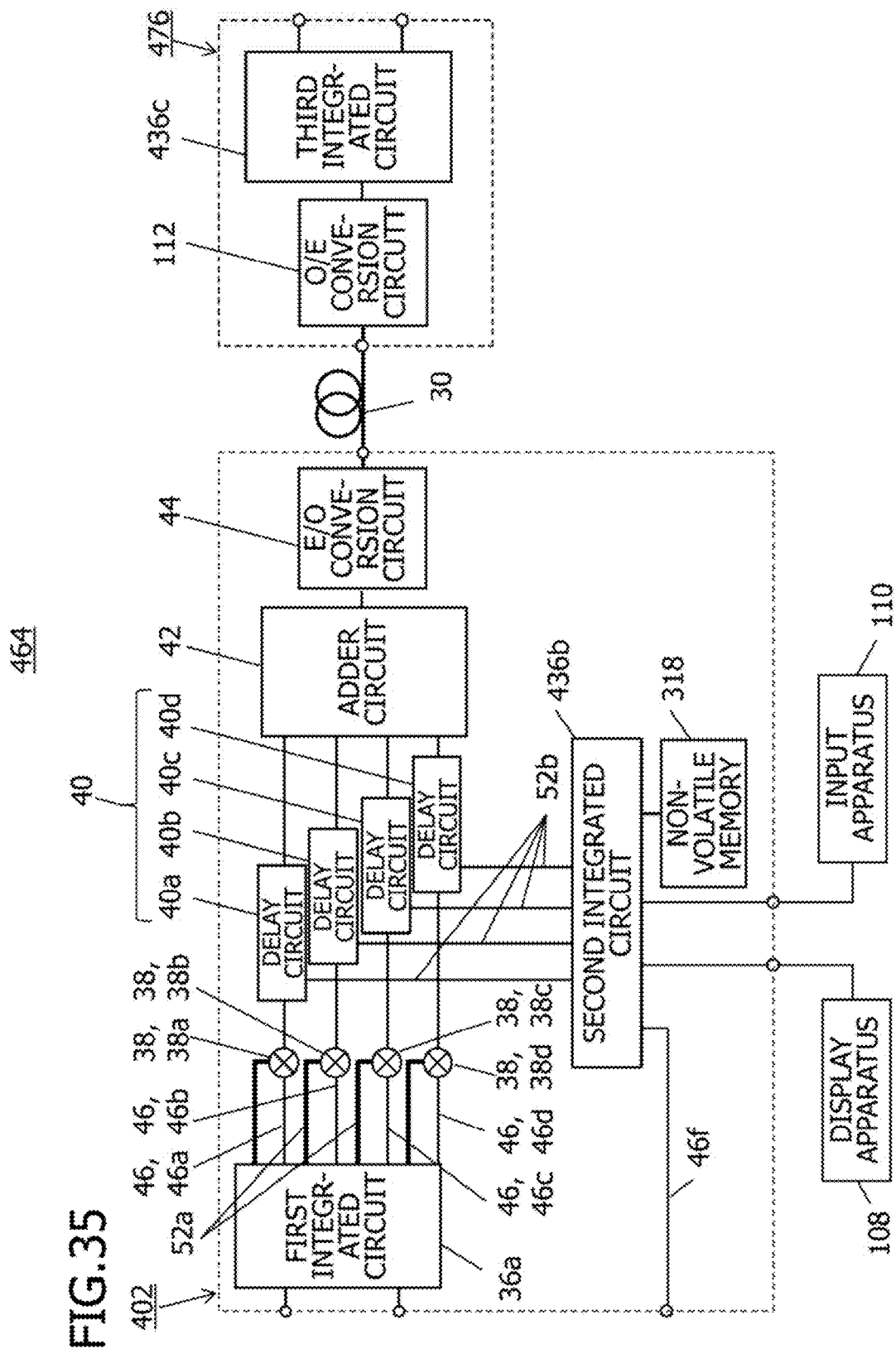
FIG. 35 is a diagram illustrating an example of a hardware configuration of the system 464 according to the fourth embodiment.

FIG. 35 is a diagram illustrating an example of a hardware configuration of the system 464 according to the fourth embodiment.

—Optical Transmitter—

As illustrated in FIG. 35, a second integrated circuit 436*b* may be disconnected to the control line 78 (refer to FIG. 26). The second integrated circuit 436*b* is not connected to the first integrated circuit 236*a*. Otherwise, a hardware configuration of the optical transmission apparatus 402 according to the fourth embodiment is substantially the same as the hardware configuration of the optical transmission apparatus 302 (refer to FIG. 26) according to the third embodiment.

The non-volatile memory 318 records candidates of delay amounts (for example, the lookup tables 144). The non-volatile memory 318 further records an identifier of a lane of which wavelength range includes the wavelengths of the optical signal 22 outputted by the electric-optic conversion circuit 44.

The skew control unit 412 according to the fourth embodiment is realized by the second integrated circuit 436*b* and the non-volatile memory 318.

—Optical Receiver—

The optical receiver 476 according to the fourth embodiment includes the opto-electric conversion circuit 112 and a third integrated circuit 436*c*. The opto-electric conversion circuit 112 is a circuit described in the second embodiment. The third integrated circuit 436*c* is substantially the same as the third integrated circuit 36*c* according to the second embodiment, with the exception of not being connected to the CPU 114 and the like (refer to FIG. 17).

The multi-value demodulation unit 486 is realized by the third integrated circuit 436*c*.

(3) Processes (3-1) Lookup Table

The lookup tables according to the fourth embodiment are, for example, the lookup tables 144 described in the third embodiment.

(3-2) Process of Optical Transmission Apparatus

Figure 36:
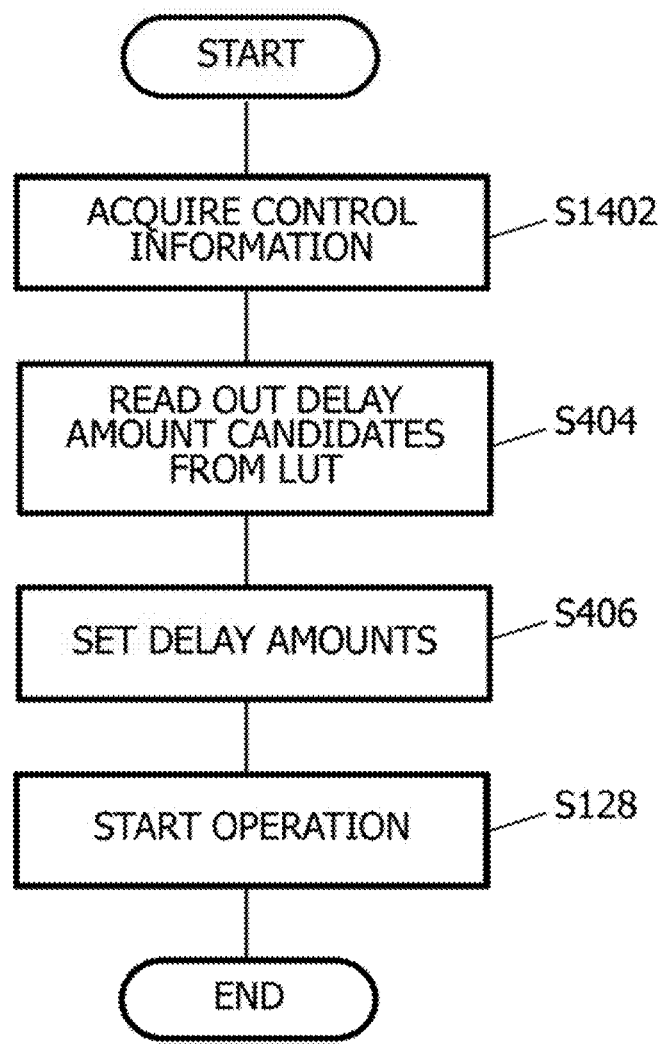
FIG. 36 is a diagram illustrating a flow of a process executed by the optical transmission apparatus 402.

FIG. 36 is a diagram illustrating a flow of a process executed by the optical transmission apparatus 402.
—Acquisition of Control Information (Step S1402)—

The second integrated circuit 436*b* (refer to FIG. 35) acquires control information. The control information acquired by the second integrated circuit 436*b* is information for controlling the first delay amount $\tau_{00}$ to the fourth delay amount $\tau_{11}$. Step S1402 is a step that is approximately the same as step S402 described with reference to FIG. 32, with the exception of a reference code error rate not being included in the acquired control information.

For example, the second integrated circuit 436*b* acquires a table identifier of the lookup table 144 corresponding to a fiber length that is closest to an actual length of the optical transmission line 30.

Step S1402 is executed by the skew control unit 412 (refer to FIG. 34).
—Readout of Candidates of Delay Amounts (Step S404)—

After step S1402, the second integrated circuit 436*b* reads out candidates of delay amounts from the non-volatile memory 318 based on the table identifier acquired in step S404. Step S404 is a step described with reference to FIG. 32.

Step S404 is executed by the skew control unit 412.
—Setting of Delay Amounts (Step S406)—

After step S404, the second integrated circuit 436*b* gives the delay amount candidates read in step S404 to the plurality of delay circuits 40. Step S406 is a step described with reference to FIG. 32.

Step S406 is executed by the skew control unit 412.
—Start of Operation (Step S128)—

After step S406, the second integrated circuit 436*b* permits an apparatus connected to the optical transmission apparatus 402 to transmit the digital signal 14. Step S128 is the step described with reference to FIG. 23 (refer to the second embodiment).

Step S128 is executed by the skew control unit 412.

According to the fourth embodiment, since group delay time differences due to an optical transmission line can be compensated, degradation of reception quality due to the group delay time differences of an optical multi-value signal of which wavelength varies in accordance with light intensity thereof can be suppressed. Furthermore, according to the fourth embodiment, since the group delay time differences can be compensated by feedforward control, a configuration for feedback control can be omitted.

While embodiments of the present invention have been described above, it is to be understood that the first to fourth embodiments are illustrative and not restrictive.

For example, the digital signal 14 according to the first to fourth embodiments is two parallel binary signals. However, the digital signal 14 may be three or more binary signals. Alternatively, the digital signal 14 may be a multi-value signal.

In the examples described above, signal lines between the first integrated circuit and the adder circuit give the same amount of delay to each of the plurality of signals 16. However, the signal line between the first integrated circuit and the adder circuit may give mutually different delays to the plurality of signals 16. In this case, in addition to compensating the group delay time differences due to the optical transmission line, the plurality of delay circuits 40 compensate time differences between delays given to the plurality of signals 16 by the signal lines between the first integrated circuit and the adder circuit.

In the examples described above, the certain delay amount given to the first delay circuit 40*a* is 0 ps. However, the certain delay amount given to the first delay circuit 40*a* may be greater than 0 ps. In this case, the certain delay amounts given to the second delay circuit 40*b* to the fourth delay circuit 40*d* are increased in accordance with the certain delay amount given to the first delay circuit 40*a*.

In the examples described above, the wavelengths of the optical signal 22 are wavelengths within a normal dispersion region of the optical transmission line 30. However, the wavelengths of the optical signal 22 may be wavelengths within an anomalous dispersion region of the optical transmission line 30. Even in this case, degradation of reception quality due to the group delay time differences of an optical transmission line can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission apparatus configured to transmit an optical signal with intensity according to an input signal, the optical transmission apparatus comprising:
a modulation mapping unit that adds strength according to a value that the input signal has;

a plurality of skew units that give delays to a plurality of signals outputted in parallel from the modulation mapping unit, the plurality of signals being at least one of electrical signals and digitized signals;

an addition unit that adds up the plurality of signals given the delays to generate a sum represented by one of an electrical signal and a digitized signal;

an electric-optic conversion unit that converts the sum, when represented by the digitized signal, into the electrical signal, and converts the sum signal, as represented by the electrical signal, into the optical signal by direct modulation of a semiconductor laser and transmits the optical signal, wherein a light intensity of the optical signal is modulated in accordance with a value of the sum and a wavelength of the optical signal varies in accordance with the light intensity; and a skew control unit that gives delay amounts to the plurality of skew units, the delay amounts being amounts of the delays.

2. The optical transmission apparatus according to claim 1, wherein the skew control unit further adjusts the delay amounts given to the plurality of skew units based on a reception quality of an optical signal received by an apparatus connected to the electric-optic conversion unit through an optical transmission line.

3. The optical transmission apparatus according to claim 2, wherein the reception quality is a code error rate of the optical signal received by the apparatus, and the skew control unit adjusts the delay amounts given to the plurality of skew units so that the code error rate decreases.

4. The optical transmission apparatus according to claim 1, wherein the delay amounts differ from each other.

5. The optical transmission apparatus according to claim 1, wherein the optical signal is an n-value signal wherein n is an integer equal to or greater than 3, and the plurality of signals correspond one-to-one with a plurality of integers that are equal to or greater than 0 and equal to or less than n−1.

6. The optical transmission apparatus according to claim 1, wherein the input signal includes a plurality of binary signals or a multi-value signal.

7. The optical transmission apparatus according to claim 1, wherein the modulation mapping unit adds strength greater than zero to only one signal among the plurality of signals.

8. An optical transmission method for a multi-value signal, the method comprising:

adding strength to a signal, wherein the signal corresponds to a value that an input signal has and the strength is in accordance with the value;

giving delays to a plurality of signals that includes the signal, the plurality of signals being at least one of electrical signals and digitized signals;

adding up the plurality of signals, to which the strength is added, to generate a sum, the plurality of signals further given the delays, the sum being represented by one of an electrical signal and a digitized signal; and converting the sum, when represented by the digitized signal, into the electrical signal, and converting the sum, as represented by the electrical signal, into an optical signal by direct modulation of a semiconductor laser and transmitting the optical signal, wherein a light intensity of the optical signal is modulated in accordance with a value of the sum and a wavelength of the optical signal varies in accordance with the light intensity.

* * * * *